(12) United States Patent
Tsiberidis

(10) Patent No.: US 11,878,550 B2
(45) Date of Patent: Jan. 23, 2024

(54) EMERGENCY WHEEL

(71) Applicant: GV ENGINEERING GMBH, Heimsheim (DE)

(72) Inventor: Konstantin Tsiberidis, Untergruppenbach (DE)

(73) Assignee: GV ENGINEERING GMBH, Heimsheim (DE)

( * ) Notice: Subject to any disclaimer, the term of this patent is extended or adjusted under 35 U.S.C. 154(b) by 790 days.

(21) Appl. No.: 16/963,569

(22) PCT Filed: Jan. 18, 2019

(86) PCT No.: PCT/EP2019/051265
§ 371 (c)(1),
(2) Date: Jul. 21, 2020

(87) PCT Pub. No.: WO2019/141817
PCT Pub. Date: Jul. 25, 2019

(65) Prior Publication Data
US 2021/0053391 A1  Feb. 25, 2021

(30) Foreign Application Priority Data

Jan. 22, 2018 (DE) ............ 10 2018 101 355.8
May 14, 2018 (DE) ............ 10 2018 111 492.3

(51) Int. Cl.
*B60B 11/10* (2006.01)
*B60B 15/26* (2006.01)

(52) U.S. Cl.
CPC ............ *B60B 11/10* (2013.01); *B60B 15/263* (2013.01); *B60B 2310/305* (2013.01); *B60B 2310/306* (2013.01); *B60B 2900/731* (2013.01)

(58) Field of Classification Search
CPC ....... B60B 11/10; B60B 15/26; B60B 15/263; B60B 7/06; B60B 7/063; B60B 7/08
See application file for complete search history.

(56) References Cited

U.S. PATENT DOCUMENTS

| 1,055,372 A | 3/1913 | Turnbull |
| 2,454,923 A | 11/1948 | Howell, Jr. |
| 2,989,347 A | 6/1961 | Leopold |
| 3,112,784 A | 12/1963 | Montenare |
| 4,666,216 A | 5/1987 | Smith |

(Continued)

FOREIGN PATENT DOCUMENTS

| DE | 1240430 B | 5/1967 |
| EP | 0606946 A1 | 7/1994 |

(Continued)

OTHER PUBLICATIONS

PCT International Search Report and Written Opinion completed by the ISA/EP on Jan. 16, 2019 and issued in connection with PCT/EP2018/077353.

(Continued)

*Primary Examiner* — Jason R Bellinger
(74) *Attorney, Agent, or Firm* — Barnes & Thornburg LLP

(57) ABSTRACT

This disclosure relates to a clamping device for tensioning an attachment on a rim of a vehicle wheel, wherein the attachment configured to enable a driving operation with a restricted tire function in an operating state in which it is fastened on the vehicle wheel.

31 Claims, 52 Drawing Sheets

(56) References Cited

U.S. PATENT DOCUMENTS

| | | | |
|---|---|---|---|
| 6,068,346 A | 5/2000 | Pender | |
| 6,217,125 B1 | 4/2001 | Tubetto | |
| 2006/0055231 A1* | 3/2006 | Metcalfe | B60B 7/063 |
| | | | 301/37.33 |
| 2020/0223250 A1* | 7/2020 | Tsiberidis | B60B 11/10 |
| 2022/0041011 A1* | 2/2022 | Tsiberidis | B60B 15/26 |
| 2022/0348038 A1* | 11/2022 | Tsiberidis | B60B 19/00 |
| 2023/0098604 A1* | 3/2023 | Tsiberidis | B60B 11/10 |
| | | | 301/40.3 |

FOREIGN PATENT DOCUMENTS

| | | | |
|---|---|---|---|
| EP | 2048003 B1 | 4/2009 | |
| FR | 1043038 A | 11/1953 | |
| GB | 857897 A | 1/1961 | |
| WO | 2001038106 A1 | 5/2001 | |
| WO | 2006123044 A2 | 11/2006 | |

OTHER PUBLICATIONS

PCT International Preliminary Examination Report mailed by the ISA/EP dated Jan. 16, 2020 and issued in connection with PCT/EP2018/077353.

PCT International Search Report and Written Opinion completed by the ISA/EP on May 9, 2019 and issued in connection with PCT/EP2019/051264.

PCT International Preliminary Examination Report mailed by the ISA/EP dated Dec. 17, 2019 and issued in connection with PCT/EP2019/051264.

PCT International Search Report and Written Opinion completed by the ISA/EP on May 9, 2019 and issued in connection with PCT/EP2019/051265.

PCT International Preliminary Examination Report mailed by the ISA/EP dated Nov. 22, 2019 and issued in connection with PCT/EP2019/051265.

* cited by examiner

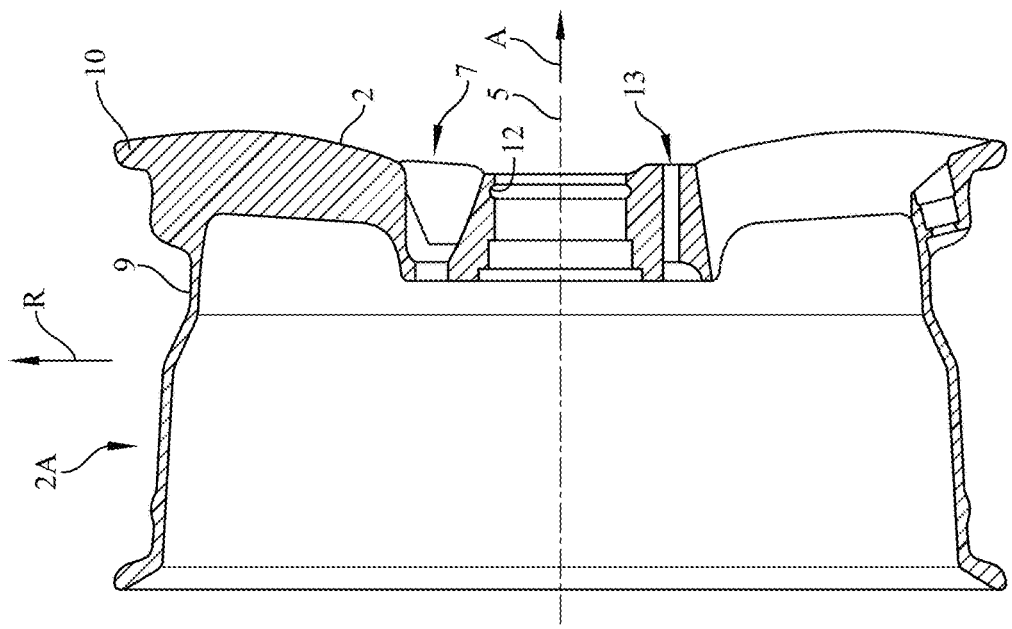
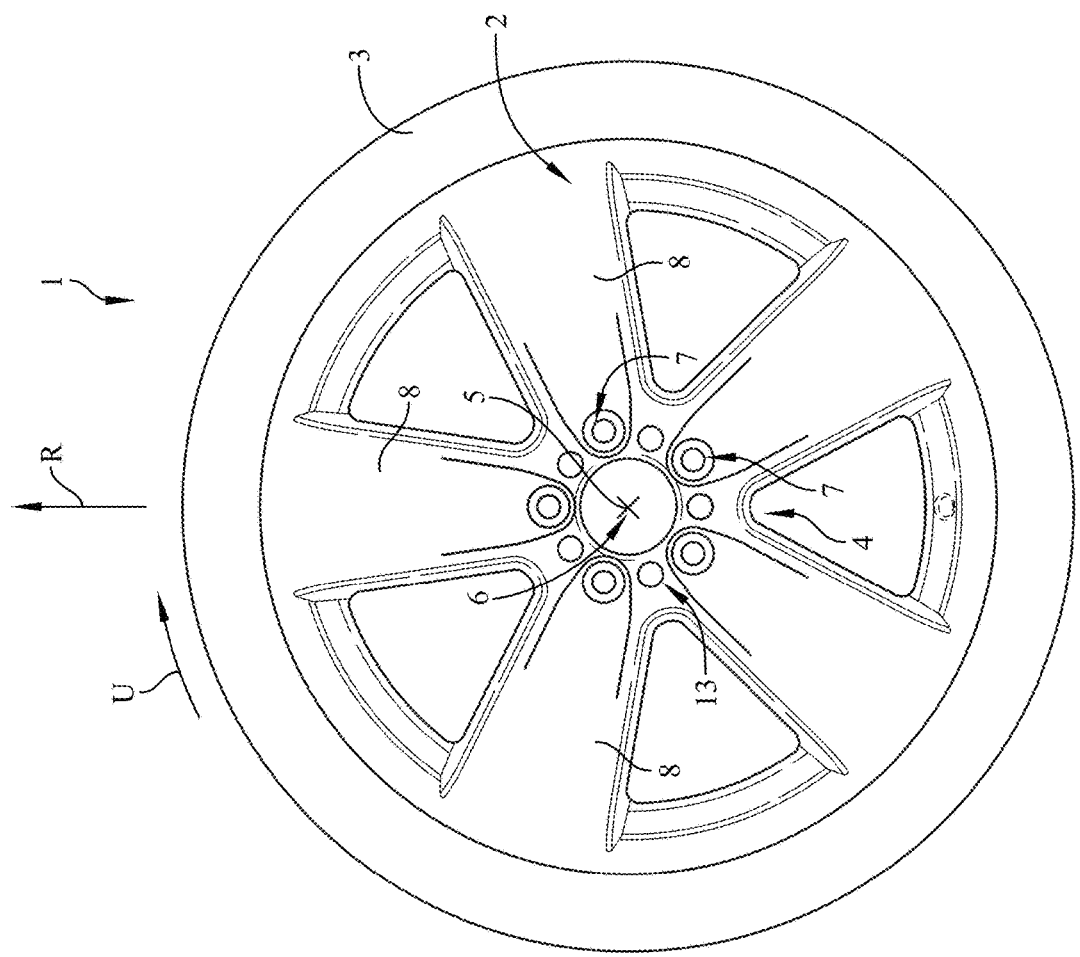
FIG. 2
FIG. 1

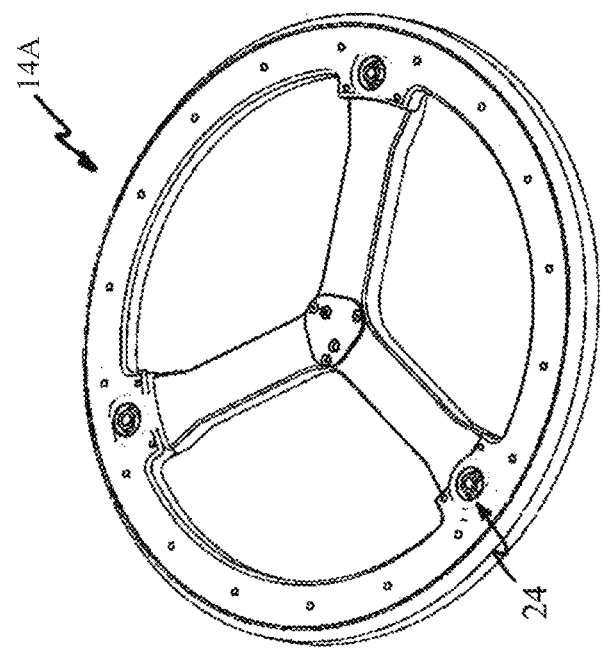
*FIG. 3c*
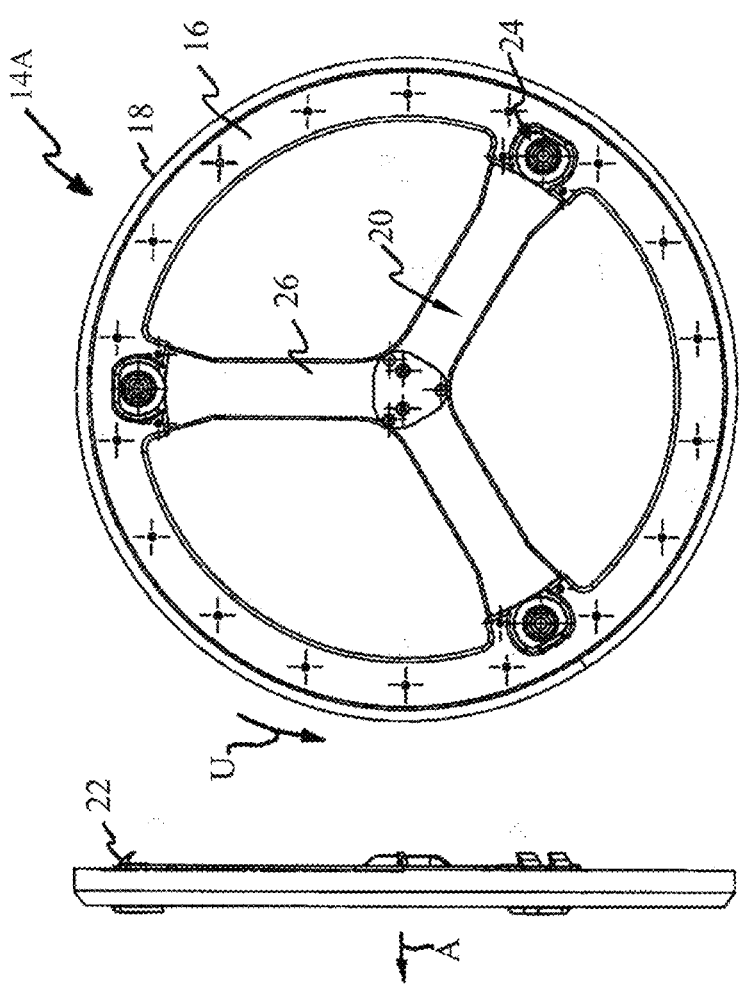
*FIG. 3b*
*FIG. 3a*

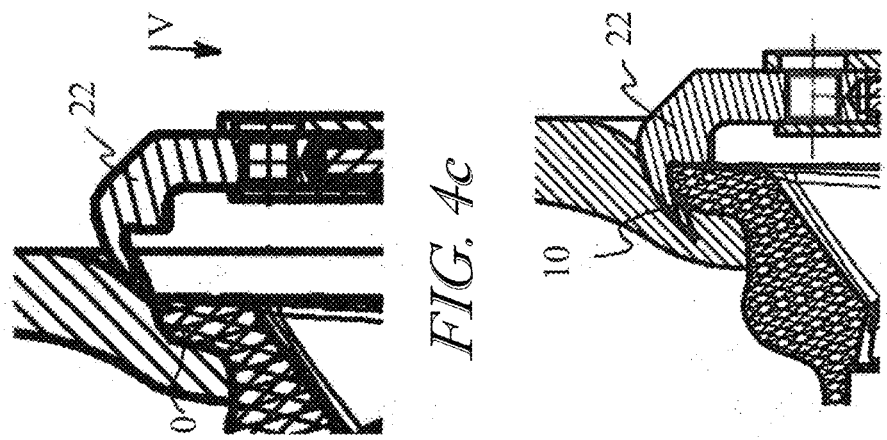
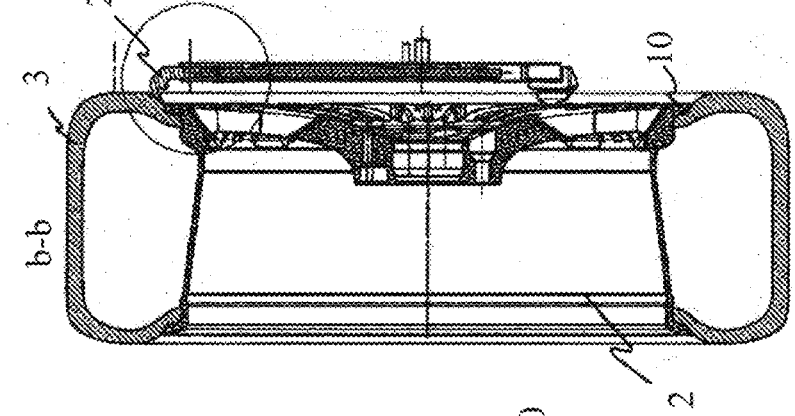
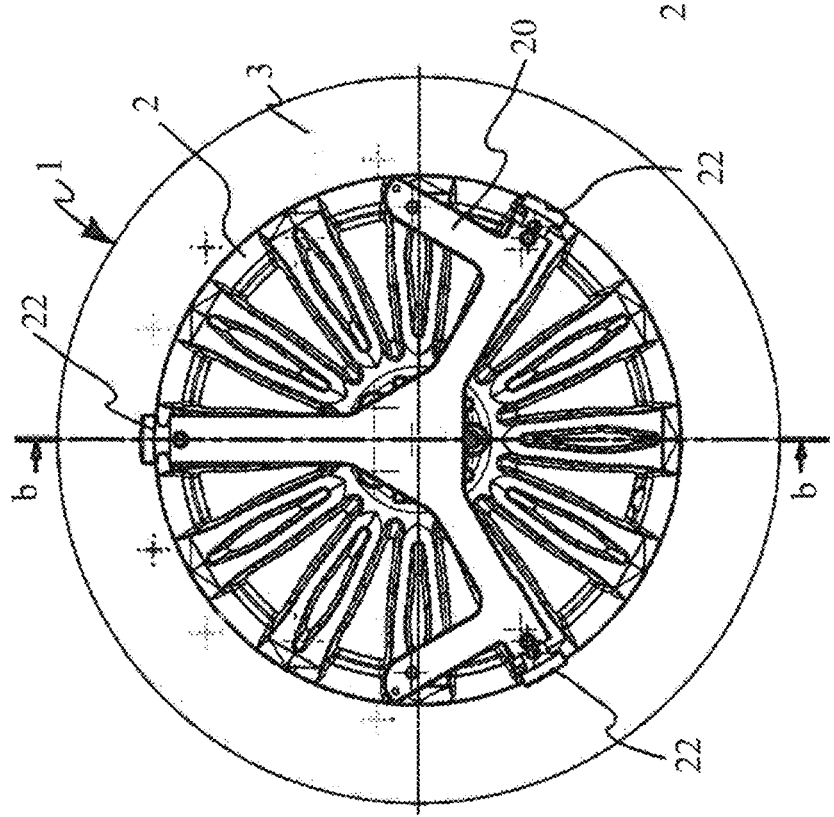
FIG. 4a   FIG. 4b   FIG. 4c   FIG. 4d

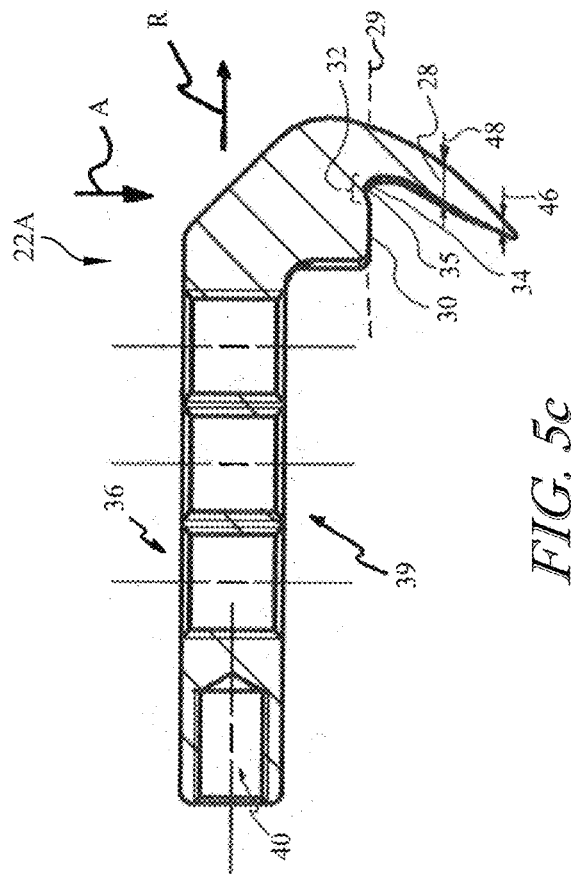
FIG. 5c
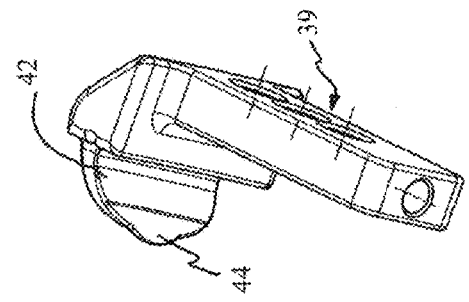
FIG. 5f
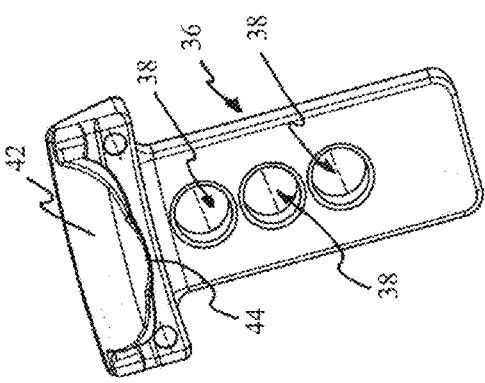
FIG. 5e
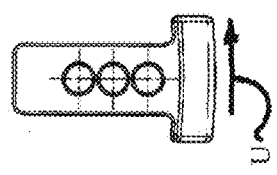
FIG. 5b
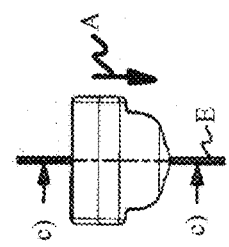
FIG. 5d
FIG. 5a

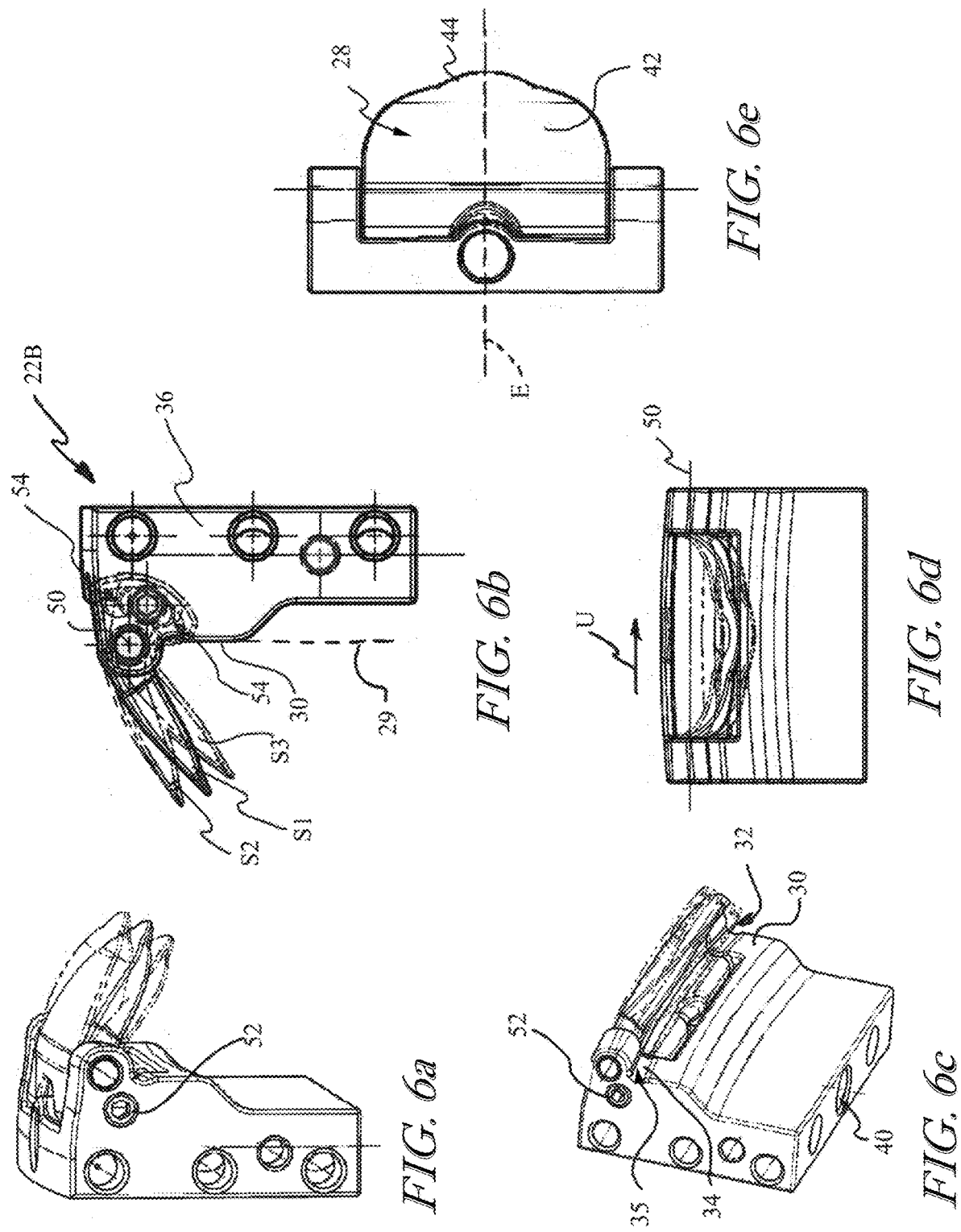

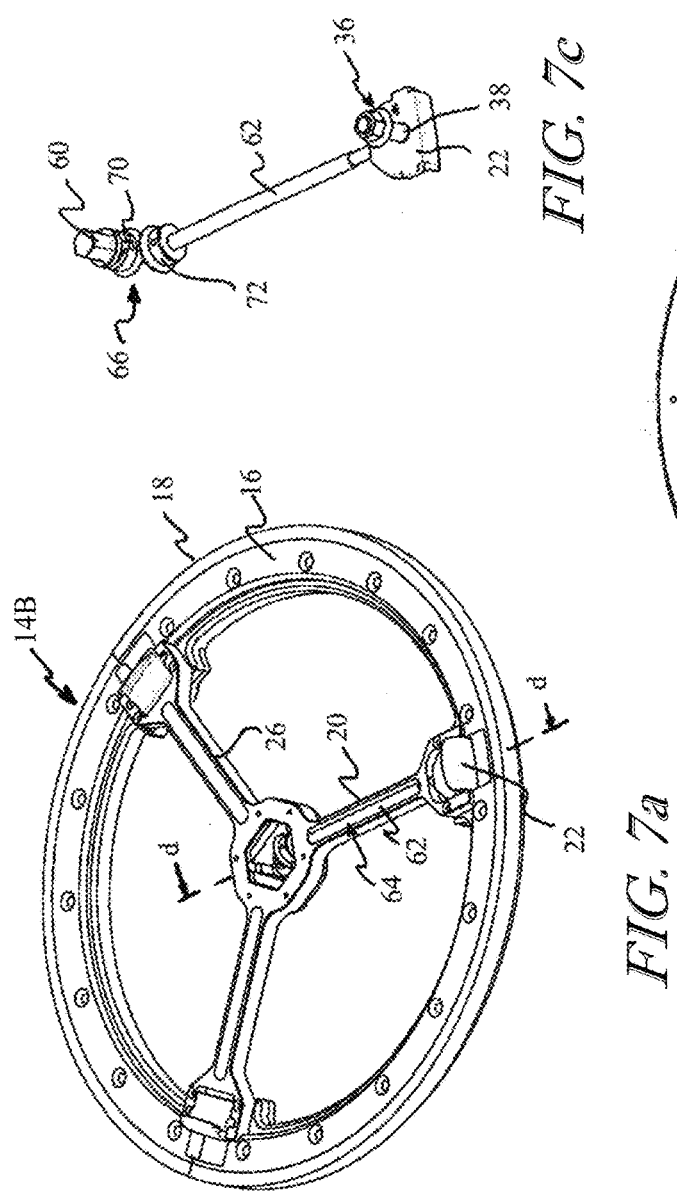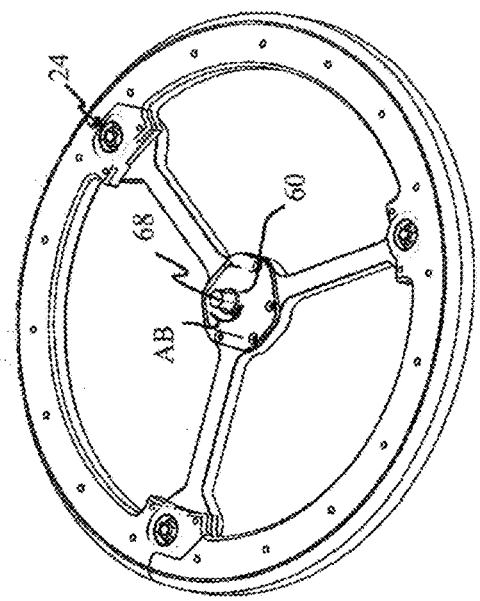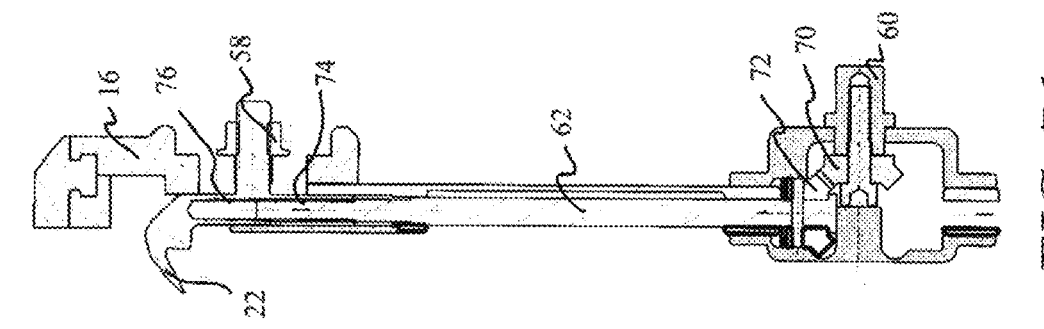

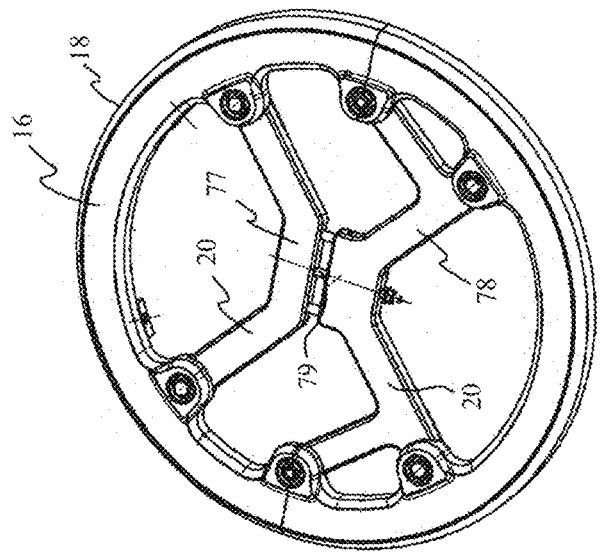
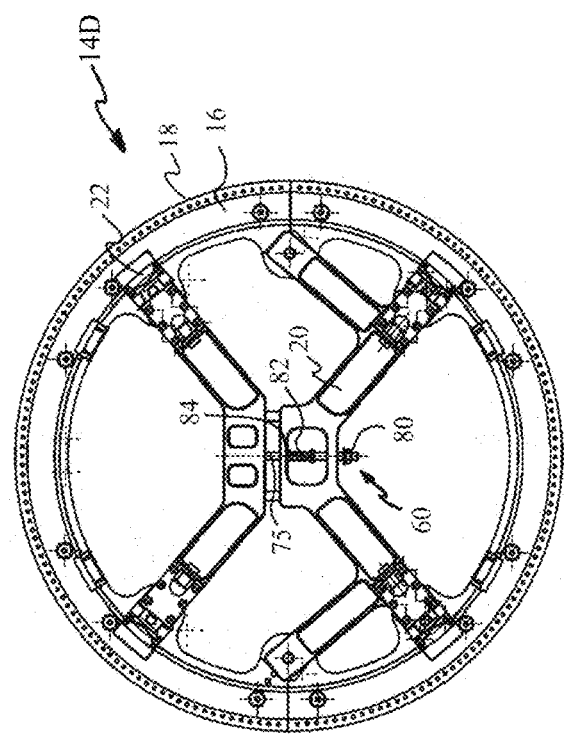
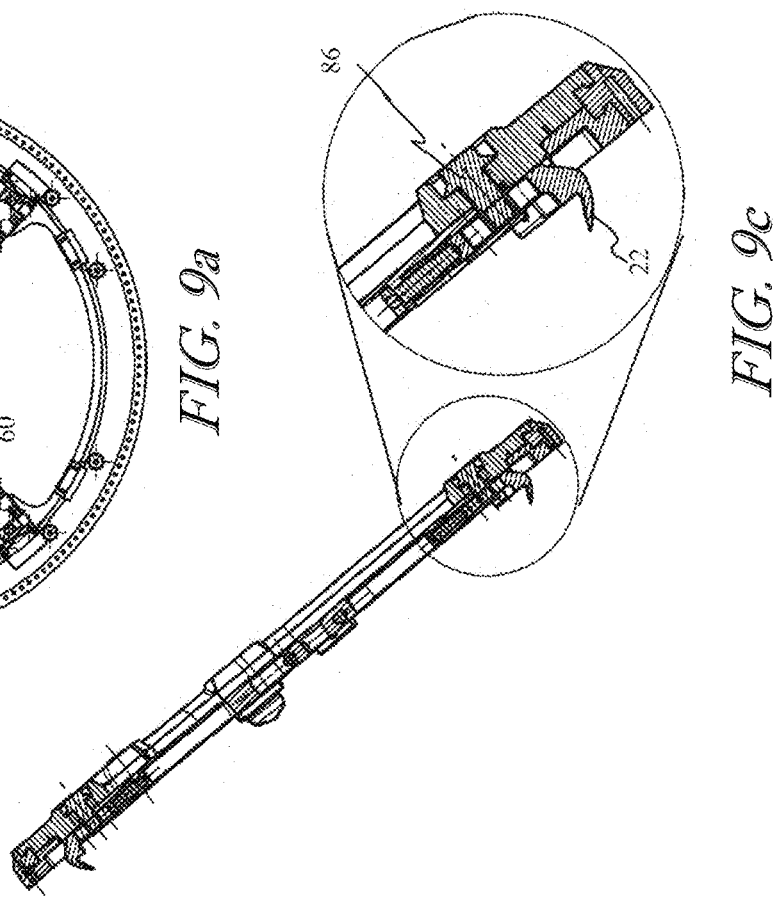
FIG. 9b
FIG. 9a
FIG. 9c

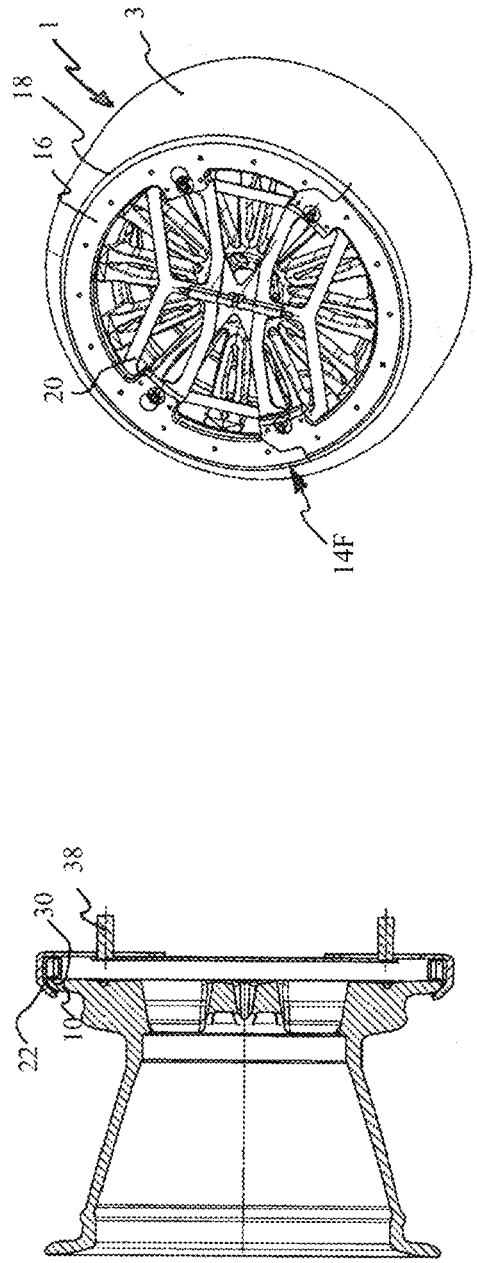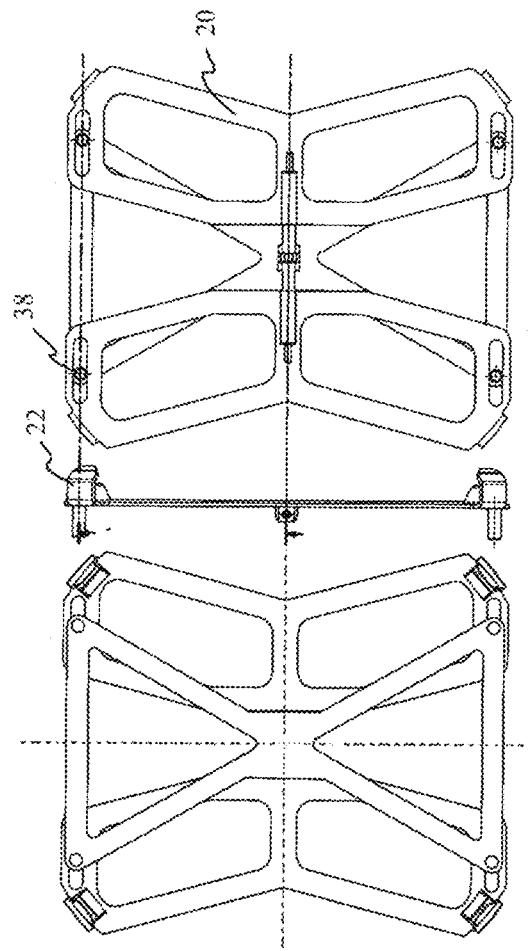
FIG. 12a  FIG. 12b  FIG. 12c

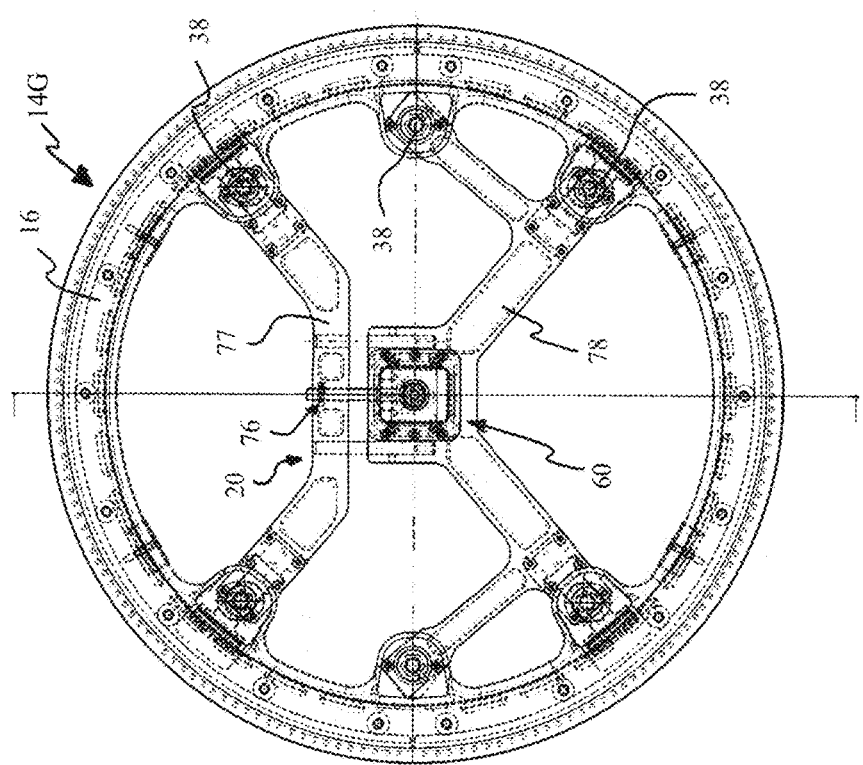
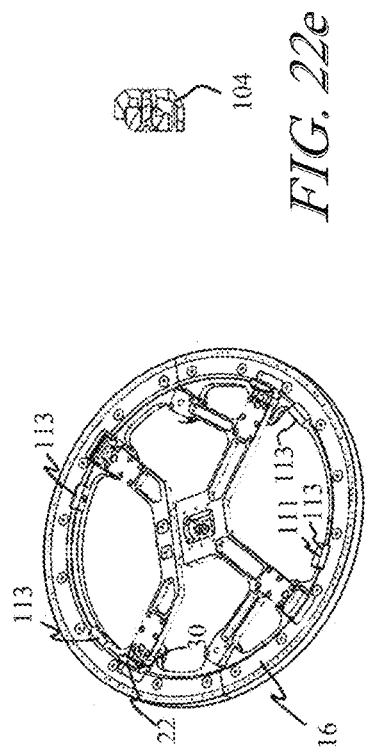
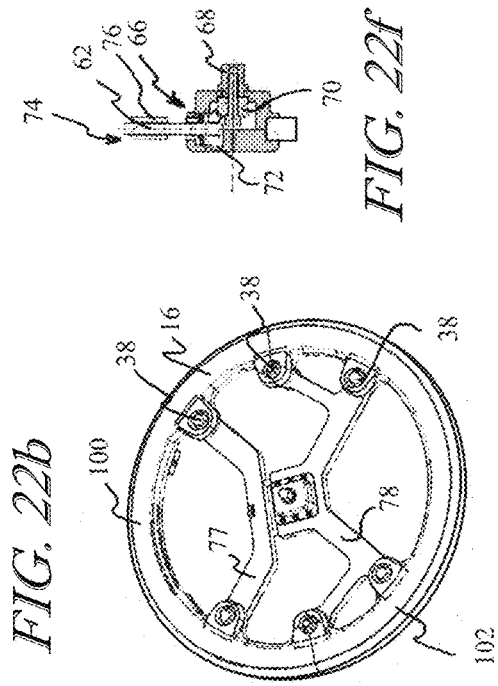
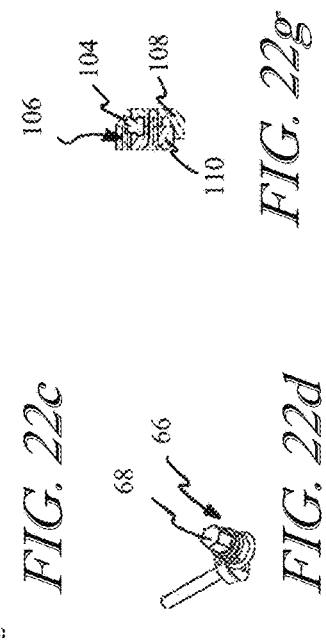
FIG. 22a
FIG. 22b
FIG. 22c
FIG. 22d
FIG. 22e
FIG. 22f
FIG. 22g

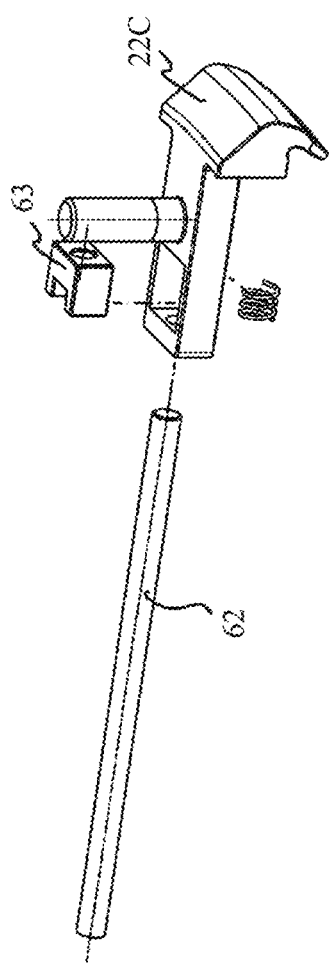
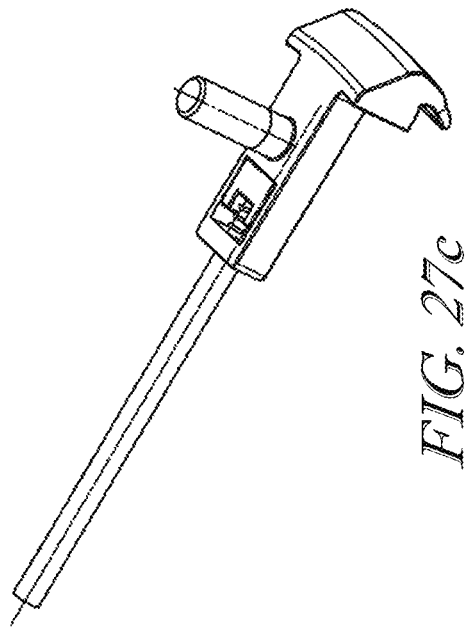
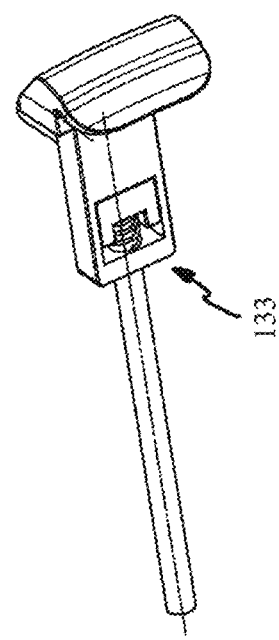
FIG. 27a
FIG. 27b
FIG. 27c

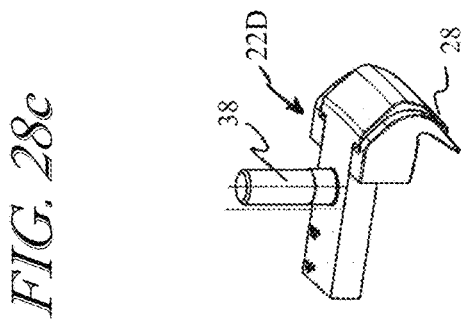
FIG. 28c
FIG. 28f
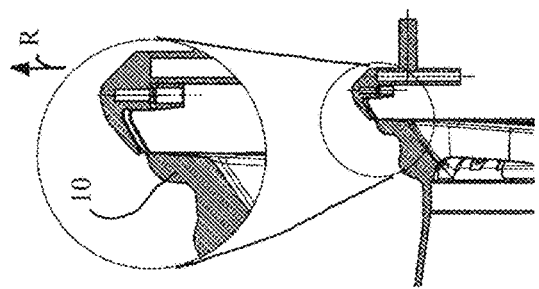
FIG. 28b
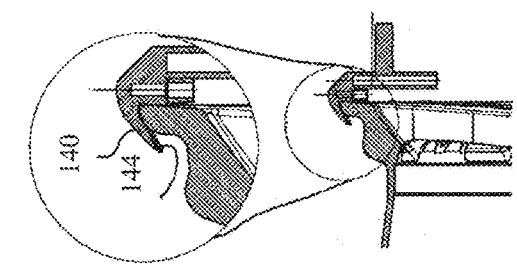
FIG. 28e
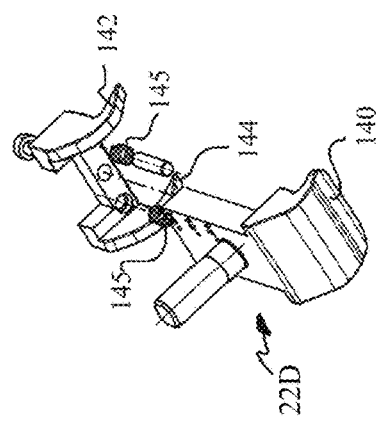
FIG. 28a
FIG. 28d

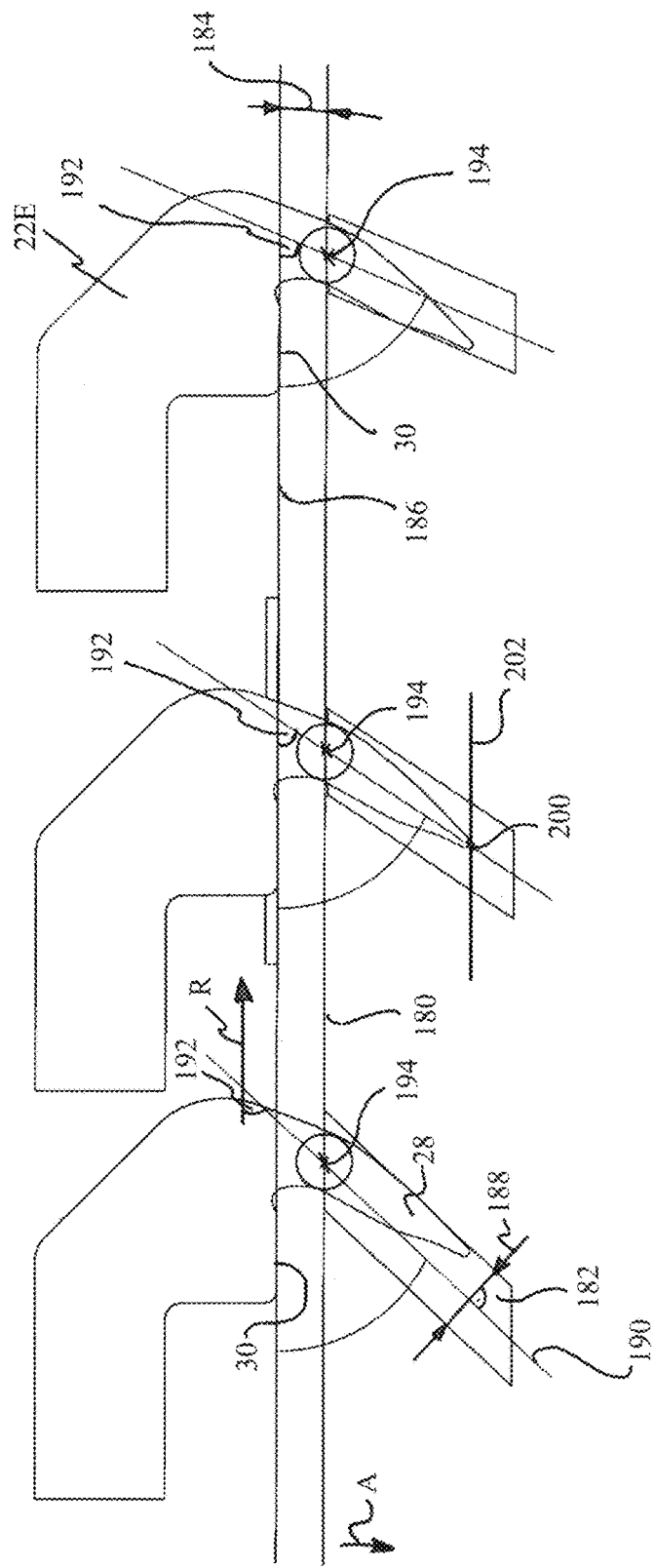
*FIG. 31a*  *FIG. 31b*  *FIG. 31c*
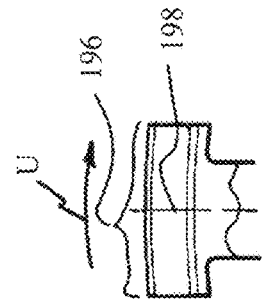
*FIG. 31d*
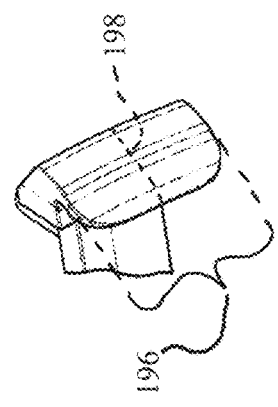
*FIG. 31e*

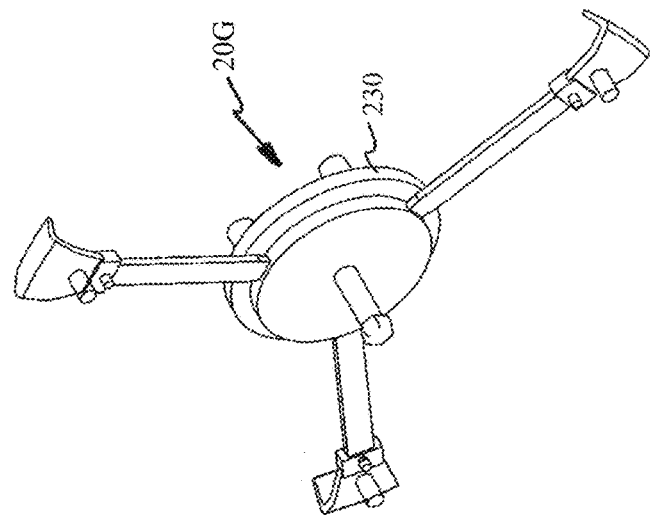
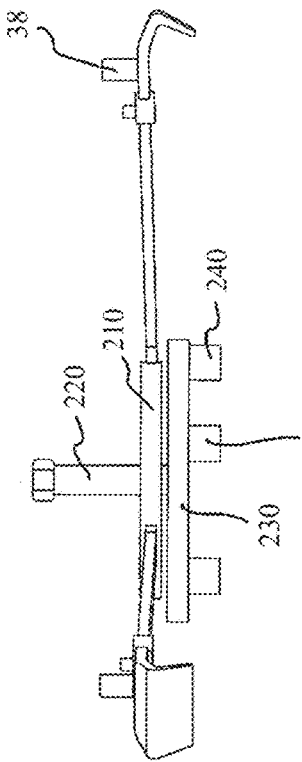
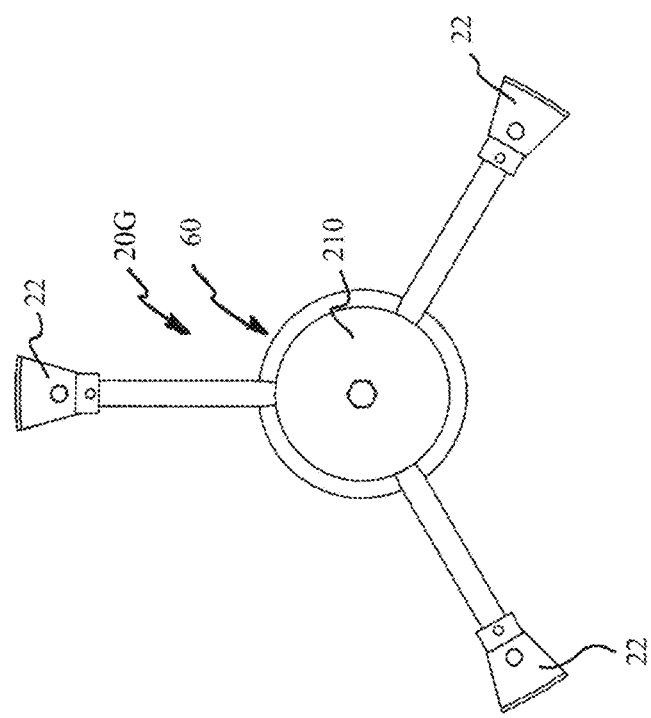
FIG. 33b
FIG. 33c
FIG. 33a

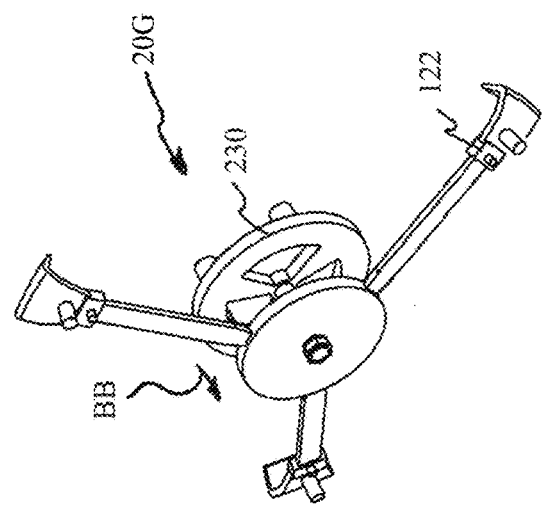
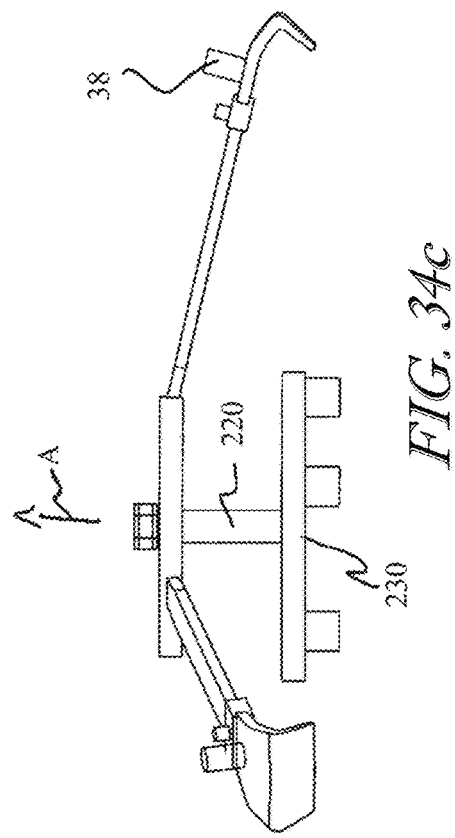
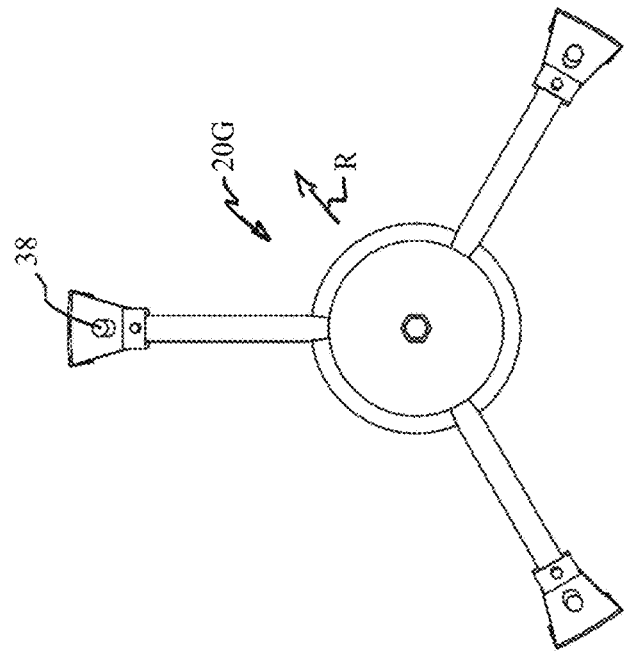
FIG. 34b
FIG. 34c
FIG. 34a

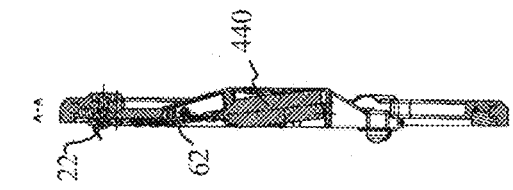
FIG. 47e
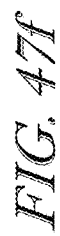
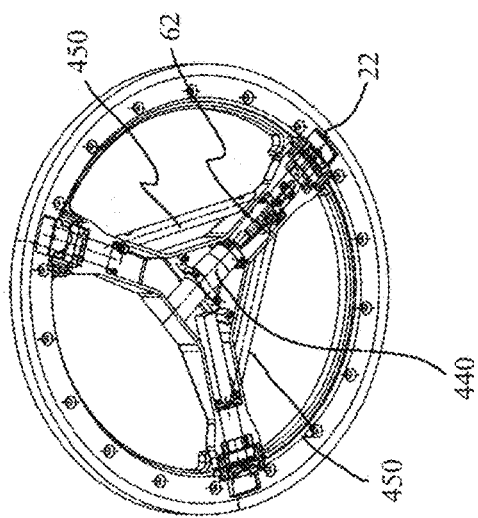
FIG. 47f
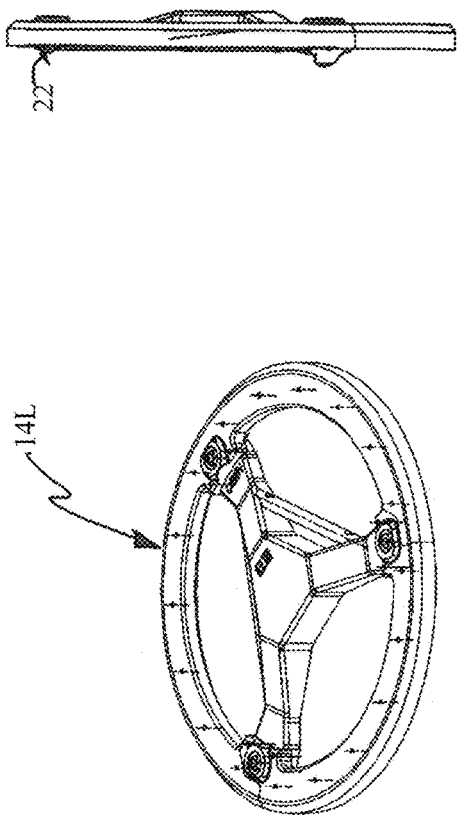
FIG. 47c
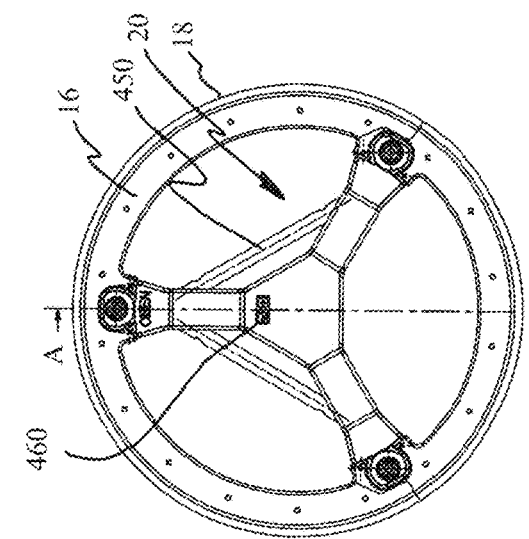
FIG. 47d
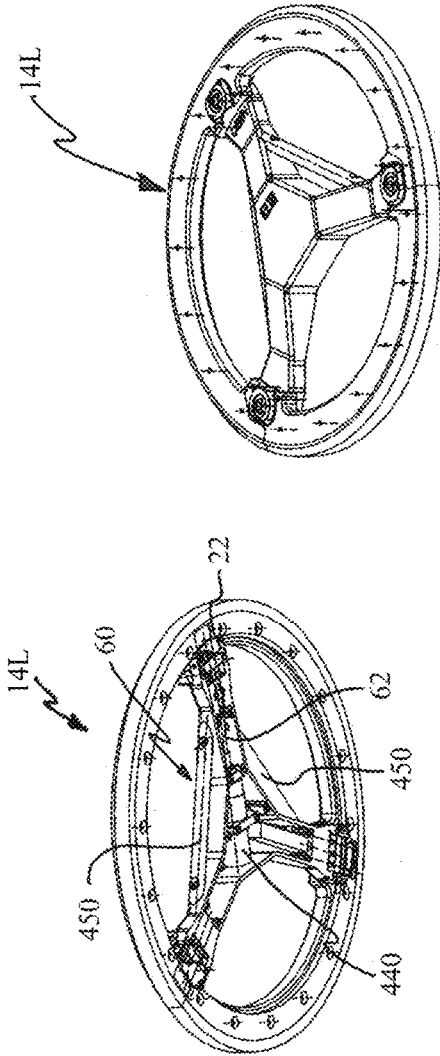
FIG. 47a
FIG. 47b

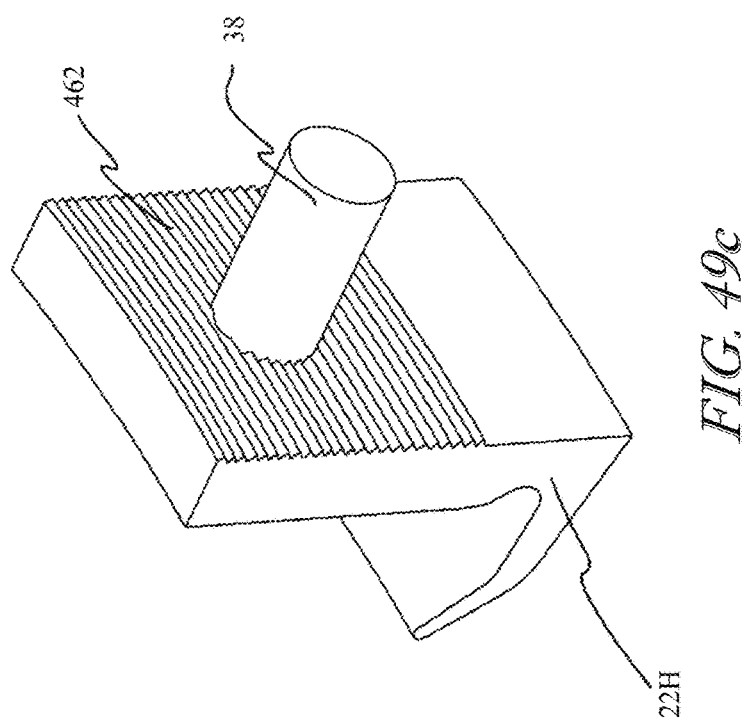
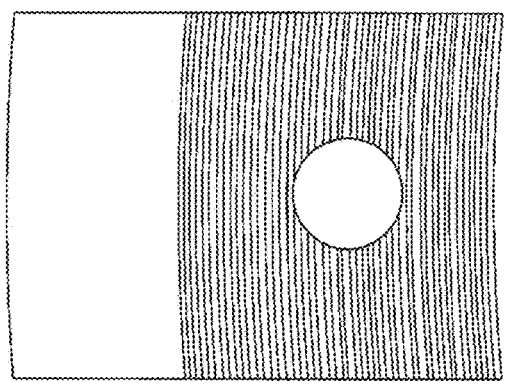
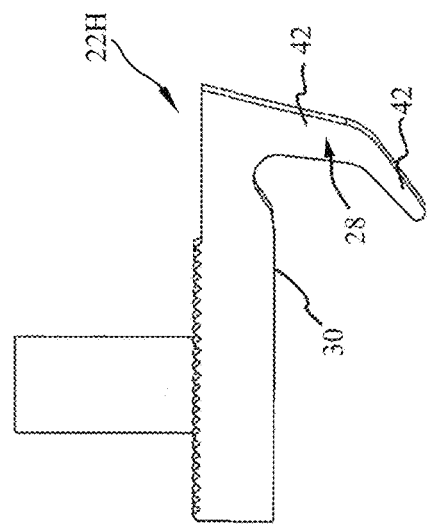
FIG. 49a
FIG. 49b
FIG. 49c

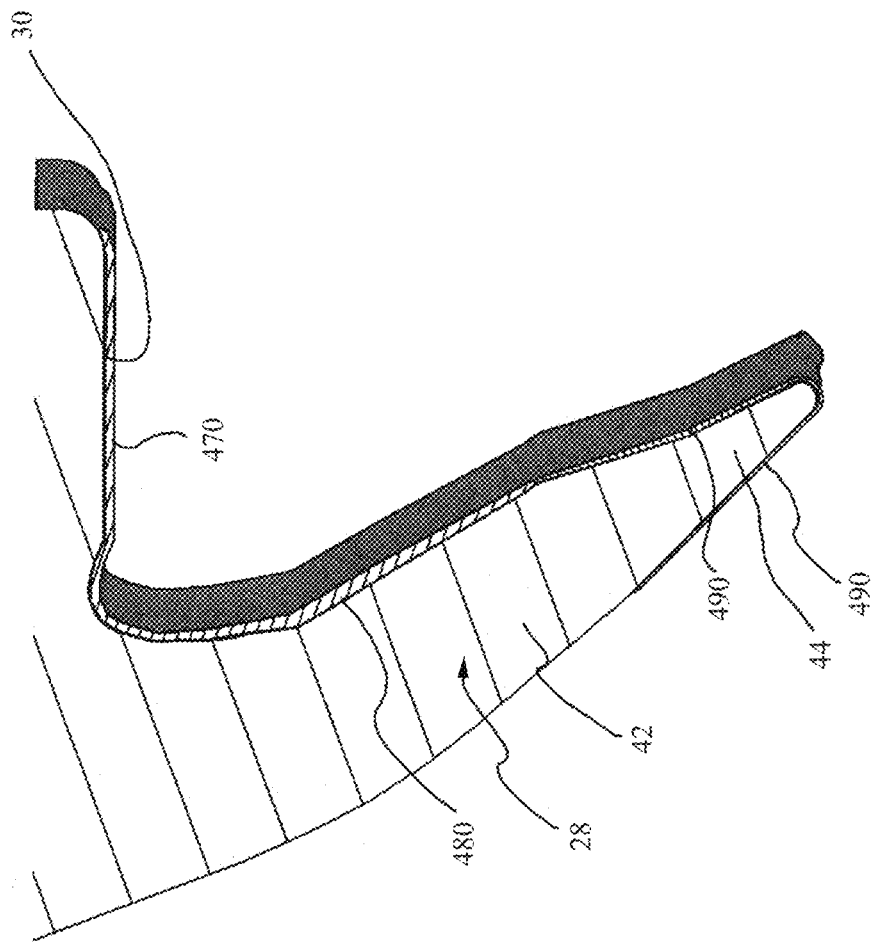
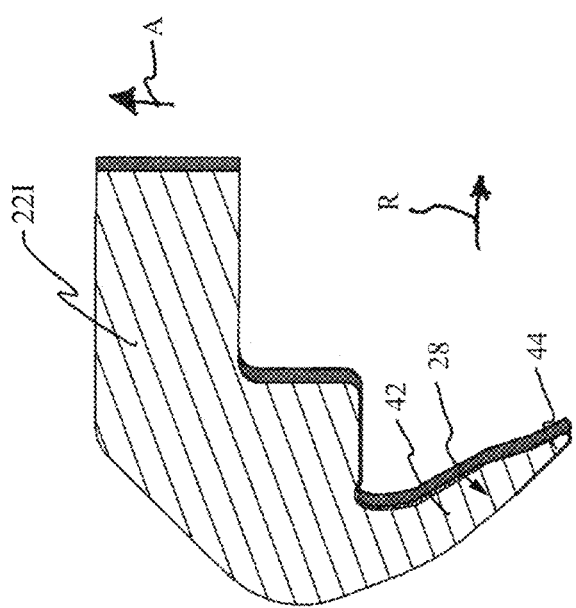
FIG. 50a
FIG. 50b

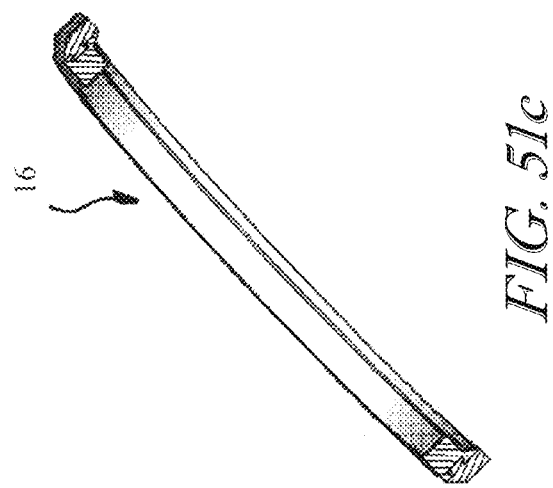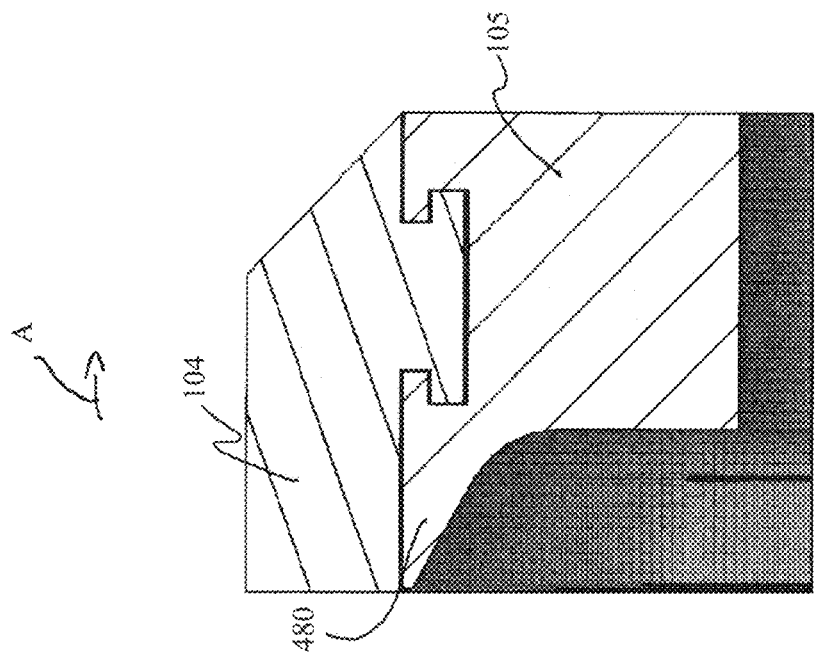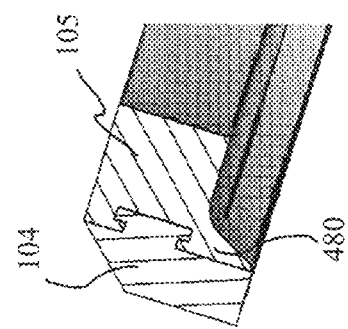
FIG. 51c
FIG. 51b
FIG. 51a

EMERGENCY WHEEL

CROSS REFERENCE TO RELATED APPLICATIONS

This is a national stage entry of International Patent Application No. PCT/EP2019/051265, filed Jan. 18, 2019, which claims the benefit of and priority to German Patent Application No. 10 2018 101 355.8, filed Jan. 22, 2018, the disclosures of which are both expressly incorporated herein by reference in their entireties.

FIELD

The present invention relates to a clamping device for an attachment for a vehicle wheel for enabling a driving operation with a restricted tire function.

The present invention also relates independently thereof to an attachment for a vehicle wheel for enabling a driving operation with a restricted tire function.

BACKGROUND AND SUMMARY

Vehicle wheel in the present case means a vehicle wheel of a motor vehicle, in particular a passenger car. Driving operation with a restricted tire function means here a driving operation in which the tire is not operable with its given properties in normal road conditions and a normal tire state. A journey with a flat tire can be meant thereby, for example, or also operation of the vehicle on ice and packed snow. A preferred application of the present invention is enabling a journey with a flat tire.

In the case of an attachment affixed to the vehicle wheel, axial direction means here the direction of the rotary axis of the vehicle wheel. Axially outside means the direction away from the vehicle, and axially inside means the direction towards the vehicle or towards the rim of the vehicle wheel.

Radial direction means the direction orthogonal to this rotary axis of the vehicle wheel. Viewed from the rim of the vehicle wheel, the tire of the vehicle wheel is thus arranged radially on the outside. Radially on the inside is a bolt pattern of the rim, for example, with a center opening of the vehicle wheel, the bolt pattern of the vehicle wheel meaning here the arrangement of the holes in the rim that are provided to receive wheel bolts or stay bolts, and the center opening.

Circumferential direction means the direction along the circumference of the vehicle wheel, thus along its tire tread, or along a running surface of the attachment.

The object of the present invention is to provide a clamping device for an attachment on the one hand, by means of which the attachment can be fastened simply and quickly, and yet securely, to the vehicle wheel.

The object of the present invention is to provide a clamping device for an attachment on the one hand, by means of which the attachment can be fastened simply and quickly, and yet securely, to the vehicle wheel.

This object is achieved by the clamping devices according to the invention.

The object of the present invention is also to provide an attachment, which can be fastened simply and quickly, and yet securely, to the vehicle wheel.

This object is achieved by the attachments according to the invention.

A first clamping device according to the invention for tensioning an attachment on a rim of a vehicle wheel, wherein the attachment is designed to enable a driving operation with a restricted tire function in an operating state in which it is fastened to the vehicle wheel, is designed so that the clamping device, in a section through a section plane running in a radial and axial direction, comprises a rear grip section designed in the manner of a hook, which protrudes in an axial direction and runs radially inwards, for positive engagement behind the rim flange, wherein the rear grip section transitions into a contact surface, which lies in particular in a plane running in a radial and/or circumferential direction and is designed and arranged to contact the rim flange from axially outside. A clamping device of this kind is inexpensive to manufacture and ensures a defined and secure contact of the attachment with the rim, in particular the rim flange.

Another clamping device according to the invention, which is independent of the first clamping device according to the invention, is designed in such a way that the clamping device comprises a rear grip section designed in the manner of a hook for positive engagement behind the rim flange, wherein the rear grip section is pivotable about an axis, which runs tangentially to the circumferential direction, relative to the other clamping device and can be positioned in at least a first position and a second position pivoted about the axis to the first position, in particular by a frictional tensioning and/or positive locking, wherein the rear grip section is designed in the manner of a hook protruding in an axial direction and running radially inwards in the first position in a section through a section plane running in a radial and axial direction, in particular wherein the clamping device has a contact surface, which lies in particular in a plane running in a radial and/or circumferential direction and which is designed and arranged to contact the rim flange from axially outside, in particular wherein the rear grip section is pivotable relative to the contact surface. A clamping device of this kind can be adaptable to different tires and rim geometries, for example, due to the pivotability of the rear grip section. In particular, embodiments with the contact surface permit a precisely defined and secure contact with the rim flange. With a clamping device of this embodiment it is also possible to pivot the rear grip section subsequently after this was inserted between tire and rim flange, in order to increase the security of the fastening, for example.

In the case of the clamping devices according to the invention, it can be provided that the clamping device comprises a locking means, which is arranged and designed to engage in a corresponding receptacle on the pivotable rear grip section. The locking means can be in particular a screw, in particular a grub screw.

The positive locking can also be provided by a locking means which is arranged on the rear grip section and engages in a corresponding receptacle on the other clamping device.

The clamping devices according to the invention can be connected detachably to an attachment or also be implemented integrally with this as part of the attachment. Part of the invention is also an attachment, which is designed to enable a driving operation with a restricted tire function in an operating state in which it is fastened on the vehicle wheel, wherein the attachment comprises at least one of the inventive clamping devices. An attachment of this kind does not necessarily have to correspond to the inventive attachments described further in detail later. On the contrary, it is within the meaning of the invention if the inventive clamping devices are used with an attachment that can be designed as an annulus disc, for example, with an external tread. The use in particular of the inventive clamping devices in combination with the embodiments of the inventive attachments described later is preferred, however.

Part of the present invention is in particular an attachment, in particular in the form of a circular ring, which comprises at least 2, in particular at least 3 of the inventive clamping devices, wherein these are arranged movably, in particular in a radial direction, movably on the attachment, wherein the tread of the attachment comprises a removable segment, which on assembly of the attachment can be directed towards the road and following rotation of attachment mounted on the vehicle wheel can be connected to the other attachment.

In the case of the clamping devices according to the invention, it can be provided that the rear grip section transitions into the contact surface in a transition region, wherein the surface of the transition region between the rear grip section and the contact surface has a recessed section, which is arranged offset axially outwards in an axial direction relative to the contact surface. This permits a very precise and exactly defined contact of the clamping device on the rim flange. The attachment can hereby be mounted more precisely on the vehicle wheel or on the rim.

In the case of the clamping devices according to the invention, it can be provided that the clamping device has a fastening section to connect the clamping device to the attachment, in particular wherein the fastening section is arranged lying radially inwards from the rear grip section and/or from the contact surface, in particular wherein the fastening section has at least one, in particular several, fastening devices, which are designed in particular as screw receptacles or threaded bolts, which are designed and arranged to secure the clamping device via the fastening section, in particular by means of a screw or a nut, on the attachment, clamping it in an axial direction against play. The attachment can be fastened hereby in a particularly secure and precisely defined manner to the vehicle wheel.

In the case of the clamping devices according to the invention, it can be provided that the clamping device comprises a coupling section, in particular which has a receptacle for a coupling means, in particular a tie rod or a threaded rod. The coupling section can serve to couple the clamping device, in particular via the coupling means, to a tensioning device of the attachment.

In the case of the clamping devices according to the invention, it can be provided that the rear grip section of the clamping device, if applicable when located in the first position (in the case of the clamping devices with the pivotable rear grip section), has a retaining section and an insertion section in the view radially inwards. The retaining section is designed here to take up clamping forces. The insertion section is designed in turn to simplify an insertion of the rear grip section between rim flange and a tire side wall adjacent to the rim flange. The insertion section is arranged axially inside relative to the retaining section. The arrangement of the insertion section lying axially inside is related here to the envisaged position of the clamping device on the attachment. The provision of an insertion section and a retaining section on the rear grip section can enable the rear grip section to be designed so that the insertion section facilitates a simple insertion of the rear grip section between rim flange and tire side wall, while the retaining section can be implemented with a stronger material thickness, for example, in order to take up greater forces. The clamping device can thereby have a high stability with easily possible engagement behind the rim flange at the same time.

In the case of the clamping devices according to the invention, it can be provided that the insertion section has a smaller material thickness than the retaining section and/or that the insertion section has a material thickness that decreases axially inwards, in particular continuously. The insertion of the clamping device or the rear grip section between the rim flange and the tire side wall can be designed especially simply hereby.

In the case of the clamping devices according to the invention, it can be provided that the retaining section is extended further in a circumferential direction than the insertion section. An insertion section that is extended as little as possible in a circumferential direction can make the attachment of the clamping device between rim flange and tire side wall easier. After the attachment, the rear grip section adjoining the insertion section can be guided in a simple manner behind the rim flange, and the retaining section, which is extended further in a circumferential direction, can adequately take up forces, in order to fasten the attachment securely on the vehicle wheel.

In the case of the clamping devices according to the invention, it can be provided that the retaining section has a section tapering axially inwards in its circumferential extension and/or that the insertion section has a section tapering axially inwards in its circumferential extension, in particular wherein the insertion section is designed tapering axially inwards in its circumferential extension over its entire extension. The insertion section and/or the retaining section can thus widen axially outwards in their circumferential extension. A tapered shape axially inside simplifies the insertion, while the part of the retaining section lying axially outside that extends further in a circumferential direction can adequately take up forces for secure fastening.

In the case of the clamping devices according to the invention, it can be provided that, if applicable when the rear grip section is located in the first position, the insertion section has a surface on the rim flange side that runs, viewed in the section plane running in a radial and axial direction, at a flatter angle relative to the axial direction than a surface of the retaining section on the rim flange side, in particular wherein the angle of the insertion section is smaller by at least 5°, in particular by at least 7°. Due to a flat inclination of the surface of the insertion section on the rim flange side relative to the axial direction, this can be inserted easily even in the case of tires that rest tightly against the rim flange. A steep angle of the retaining section, on the other hand, can improve the security of the retention on the rim flange.

In the case of the clamping devices according to the invention, it can be provided that the surface of the rear grip section on the rim flange side, viewed in the section plane running in a radial and axial direction, comprises at least one section running straight, in particular several sections running straight at different angles relative to the axial direction.

In the case of the clamping devices according to the invention, it can be provided that, if applicable when the rear grip section is located in the first position, the surface of the insertion section on the rim flange side, viewed in the section plane running in a radial and axial direction, runs relative to the axial direction at an angle of at least 10°, in particular at least 15° and/or that the surface of the retaining section on the rim flange side, viewed in the section plane running in a radial and axial direction, runs relative to the axial direction at an angle of at least 16°, in particular at least 20°, in particular at least 25°.

In the case of the clamping devices according to the invention, it can be provided that, if applicable when the rear grip section is located in the first position, the surface of the insertion section on the rim flange side, viewed in the section plane running in a radial and axial direction, runs relative to the axial direction at an angle of at most 40°, in particular at most 35°, in particular at most 30°, in particular at most 25° and/or that the surface of the retaining section on the rim flange side, viewed in the section plane running in a radial and axial direction, runs relative to the axial direction at an angle of at most 50°, in particular at most 45°, in particular at most 40°, in particular at most 35°.

The upper and lower limits of the angles just described represent variants that offer an advantageous compromise between secure retention and easy insertability of the rear grip section.

In the case of the clamping devices according to the invention, it can be provided that the clamping device comprises a securing means, which is arranged on the clamping device in particular offset in a circumferential direction to the rear grip section and pivotably about a pivot axis that runs in particular tangentially to the circumferential direction, wherein the securing means comprises a positive-locking section, which is designed to be brought into a positive rear engagement with the rim flange by pivoting the securing means. The rear grip section of the clamping devices can serve to be able to fasten the attachment in a simple and reliable manner on the rim flange, wherein high attention can be placed on the easy insertability of the rear grip section between rim flange and tire. Although the clamping devices according to the invention can fasten an attachment adequately on the rim flange via the rear grip section, it can be advantageous, in particular in the case of extreme loads, if the clamping devices according to the invention additionally comprise the securing means. This securing means is designed to be brought by pivoting of the securing means into a positive rear engagement with the rim flange. The fastening can be configured yet more securely hereby. By pivoting the securing means or its positive-locking section, this can engage behind the rim flange in a different manner, for example, than the rear grip section of the clamping device. Additional securing in a radial direction can be achieved hereby on the one hand, and on the other hand, the positive-locking section of the securing means can be designed, for example, to provide a greater degree of securing in an axial direction, as it can be pivoted deeper behind the rim flange and can also be better adapted to the contour of the rim flange. Since the attachment is already fixed by the rear grip section relative to the rim, the positive-locking section can also be pivoted behind the rim flange against some resistance of the tire. In other words, the shape of the positive-locking section of the securing means can be optimised for the positive contacting and the secure engagement behind the rim flange, while the shape of the rear grip section of the clamping device can be optimised for easy insertion.

In the case of the clamping devices according to the invention, it can be provided that the positive-locking section of the securing means comprises a contact section, which is designed to contact the rim flange on its side facing the tire, wherein the contact section is shaped corresponding to the contour of the rim flange, in particular wherein the contact section is shaped according to the contour of the rim flange of a J rim according to DIN 7817. In other words, the contact section is designed as a counterpart to the internal contour of the rim, in particular of a J rim. The contact section of the securing means can thus lie flat and offer an advantageous securing in an axial direction in particular.

In the case of the clamping devices according to the invention, it can be provided that the positive-locking section of the securing means has a greater material thickness than the rear grip section of the clamping device. The forces that can be taken up by the clamping device are increased hereby. At the same time, the clamping device remains insertable in a simple manner due to the rear grip section and the positive-locking section of the securing means designed to take up high forces can be pivoted following application and fastening behind the rim via the rear grip section, in order then to be able to take up high forces.

In the case of the clamping devices according to the invention, it can be provided that the clamping device comprises a multipart rear grip section with subsections that are movable relative to one another in a radial direction, in particular wherein a first subsection of the rear grip section is preloaded relative to a second subsection of the rear grip section in a position that is offset, in particular radially inwards. The clamping device can hereby nevertheless grip the rim flange virtually in the not yet tensioned state, as the preloaded first subsection of the rear grip section can rest gripping the rim flange without being tensioned. In the case of these clamping devices according to the invention, it can be provided that the clamping device has a limit stop, which is designed so that the first subsection cannot be brought into a position offset radially outwards relative to the second subsection. This can make possible a simple placement of an attachment provided with the clamping device on the rim flange. Following placement, the second subsection or both subsections of the rear grip section can be tensioned.

The clamping devices can have fluting in particular in the region of their fastening section, in particular on their axial outer side. Contact with the mounting and/or tread section can be improved hereby.

In the region of their rear grip section in particular, which is provided for contacting the rim, and/or in the region of their contact surface, the clamping devices can have a damping surface, in particular in the form of a rubber coating of the surface.

In the case of the clamping devices according to the invention, it can be provided that the rear grip section is designed such that, if applicable when it is located in the first pivot position, the material of the rear grip section lying axially inside a reference plane lies completely in an imaginary corridor, wherein the reference plane is arranged at a distance of 4, 6 or 7 mm from a contact plane that coincides in particular with the contact surface, wherein the contact plane is a plane running in a radial direction and circumferential direction in which the axially outer contact point of the rim flange with the clamping device lies, wherein the imaginary corridor has a width of 12 mm, in particular 10 mm, in particular 9 mm, in particular 8 mm, in particular 7 mm, in particular 6 mm, in particular 5 mm, in particular 4 mm, and its center line runs at an angle 192 of at least 42°, in particular at least 45°, in particular at least 47°, in particular at least 49°, in particular at least 51°, in particular at least 53°, in particular at least 55°, and/or at most 72°, in particular at most 69°, in particular at most 67°, in particular at most 65°, in particular at most 63°, in particular at most 61°, in particular at most 59° to the radial direction R, in particular the center line can run at an angle of 57°, wherein the width and the angle of the center line are defined with reference to a view of a plane running in a radial and axial direction. Clamping devices designed in such a way are sufficiently stable and nevertheless permit simple insertion between tire and rim flange.

In the case of the clamping devices according to the invention, it can be provided that the center line of the imaginary corridor runs, in a view of the plane running in a radial and axial direction, through the material center point of the rear grip section in its section with the reference plane and/or that the center line of the imaginary corridor runs, in a view of the plane running in a radial direction R and axial direction A, through the material center point of the rear grip section in its section with a plane parallel to the reference plane in which the axially inner end of the rear grip section lies. Clamping devices designed in such a way are sufficiently stable and nevertheless permit simple insertion between tire and rim flange.

In the case of the clamping devices according to the invention, it can be provided that an, in particular mechanical, indication device is provided, via which it is recognisable whether the clamping device is in rear engagement, preferably whether the clamping device is in rear engagement in the provided position, with the rim flange, in particular wherein the indication device comprises a spring-loaded element, which is loaded in the region of the rear grip section into the envisaged position of the rim flange in such a way that on rear engagement of the rim flange by the clamping device, it is displaced from this position by the rim flange and preferably projects on the side of the clamping device lying axially and/or radially outside beyond the latter, so that it is recognisable whether the rim flange is engaged behind as envisaged.

The spring-loaded element of the indication device can extend in particular through the material of the clamping device. In particular, the tensioning direction of the spring-loaded element can be parallel to the course of the retaining section of the clamping device.

An attachment for a vehicle wheel, which comprises a rim and a tire arranged on the rim, is an independent invention, wherein the attachment is designed to enable a driving operation with a restricted tire function in an operating state in which it is fastened on the vehicle wheel, wherein the attachment comprises a tread section, which is in particular constructed in multiple parts in a circumferential direction in particular and which has a tread of the attachment for contacting the road, wherein the attachment furthermore comprises a mounting section which, when the attachment is fastened to the vehicle wheel in the operating state, is arranged lying radially inside the tread, and in particular is designed detachably from at least a part of the tread section, in particular the entire tread section, and wherein the attachment comprises at least two, in particular at least three, in particular at least four clamping devices, wherein the clamping devices are designed to engage behind a section, in particular a rim flange, of the rim, in particular wherein at least one, in particular several clamping devices, is or are designed according to the embodiments just described, wherein the attachment comprises a tensioning device, via which the at least one clamping device is movable radially inwards in a tensioning movement relative to the mounting section, in particular wherein the clamping device comprises a coupling section with which it is coupled to the tensioning device, wherein during the tensioning movement of the clamping device, the movement of the coupling section runs with respect to the mounting section in a purely translational manner, in particular exclusively directed radially inwards, in particular wherein at least two, in particular at least three, in particular at least four clamping devices are movable, uniformly and motion-coupled to one another, radially inwards in a tensioning movement relative to the mounting section, in particular wherein the clamping devices each comprise a coupling section with which they are coupled to the tensioning device, wherein during the tensioning movement of the clamping devices, the movement of the coupling sections runs with respect to the mounting section in a purely translational manner, in particular exclusively directed radially inwards. The clamping devices can have in particular a rear grip section, which is rigidly connected to the coupling section. In this case the relative movement of the rear grip section with regard to the mounting section can correspond to the relative movement of the coupling section with regard to the mounting section. A connection by way of a flexible segment, for example a spring sheet, is also conceivable, however.

It is meant here by uniformly and motion-coupled to one another that the movement of the motion-coupled clamping devices is identical from the viewpoint of the amount and the nature of the movement, that the coupling sections of the clamping devices moving uniformly and motion-coupled to one another thus move radially inwards at the same speed, for example.

Another independent invention is an attachment for a vehicle wheel, which comprises a rim and a tire arranged on the rim, wherein the attachment is designed to enable a driving operation with restricted tire function in an operating state in which it is fastened on the vehicle wheel, wherein the attachment comprises a tread section, constructed in multiple parts in a circumferential direction in particular, which has a tread of the attachment for contacting the road, wherein the attachment furthermore comprises a mounting section which, when the attachment is fastened in the operating state on the vehicle wheel, is arranged lying radially inside the tread, and in particular is designed detachably from at least a part of the tread section, in particular the entire tread section, and wherein the attachment comprises at least two, in particular at least three, in particular at least four clamping devices, wherein the clamping devices are designed to engage behind a section, in particular a rim flange, of the rim, in particular wherein at least one, in particular several clamping devices is or are designed according to the embodiments just described, wherein the mounting section comprises at least two segments movable relative to one another, each with at least one clamping device, and the attachment comprises a tensioning device, via which the two segments movable relative to one another are movable in a tensioning movement relative to one another, wherein the tensioning movement of the segments with regard to one another is translational, in particular purely translational, and directed towards one another, in particular wherein at least one, in particular both, of the segments of the mounting section movable relative to one another comprises two clamping devices, which are arranged on the movable segment of the mounting section such that their relative position to one another does not change during the tensioning movement.

The mounting section is a part of the attachment that is designed to be fastened to the vehicle wheel before the tread section. In this case the tread section can already be connected to the mounting section. On affixing of the attachment, first the mounting section is fastened to the vehicle wheel and then the tread section is fastened or brought into its final position and fastened. With the attachment according to the invention it is thus possible to fasten the mounting section first.

As will be explained in detail further below, the tread section can be designed to be detachable from the mounting section. In particular, the attachment is designed so that first the mounting section is fastenable without the tread section to the vehicle wheel and after the mounting section has been fastened on the vehicle wheel, the tread section is applied to the vehicle wheel with mounting section and fastened to this. The tread section can also be connected, in particular non-detachably, and displaceably and/or pivotably to the mounting section. Upon assembly, the attachment can be fastened to the rim of the vehicle wheel in a first step by means of the mounting section. If applicable, the attachment, in particular the tread section, can then be fastened additionally, in particular to the mounting section, and vehicle wheel or the rim of the vehicle wheel.

As already mentioned above, it is preferable if the tread section, seen in a circumferential direction, has at least two segments, which each comprise a portion of the circumference of the tread. In particular, the segments are detachable from one another and/or pivotable and/or displaceable relative to one another. The attachment can be assembled hereby particularly easily on the vehicle wheel. First the mounting segment can be fastened to the vehicle wheel, wherein the mounting section can be assembled easily on the vehicle wheel, even with a flat tire, due to its radial extension, which is smaller than the radial extension of the tread section. Following this, a first segment of the tread section can be fastened to the vehicle wheel or to the mounting section and to the vehicle wheel. The vehicle wheel with the mounting section located thereon and the first segment of the tread section can then be rotated so that the segment of the tread section already located on the vehicle wheel contacts the road. Then the other segment of the tread section can be applied to the vehicle wheel and the mounting section and fastened. The attachment is then fully assembled, the assembly being easily possible without a car jack or lifting platform and with the vehicle wheel attached to the vehicle.

In the end position, the clamping device rests in particular completely with the rear grip section positively on the inside of the rim flange. Due to an optional coating (e.g. rubber coating) of the clamping device on the side facing the rim flange, pressing (coating is compressed) can be achieved between the clamping device and rim flange. The circumferential forces caused by acceleration and braking operations can then be taken up particularly well thereby. A relative movement between the spare wheel and vehicle rim can thus be avoided especially efficiently.

The clamping device has in particular generally a friction-enhancing and/or compressible contact surface, in particular with a coating, for contacting the rim flange.

The mounting section and the tread section can have positioning devices that are in particular coordinated to one another. In particular, the mounting section can comprise at least one, in particular pin-like, guide projection extended in an axial direction and the tread section can comprise at least one guide opening, which is designed complementary to the guide projection, so that when the mounting section is already affixed to the vehicle wheel, the tread section or a portion of the tread section can be placed onto the mounting section in such a way that the guide projection engages in the guide opening and an axial assembly movement of the tread section relative to the mounting section and the vehicle wheel is guided by the engagement of the guide projection in the guide opening. The tread section can hereby be attached to the vehicle wheel in a particularly simple and efficient manner when the mounting section is already fastened on the vehicle wheel. It is also conceivable that the mounting section has one or more guide openings and the tread section has corresponding pin-like guide projections, which are designed complementary to the guide openings. Due to the complementary design of guide opening and guide projection and their extension in an axial direction, the tread section can be placed in a simple manner in an axial direction onto the mounting section, which is already fastened on the vehicle wheel. Both the correct orientation and the correct assembly position of the tread section is virtually predetermined hereby.

It is preferred in particular that one of the arms of the mounting section has guide projections or guide seats for several segments of the tread section.

In particular, the mounting section comprises several arms extending radially outwards, which each have at least one guide projection. It is hereby possible that the guide projections are arranged at particularly suitable positions for attachment of the tread section. It is also conceivable that the struts have guide openings instead of guide projections, to receive guide projections on the tread section.

In the case of the attachments according to the invention, it can be provided that the tread section is detachable, at least in sections, from the mounting section or is movable relative thereto, and that at least one, in particular each, clamping device has a fastening section with a fastening device, via which the tread section is fastenable to the clamping device and can be secured in an axial direction, preferably by a clamping fastening, against play with regard to the clamping device.

In the case of the attachments according to the invention, it can be provided that the tread section is detachable, at least in sections, from the mounting section or is movable relative thereto, and that the mounting section has at least one fastening section with a fastening device, via which the tread section is fastenable to the mounting section and can be secured in an axial direction, preferably by a clamping fastening, against play with regard to the mounting section.

In the case of the attachments according to the invention, it can be provided that the fastening device is designed such that the tread section moves in the axial direction towards the rim upon fastening via the fastening device, in particular wherein the fastening device comprises a screwable connection, upon tightening of which the tread section moves in the axial direction towards the mounting section, in particular wherein the fastening device is electrically and/or pneumatically driven and/or at least supports the movement of the tread section in an axial direction by preloading, in particular spring preloading.

A drive that can be designed as an electric motor can be provided on the attachment. The drive can comprise an energy source that can be implemented as a battery. The drive can be integrated non-detachably into the mounting section or implemented removably. In addition to or instead of the energy source, the drive can also comprise a connection to an external power source, for example a cigarette lighter of the vehicle.

The drive can be used to actuate the fastening device. On actuation of the fastening device, the tread section can move in the axial direction towards the rim during fastening on the mounting section.

The fastening device can also comprise a torque limiter. It is generally advantageous if the fastening device is designed as a screw connection with a defined tightening torque of the screw connection.

In the case of the attachments according to the invention, it can be provided that the tread section comprises several circumferential segments, which each comprise a portion of the circumference of the tread and are each detachable from the mounting section, and that each of the circumferential segments of the tread section can be fastened via at least one fastening device to the same of the movable segments of the mounting section. Due to the fastening of each of the segments of the tread section to the same of the movable segments of the mounting section, additional stability can be given to the overall construction of the attachment.

In the case of the attachments according to the invention, it can be provided that the tread section comprises several circumferential segments, which each comprise a portion of the circumference of the tread and are each detachable from the mounting section, and that the mounting section is implemented in one piece and each of the circumferential segments of the tread section is connected to the mounting section via a respective fastening device at least at two, preferably three points spaced from one another.

In the case of the attachments according to the invention, which comprise the mounting section with at least two segments movable relative to one another, it can be provided that at least one, in particular several, in particular each, clamping device is implemented connected rigidly to the mounting section. In particular, the clamping devices can be implemented integrally with the mounting section. For example, each of the movable segments of the mounting section can comprise one, in particular two, clamping devices, in particular wherein the segments with the clamping devices located thereon can be designed as a one-piece casting or as a stamped sheet metal part.

In the case of the attachments according to the invention, it can be provided that the tensioning device is coupled via a coupling means, in particular in the form of a tie rod or threaded rod, to the clamping device, in particular wherein the mounting section comprises a receiving section for the coupling means, in particular wherein the receiving section covers the coupling means axially outwards at least along a portion of its extension, in particular along its entire extension, and in particular covers it in a circumferential direction, in particular fully encloses it. The tensioning device can be coupled in particular to several clamping devices by way of such coupling means.

In the case of the attachments according to the invention, it can be provided that the tensioning device has a transmission for converting a rotary drive movement of an actuating element, in particular about the axial direction, into the translational tensioning movement, in particular wherein the transmission comprises a drive bevel gear and an output bevel gear for each clamping device and the clamping devices, which are movable relative to the mounting section, are each coupled to the output bevel gear via a coupling means coupled to the output bevel gear, in particular a threaded rod, which engages in a thread on the respective clamping device.

In the case of the attachments according to the invention, it can be provided that the tread is formed by a tread coating, in particular wherein the tread coating has a section that slopes in a radial direction when seen axially outwardly, in particular wherein the tread coating has cavities and/or openings, in particular wherein the openings extend in an axial direction through the material of the tread coating. It can be made possible hereby, for example, that the attachment can be used on vehicles with a small clearance.

In particular, the tread section is implemented with a cast tread coating, in particular of a castable polymer. The tread coating is thus cast in particular onto the tread section.

The tread coating can also be clamp-fastened to the tread section. The clamping is preferably of such a kind that in normal driving operation no relative movements take place between the tread coating and the rest of the tread section. The clamping can in particular be adjusted, however, such that in extreme acceleration or extreme braking operations, a relative movement takes place between the tread coating and the rest of the tread section.

In the case of the attachments according to the invention, it can be provided that the tread section has a support section projecting in a radial direction towards the rim side, on which support section a tread coating that forms the tread is arranged. The tread of the attachment can be arranged hereby closer in the direction of the vehicle wheel, which can have a positive effect on vehicles with a small clearance.

In the case of the attachments according to the invention, it can be provided that the tread section has a support section on which a tread coating that forms the tread is arranged, wherein the support section is recessed on the side of the attachment facing away from the rim such that the side of the support section facing away from the rim projects at most 40 mm, at most 30 mm, in particular at most 20 mm, in particular at most 10 mm in an axial direction beyond the rim flange when the attachment is fastened in the envisaged position on the rim. The tread can hereby be arranged with a correspondingly small axial projection, which can have a positive effect on vehicles with a small clearance.

In the case of the attachments according to the invention, it can be provided that the tread section has a support section on which a tread coating that forms the tread is arranged, wherein the support section is spaced at most 10 mm from the rim flange in an axial direction on the side of the attachment facing the rim, projecting axially inwards in particular 5 mm, in particular 10 mm, in particular 15 mm, in particular 20 mm, in particular 25 mm, in particular 30 mm beyond the rim flange. The tread can hereby be arranged with a correspondingly small axial protrusion, which can have a positive effect on vehicles with a small clearance.

In the case of the attachments according to the invention, it can be provided that the tread section is detachable from the mounting section or is movable and has, viewed in a circumferential direction, at least two segments, which each comprise a portion of the circumference of the tread, wherein the segments are detachable from one another or are pivotable or displaceable relative to one another, in particular wherein the tread section comprises two, in particular precisely two, circumferential segments, which comprise a basic body that is constructed substantially identically and designed in particular as a casting, or in particular wherein the tread section has a segment with a circumferential extension of more than 180°, in particular more than 190°. In the variant with segments of the tread section with substantially identically constructed basic bodies, the manufacture of the segments of the tread section can be realised very cost-effectively. Further different components can be fitted on the identical basic bodies of the segments of the tread section.

In the case of the attachments according to the invention, it can be provided that the tread section, seen in a circumferential direction, has at least two segments, one of which is fixedly connected to the mounting section and the other is detachable from the mounting section. The segment of the tread section connected fixedly to the mounting section can be formed in particular integrally with this, in particular as a casting. An easily assembled attachment can be created hereby, which can have a high structural stability, as it comprises few connection points.

In the case of the attachments according to the invention, it can be provided that the mounting section comprises at least two segments that are movable relative to one another and a central element, wherein the tensioning device is arranged on the central element and is designed such that the tensioning movement of the two segments, which are movable relative to one another, with reference to the central element is identical but in the reverse direction. In particular, the movable segments and the central element can be designed as stamped sheet metal parts.

In the case of the attachments according to the invention, it can be provided that a fastening device of the mounting section is arranged on the central element, in particular wherein the fastening device is arranged and designed such that the segments movable relative to one another are clamp-tensioned between the tread section and the central element when the tread section is fastened to the mounting section by means of the fastening device. Additional stability of the attachment can be achieved hereby.

The movable segments of the mounting section can be designed especially simply, for example as stamped sheet metal parts. The clamping devices can be created by a bent part of the movable segments of the mounting section.

In the case of the attachments according to the invention, it can be provided that the attachment comprises at least one, in particular several, securing means, which is or are arranged offset to the clamping devices in the circumferential direction and is or are arranged on the attachment, in particular the tread section or the mounting section, pivotably about a pivot axis, which runs in particular tangentially to the circumferential direction, wherein the securing means comprises a positive-locking section that is designed to be brought into positive engagement behind the rim flange by pivoting the securing means. An additional degree of fastening and securing of the attachment on the vehicle wheel can be achieved hereby.

The securing means are preferably designed as a finished component. These securing means designed as a finished component are preferably screwed onto the circumferential segments of the tread section.

The attachment, in particular the securing means, preferably comprises a contact element, which is designed to contact the rim or the mounting section when the tread section is affixed to the mounting section, wherein the contact element is coupled to the securing means such that the securing means pivots during this contacting into positive rear engagement with the rim flange.

The securing means preferably comprises a casing and is formed in particular as a finished component. The securing means preferably comprises a locking mechanism, which locks the securing means, in particular by latching of in particular a bolt that is preloaded in particular by a spring, against pivoting out when the securing means is in positive rear engagement by its positive-locking section with the rim flange. The locking mechanism is preferably arranged in the casing. The locking mechanism and the securing means, and preferably the contact element, can thus be arranged, at any rate partially, in a casing that forms a type of housing for these components. In particular, this casing or this housing can be assembled individually with the components located therein and then the fully preassembled unit can be fitted as a finished component onto the attachment, in particular onto the tread section.

The locking mechanism can comprise a locking means that is preloaded via a spring, for example, and can be implemented as a bolt. The locking means can be designed and arranged such that it engages in a corresponding seat on the securing means when the securing means or its positive-locking section is located in the position engaging behind the rim flange.

The securing means and the locking means can be arranged in a casing. A contact element can also be associated with the securing means. The contact element can be coupled to the securing means such that upon contacting of the contact element, the securing means pivots from axial direction A into the position engaging behind the rim flange.

The casing and the locking means can be designed and arranged relative to one another such that it is optically recognisable when the locking means locks the securing means in the position pivoted in behind the rim flange. For example, the locking means can be implemented as a bolt, which protrudes by its rear end out of the casing when the securing means is not located in the pivoted-in position. The bolt thus offers an optical indication of whether the securing means or its positive-locking section has engaged behind the rim flange.

In the case of the attachments according to the invention, it can be provided that the positive-locking section of the securing means comprises a contact section, which is designed to contact the rim flange on its side facing the tire, wherein the contact section is formed corresponding to the contour of the rim flange, in particular wherein the contact section is formed corresponding to the contour of the rim flange of a J rim according to DIN 7817. A flat positive form closure of the securing means with the rim flange can be achieved hereby, which facilitates a good fastening in an axial and radial direction.

In the case of the attachments according to the invention, it can be provided that the positive-locking section of the securing means has a greater material thickness than the rear grip section of the clamping device. The clamping devices can be implemented with a very small material thickness in order to make insertion between rim flange and tire easier, and the securing means implemented with a correspondingly thick material thickness in order to guarantee secure fastening of the attachment in any operating state.

In the case of the attachments according to the invention, it can be provided that the clamping devices comprise a rear grip section that is designed curved in a circumferential direction to compensate for the circumferential curvature of the rim flange when engaging behind the rim flange, or that the securing means comprise a positive-locking section that is formed curved in a circumferential direction to compensate for the circumferential curvature of the rim flange when engaging behind the rim flange.

In the case of the attachments according to the invention, it can be provided that the clamping devices ( ) and/or the securing means can be fixed on the attachment, in particular the mounting section, in various position stages, which are spaced radially from one another and are coordinated to different rim diameters, in particular wherein at least one clamping device is movable in the position stages translationally in a radial direction, but is movable in the position stages less far in a radial direction than the radially spaced position stages are spaced from one another in the radial direction. Due to the possibility of affixation in various position stages, the attachment can be easily adapted to various rim diameters. In this case the movement path of the movable segments of the mounting section or of the radially movable clamping devices can be kept small, yet different rim sizes can be covered.

In the case of the attachments according to the invention, it can be provided that the attachment comprises a preloading mechanism, via which a clamping device or a partial area of the rear grip section of a clamping device is preloaded radially inwards, or via which one of the movable segments of the mounting section is preloaded in the direction of the other movable segment.

In the case of the attachments according to the invention, it can be provided that a guide section of the clamping device, which section can comprise the fastening section of the clamping device or can be formed by a part of the fastening section, is guided movably in a radial direction in a guide seat, which is arranged in particular on the mounting section of the attachment. In particular, the guide section can be received fully enclosed in the guide seat. Clamping devices that are designed movably relative to the mounting section can thus be guided and fastened very precisely.

The clamping devices of the attachment can be supported movably, in particular in a positive manner, for movement relative to the mounting section in a radial direction by means of a guide device. With regard to the guide device, a guide element, for example, such as a rod-like projection, can be guided positively in a guide seat, for example a groove formed in a suitably complementary manner to the projection. In this case the groove can be arranged on the mounting section and the projection on the clamping device or vice versa.

In the case of the attachments according to the invention, it can be provided that the rear grip section and/or the contact surface at least of one of the clamping devices is supported pivotably relative to the coupling section, in particular by way of a connection comprising a spring sheet. The clamping device is preferably guided on the mounting section such that the rear grip section and/or the contact surface move, in particular pivot, axially inwards during the radially inwardly directed tensioning movement of the coupling section.

In the case of the attachments according to the invention, it can be provided that the tensioning device is arranged centrally on the mounting section. In the case of the attachments according to the invention, it can be provided that the coupling means extend radially outwards from the centrally arranged tensioning device to the clamping devices. In the case of the attachments according to the invention, it can be provided that the coupling means does not or do not move translationally with regard to the mounting section during execution of the tensioning movement via the tensioning device. In the case of the attachments according to the invention, it can be provided that the coupling means moves or move with regard to the mounting section in either a translational or a rotatory manner, but in particular not in both ways during execution of the tensioning movement via the tensioning device.

The mounting section is preferably designed with a central section that comprises the actuating element, and in particular the transmission, of the tensioning device and is arranged in the region of the bolt pattern of the vehicle wheel or at least partially overlaps this when the attachment is affixed to the vehicle wheel. The mounting section preferably has arms designed as struts, which extend from the central section radially outwards to the clamping devices. The mounting section is preferably designed, in particular the arms are preferably designed, with receptacles for the one or more coupling means, so that the coupling means are arranged in the mounting section, in particular in the arms and are preferably concealed by the material of the mounting section, in particular of the arms, at least axially outwardly, in particular also in a circumferential direction, in particular also axially inwardly. The coupling means are hereby not visible outwardly and are also shielded from mechanical influences.

In the case of the attachments according to the invention, it can be provided that the tensioning device converts a movement of a traction element directed axially outwards into a movement of the clamping devices directed radially inwards. The tensioning device can be implemented in particular such that it converts an actuating movement directed axially outwards into a movement of the coupling sections of the clamping devices that is directed radially inwards. In particular, the tensioning device can comprise a clamping unit, which is movable via a threaded rod axially outwards relative to a support element, wherein the support element can be arranged in the region of the bolt pattern of the rim and can be supported in this region against the rim during the tensioning movement.

In the case of the attachments according to the invention, it can be provided that the mounting section is designed so that in the state affixed to the vehicle wheel it is spaced from the region of the bolt pattern of the vehicle wheel in a radial direction. For example, the mounting section can be designed in the form of a circular ring. In the case of such an embodiment in particular, the tensioning device can be designed in the form of an element extended in the circumferential direction, for example an annular wire cable, the radius of which can be reduced and which is coupled to the clamping devices.

The clamping devices of the attachments can have a damping surface, in particular in the form of a rubber coating of the surface, in particular in the region of their rear grip section, which is provided for contacting the rim, and/or in the region of their contact surface.

At points that are provided for contacting the rim of the vehicle wheel, the attachments can have a flexible surface, in particular in the form of a rubber coating of the surface.

In the case of the attachments according to the invention, it can be provided that one or more clamping devices are preloaded radially inwardly such that they are movable radially outwards by a clearance distance against this preloading. On tensioning of the clamping devices, the tensioning device then initially overcomes this clearance distance before the clamping devices are finally moved radially inwards by the tensioning device. This can be implemented, for example, via the preloading mechanism already mentioned further above.

In the case of the attachments according to the invention, it can be provided that the segments of the mounting section movable relative to one another are preloaded towards one another such that they are movable away from one another by a clearance distance against this preloading. On tensioning of the clamping devices, the tensioning device then initially overcomes this clearance distance before the segments of the mounting section that are movable relative to one another are finally moved towards one another by the tensioning device.

In the case of the attachments according to the invention, it can be provided that the attachment, preferably the tread section, comprises support surfaces for contacting the rim flange from axially outside, in particular which are arranged on support bodies that are affixed in turn on the tread section. In the case of the attachments according to the invention, it can also be provided that the support surfaces are formed integrally with the tread section or are formed by a portion of the tread section. The support surfaces for contacting the rim flange can be spaced in particular from the clamping devices in a circumferential direction. The support surfaces for contacting the rim flange can be provided in the case of attachments with clamping devices with a contact surface or without a contact surface.

The contact of the attachment with the rim is preferably limited to the support surfaces and/or the contact surfaces of the clamping devices. In other words, when the attachment is affixed to the vehicle wheel, all parts of the attachment are spaced from the rim apart from the contact surfaces and/or the support surfaces. The support surfaces and/or the contact surfaces of the clamping devices preferably have a flexible surface, preferably in the form of a coating, in particular comprising synthetic material.

In the case of the attachments according to the invention, it can be provided that the clamping devices comprise a rear grip section, which is designed so that, if applicable when it is located in the first pivot position, the material of the rear grip section that lies axially inside a reference place lies completely in an imaginary corridor, wherein the reference plane is spaced 4, 6 or 7 mm from a contact plane, which coincides with a contact surface of the attachment, wherein the contact plane of the attachment comprises the axially outer contact point, formed for example by a support surface, of the rim flange with the attachment, and wherein the imaginary corridor has a width of 12 mm, in particular 10 mm, in particular 9 mm, in particular 8 mm and its center line runs at an angle of at least 42°, in particular at least 45°, in particular at least 47°, in particular at least 49°, in particular at least 51°, in particular at least 53°, in particular at least 55°, and/or at most 72°, in particular at most 69°, in particular at most 67°, in particular at most 65°, in particular at most 63°, in particular at most 61°, in particular at most 59°, in particular at an angle of 57° to the radial direction, and wherein the width and the angle of the center line are defined with reference to a view of a plane running in a radial and axial direction.

In the case of the attachments according to the invention, it can be provided that the center line of the imaginary corridor runs, in a view of a plane running in a radial and axial direction, through the material center point of the rear grip section of the clamping device in its section with the reference plane and/or that the center line of the imaginary corridor, in a view of the plane running in the radial and axial direction, runs through the material center point of the rear grip section in its section with a plane parallel to the reference plane in which the axially inner end of the rear grip section lies.

The stated geometries of the clamping device have proved an advantageous compromise solution between stability of the clamping device and its rear grip section and easy insertability of the rear grip section between rim flange and tire.

In the case of the attachments according to the invention, it can be provided that when the tread section is mounted in its final position on the vehicle wheel, thus is moved via the fastening devices towards the mounting section or towards the rim, the support surfaces lie in one plane with the contact surfaces of the clamping devices and contact the rim flange. The tread section hereby receives additional support on the rim flange.

In the case of the attachments according to the invention, it can be provided that the attachment comprises fastening devices, which are arranged on the clamping device and in addition comprises fastening devices, which are arranged on the mounting section and spaced from the clamping devices.

The tread section can be designed in particular with precisely two circumferential segments, which in particular both have a circumferential extension of 180°, in particular are substantially of identical construction, are in particular identical basic elements, which are formed as castings. In particular, arranged on each of these two circumferential segments are precisely at least one, in particular two securing means.

The tensioning device can be removable from the mounting section. The tensioning device is, however, preferably fixedly integrated into the mounting section.

In the case of the attachments according to the invention, it can be provided that an, in particular mechanical, indication device is provided, which is associated with a clamping device and via which it is recognisable whether the clamping device is in rear engagement, preferably whether the clamping device is in rear engagement in the envisaged position with the rim flange, in particular wherein the indication device comprises a spring-loaded element, which is loaded in the region of the rear grip section into the envisaged position of the rim flange such that on rear engagement of the rim flange by the clamping device it is pushed out of this position by the rim flange and protrudes, preferably on the side of the clamping device lying axially and/or radially outside, beyond the latter, so that it is recognisable from this direction whether rear engagement of the rim flange is as envisaged. The indication device or its spring-loaded element can also be arranged offset to the clamping device in a circumferential direction. The indication device or its spring-loaded element can also be integrated into the clamping device, however.

The spring-loaded element of the indication device can extend in particular through the material of the clamping device. In particular, the tensioning direction of the spring-loaded element can be parallel to the course of the retaining section of the clamping device.

BRIEF DESCRIPTION OF THE FIGURES

Other features, application options and advantages of the invention result from the following description of exemplary embodiments of the invention, which are explained with reference to the drawing, wherein the features can be substantial for the invention both alone and in different combinations, without reference being made again explicitly hereto. The figures show:

FIG. 1 shows a vehicle wheel viewed in an axial direction;

FIG. 2 shows a sectional representation of the rim of the vehicle wheel from FIG. 1;

FIG. 3 includes FIGS. 3a)-3c), and shows a first embodiment of an attachment according to the invention in various depictions;

FIG. 4 includes FIGS. 4a)-4d), and shows a mounting section of an alternative embodiment of an attachment according to the invention in various depictions;

FIG. 5 includes FIGS. 5a)-5f), and shows a clamping device according to the invention;

FIG. 6 includes FIGS. 6a)-6e), and shows another clamping device according to the invention;

FIG. 7 includes FIGS. 7a)-7d), and shows another embodiment of an attachment according to the invention in various depictions;

FIG. 9 includes FIGS. 9a)-9c), and shows another embodiment of an attachment according to the invention in various depictions;

FIG. 12 includes FIGS. 12a)-12c) and shows the embodiment from FIG. 11 in various depictions;

FIG. 22 includes FIGS. 22a)-22g), and shows another embodiment of an attachment according to the invention in various depictions;

FIG. 28 includes FIGS. 28a)-28f), and shows another clamping device according to the invention;

FIG. 31 includes FIGS. 31a)-31e), and shows details of a clamping device according to the invention;

FIG. 33 includes FIGS. 33a)-33c), and shows a mounting section of an alternative embodiment of an attachment according to the invention in various depictions;

FIG. 34 includes FIGS. 34a)-34c), and shows the mounting section from FIG. 33 in various depictions;

FIG. 47 includes FIGS. 47a)-47f), and shows an attachment of an alternative embodiment in various depictions;

FIG. 49 includes FIGS. 49a)-49c), and shows details of another clamping device according to the invention;

FIG. 50 includes FIGS. 50a)-50b), and shows details of another clamping device according to the invention;

In the following figures, corresponding components and elements have identical reference characters. For greater clarity not all reference characters are reproduced in all figures.

DETAILED DESCRIPTION

Figure 8B:
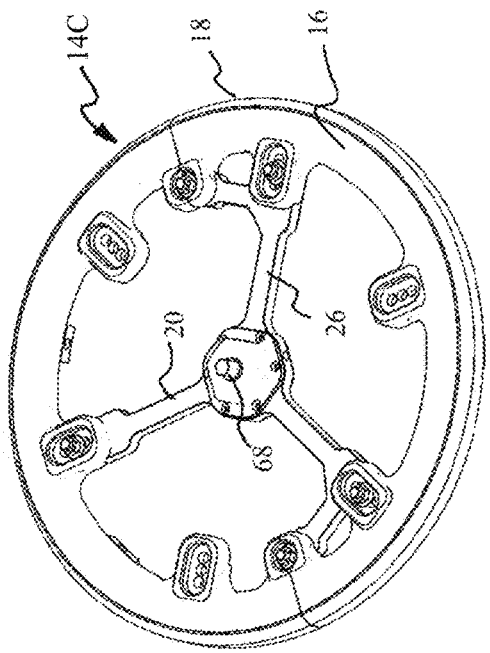
FIG. 8 includes FIGS. 8a)-8c), and shows another embodiment of an attachment according to the invention in various depictions.

FIG. 1 shows a schematic depiction of a vehicle wheel 1. The vehicle wheel 1 comprises a wheel disk 2 coupled to a rim 2A and a tire 3 mounted on the rim 2A. The wheel disk 2 and rim 2A is shown individually in FIG. 2 without the tire 3. A circumferential direction U is depicted by an arrow with the reference character U. An axial direction A is depicted by an arrow with the reference character A (FIG. 2). The arrow is directed axially outwards. A radial direction R is depicted by an arrow directed radially outwards with the reference character R. Radially internally the wheel disk 2 comprises a bolt pattern 4 of the vehicle wheel 1. Arranged in the center of the bolt pattern 4 around a rotary axis 5 of the vehicle wheel 1 running along the axial direction A is a so-called center opening 6, which is in some cases also termed a hub bore or center hole centring. Here the bolt pattern 4 comprises five screw holes 7, two of which are provided with a reference character. On the present vehicle wheel 1, five spokes 8 extend radially outwards from the region of the bolt pattern 4.

The rim 2A comprises a rim bed 9 and a rim flange 10 and the center opening 6 has a recessed circumferential groove 12. The wheel disk 2 has several openings 13, which are arranged in the region of the bolt pattern 4. The openings 13 are arranged spaced at a distance in the wheel disk 2 from the screw holes 7, thus holes 7 provided to receive wheel bolts or stay bolts, and from the center opening 6 of the wheel disk 2. The openings 13 can be implemented as poly-control holes, for example, via which an axial play of the axle of the vehicle wheel 1 can be measured.

If the tire 3 of the vehicle wheel 1 has a hole, the air in the tire escapes and the tire function of the vehicle wheel 1 is restricted. To enable continued driving operation in such a case, an attachment 14 according to the invention can be used.

An example of such an attachment according to the invention is shown in FIG. 3. The attachment 14A is designed with a tread section 16, which comprises a tread 18 of the attachment 14, and with an initial mounting section 20, which is arranged radially inside the tread 18 on assembly of the attachment 14A.

Arranged on the side of the attachment lying axially inwards are clamping devices 22.

The tread section 16 can be attached via several fastening devices 24 to the mounting section 20. The fastening devices 24 are designed here as screw fastenings 24.

The mounting section 20 is designed here in the form of a star with three struts 26 running radially outwards. One of the fastening devices 24 is arranged here on each of these struts.

The tread section 16 is formed in one piece in the present embodiment. The tread section 16 can be formed in multiple parts for the purposes of the invention, however. This will be described in detail later.

Another example of an attachment according to the invention is shown in FIG. 4, wherein only the mounting section 20 when mounted on the vehicle wheel 1 is depicted.

The mounting section 20 is applied to the rim 2A in the position shown in FIG. 4 so that the ends of the clamping devices 22 lying axially inwards rest exactly on the rim flange 10 (as shown in FIG. 4c)). The clamping devices 22 are then moved radially inwards in a tensioning movement V.

In the present embodiment all three clamping devices 22 can be moved radially inwards uniformly and motion-coupled to one another in the tensioning movement V relative to the mounting section 20. In the present embodiment the tensioning movement V of the clamping devices 22 runs in this case purely translationally and directed exclusively radially inwards with respect to the mounting section 20.

Due to the shape of the clamping devices 22, these slide during the tensioning movement into rear engagement with the rim flange 10 (as shown in FIG. 4d)) and thereby pull the mounting section 20 towards the rim 2A in an axial direction A. In the following, the clamping devices 22 according to the invention, which are used also in the attachment 14 of FIG. 4, for example, are now initially explained.

A clamping device 22A of this kind is shown in detail in various views in FIG. 5.

The clamping device 22A is designed for tensioning an attachment 14 on a rim 2A of a vehicle wheel 1. The clamping device 22A has a rear grip section 28. The rear grip section 28 is designed protruding hook-like in axial direction A and running radially inwards in a section through a section plane E running in a radial direction R and axial direction A (view along the arrows c)-c), as shown in FIG. 5c)). The rear grip section 28 serves for positive rear engagement of the rim flange 10.

The rear grip section 28 transitions into a contact surface 30, which lies here in a plane 29 running in a radial and circumferential direction. The contact surface 30 is designed and arranged to contact the rim flange 10 from axially outside.

The rear grip section 28 transitions into the contact surface 30 in a transition region 32. The surface 34 of the transition region 32 between the rear grip section 28 and the contact surface 30 has a recessed section 35, which is arranged offset axially outwards in the axial direction A with regard to the contact surface 30. The contact surface 30 permits the clamping device 22A to rest in a precisely defined position on the rim flange 10 when the rear grip section 28 engages behind the rim flange 10. This is advantageous in particular with regard to clamping devices 22 in which the rim flange 10 is taken up in a curved section. In such clamping devices 22A the rim flange 10 can move back and forth relative to the clamping device 11 upon loading in an axial direction. The rim flange 10 can be damaged by such a movement and on the other hand the clamping devices 22A are also exposed to a higher load. This is prevented by the clamping device 22A according to the invention with the contact surface 30.

The clamping device 22A has a fastening section 36 for connecting the clamping device 22A to the attachment 14. The fastening section 36 is arranged here lying radially inwards from the rear grip section 28 and from the contact surface 30. The fastening section 36 has a number of fastening devices 38 on the clamping device side that are designed here as screw admissions 38.

The fastening devices 38 are designed and arranged to secure the clamping device 22 via the fastening section 36, by means of a screw in the case of the fastening devices 38 designed as screw admissions 38, in a clamping manner against play in axial direction A on the attachment 14. In the present example the clamping devices 22 can thus be screwed via the fastening section 36 virtually against the attachment 14 in an axial direction.

The clamping device 22A has a guide section 39, which is formed here by the fastening section 36. The fastening section 36 is arranged and designed to be received guided movably in a radial direction in a guide seat, which is arranged in particular on the mounting section of the attachment.

The clamping device 22A also has here a coupling device 40, which is designed as a receptacle 40 for a coupling means, here a threaded rod. The coupling device 40 is generally designed to couple the clamping device 22A, in particular via the coupling means, to a tensioning device of the attachment 14. The tensioning device will be discussed in greater detail below.

When looking radially inwards, the rear grip section 28 of the clamping device 22A has a retaining section 42, which is designed to take up clamping forces, and an insertion section 44, which is designed to facilitate insertion of the rear grip section 28 between the rim flange 10 and the tire side wall adjacent to the rim flange 10. The insertion section 44 is arranged here axially inwards relative to the retaining section 42. The retaining section 42 is extended further in the circumferential direction U than the insertion section 44.

The material thickness 46 of the insertion section 44 is smaller here than the material thickness 48 of the retaining section 42. Furthermore, the insertion section 44 has a material thickness 46 that decreases continuously axially inwards. The insertion section 44 thus runs virtually to a point with regard to its material thickness axially inwards. This makes insertion between the rim flange 10 and tire 3 easier.

In the present embodiment, both the retaining section 42 and the insertion section 44 are designed tapering axially inwards in their circumferential extension. The retaining section 42 and the insertion section 44 taper axially inwards in their circumferential extension in a rounded form in each case.

FIG. 6 shows another clamping device 22B according to the invention. The clamping device 22B shown in FIG. 6 likewise has a rear grip section 28 formed in the manner of a hook for positive engagement behind the rim flange 10. The rear grip section 28 of the clamping device 22B from FIG. 6 is pivotable about an axis 50, which runs tangentially to the circumferential direction U, with regard to the rest of the clamping device 22B.

The rear grip section 28 can be positioned in at least a first position S1 and a second position S2 pivoted about the axis 50 relative to the first position S1, as well as in a third position S3 pivoted about the axis 50, by positive locking. The rear grip section 28 can also be positionable by frictional tensioning, however. In addition to the 3 positions shown, the rear grip section 28 in the embodiment shown can also be locked in 2 other positions. In the present example the positive locking is achieved by a locking means 52, which is implemented in the present case as a grub screw 52. The locking means 52 or the grub screw 52 engages in a corresponding recess 54 on the pivotable rear grip section 28. The five recesses 54 are visible in FIG. 6b), in which a basic body 56 of the clamping device 22B is depicted partially transparently.

In the present embodiment, the rear grip section 28, in the first position S1 in all 4 other lockable positions, is designed in the manner of a hook protruding in an axial direction and running radially inwards in a section through a section plane E running in a radial and axial direction.

The clamping device 22B from FIG. 6 likewise has the contact surface 30. The clamping device from FIG. 6 also has the coupling device 40 here, which is designed as a receptacle 40 for a coupling means, here a threaded rod.

FIG. 7 shows another embodiment of an attachment 14B according to the invention. The attachment 14B comprises a mounting section 20 with three clamping devices 22 uniformly distributed in a circumferential direction. The tread section 16 is affixed to the mounting section 20. The clamping devices 22 are each provided with a fastening section 36. Fastening section 36 respectively comprises a fastening device 38, here in the form of a threaded bolt protruding axially outwards.

By means of a part 58 of the fastening device 38 on the tread section side, which part is implemented as a nut 58, the tread section 16 can be firmly fixed on the clamping device 22 and thus on the mounting section 20. Here the mounting section can be clamped between tread section and clamping device with this fastening. Play-free contact between the tread section 16 and the clamping device 22 is always guaranteed hereby. The clamping device 22 lies in turn in a precisely defined position with its contact surface 30 on the rim flange 10 from axially outside. Precise positioning and play-free retention of the tread section 16 on the rim 2A is guaranteed hereby.

The attachment has a tensioning device 60, here arranged centrally. The tensioning device 60 is coupled via a coupling means 62 to the clamping device 22. This is shown in an individual depiction in FIG. 7c.

The mounting section 20 has a receiving section 64 for the coupling means 62. The receiving section 64 is designed and arranged here such that the coupling means 62 is covered along its entire extension axially outwards.

Here the coupling means 62 is covered also in a circumferential direction U in each case by the wall of the receiving section 64. The receiving section 64 is open axially inwards.

The tensioning device 60 comprises a transmission 66. The transmission 66 serves to convert a rotary drive movement about the axial direction A, which movement is depicted by the curved arrow AB, into the translational tensioning movement. The drive movement AB is carried out in this case on an actuating element 68, which is designed here as a hexagonal bolt. A wrench can be applied to the actuating element 68 and the drive movement AB carried out. The rotary drive movement AB is then transmitted in the present case via a drive bevel gear 70 to an output bevel gear 72, which is transferred by the coupling means 62, which is implemented here as a threaded rod 62.

The threaded rod 62 has a thread 74 at its clamping-device-side end, which thread engages in a corresponding mating thread 76 on the clamping device 22. Due to the rotation of the coupling means or the threaded rod 62, the thread 74 on the threaded rod 62 screws into the thread 76 on the clamping device 22. The clamping device 22 is moved radially inwards hereby, while the threaded rod 62 remains stationary with regard to the mounting section 20 and only rotates.

Figure 8C:
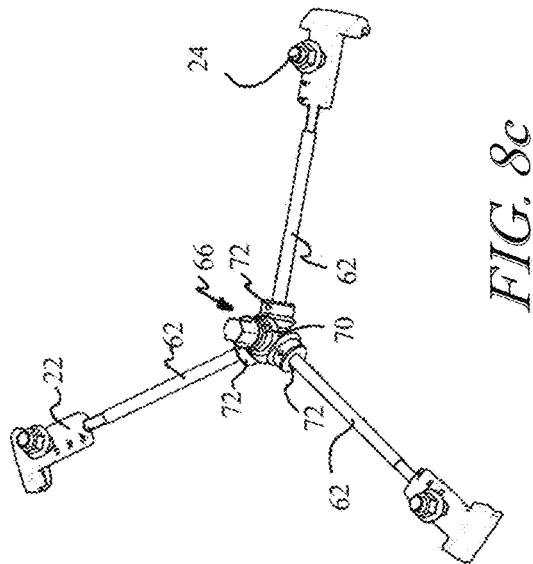
Figure 8A:
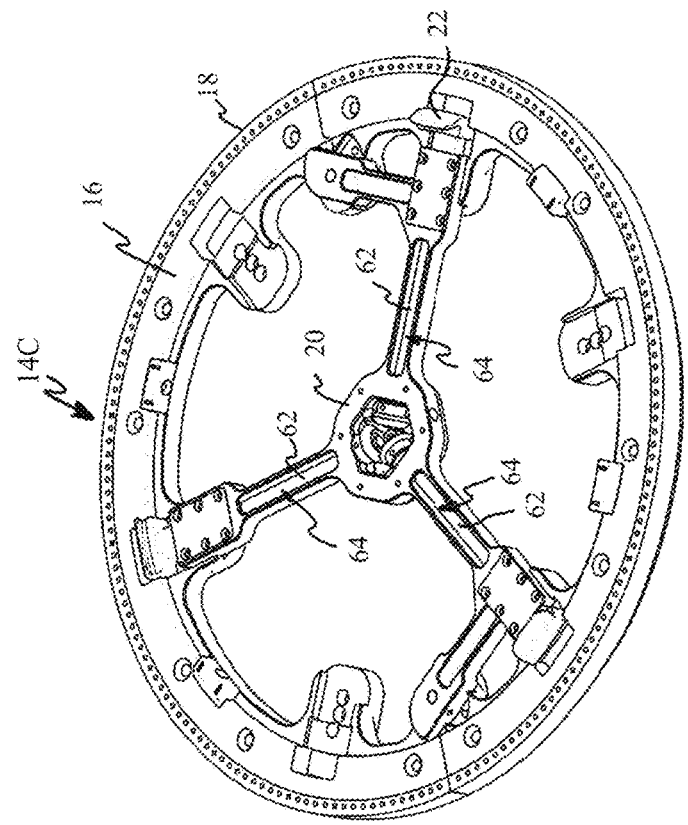

In the example of FIG. 7, only one of the clamping devices 22 is movable via the tensioning device 60. In the example of FIG. 8, an alternative embodiment of the attachment 14C is shown, wherein in this embodiment all three clamping devices 22 are connected respectively via a coupling means 62 with an output bevel gear 72 to a central drive bevel gear 70.

FIG. 9 shows another alternative embodiment of an attachment 14D according to the invention. In the attachment in FIG. 9, the mounting section 20 has four clamping devices 22, which are fastened immovably on the mounting section 20 in a number of fixedly determined positions, which are coordinated to different rim diameters. The mounting section 20 has a first segment 77 and a second segment 78. The second segment 78 is designed largely W-shaped, while the first segment 77 is designed largely curved. The attachment likewise has a tensioning device 60, wherein this is implemented as a tie rod, which is fixedly connected to the second segment 78. This tie rod 79 is led through the second segment 78 and provided with a nut 80. By tightening the nut 80 towards the first segment 77, the first segment 74 is moved relative to the second segment 76 in a tensioning movement directed translationally towards this.

The tensioning device 60 has a spring mechanism 82, which is designed such that a spring 84, which is arranged around the tie rod 79, pushes the first section 74 towards the second section 76. The clamping devices 22 can hereby be placed in a simple manner onto the rim flange 10 and these are pushed by the spring mechanism 82 virtually directly into the position gripping the rim flange. If the nut 80 is then tightened, the movement prescribed by the spring 84 is executed further and the clamping devices 22 engage behind the rim flange 10 and move the mounting section 20 in an axial direction A towards the rim flange 10. Then the tread section 16 can be placed onto the mounting section 20 or the clamping devices 22 and fastened. To fasten the tread section 16, screws 86 are inserted here into the corresponding fastening devices 38, which are implemented as screw holes and arranged in the clamping devices 22. In a similar manner to the version of FIGS. 7 and 8, a precisely defined and fixed fastening of the tread section 16 on the clamping devices 22 results hereby.

The spring mechanism 82 represents one option of a preloading device 83, via which one of the movable segments 77, 78 of the mounting section 20 is preloaded in the direction of the other movable segment 77, 78.

Figure 10C:
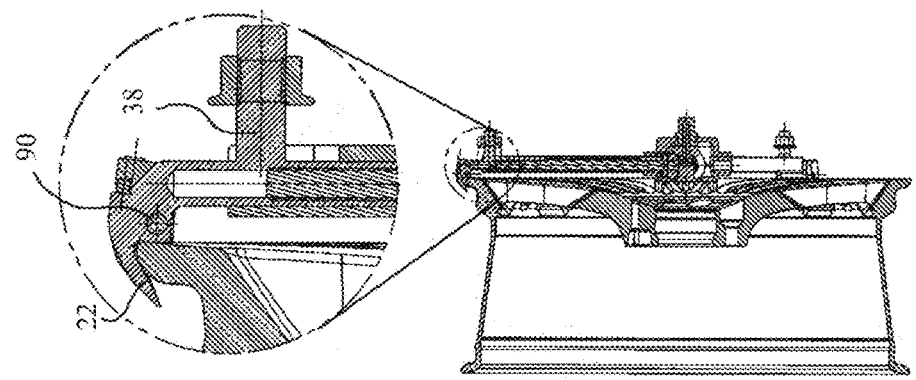
FIG. 10 includes FIGS. 10a)-10c), and shows another embodiment of an attachment according to the invention in various depictions.
Figure 10B:
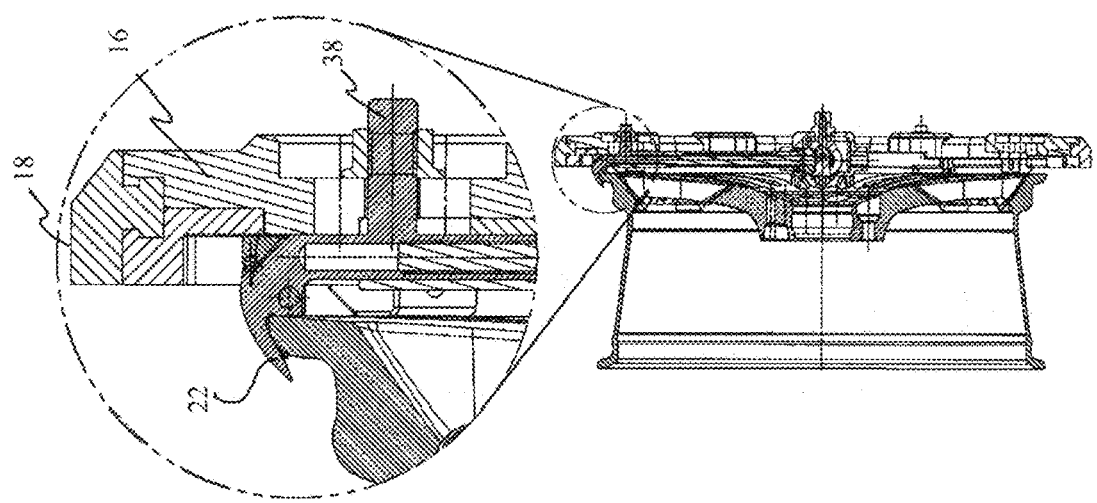
Figure 10A:
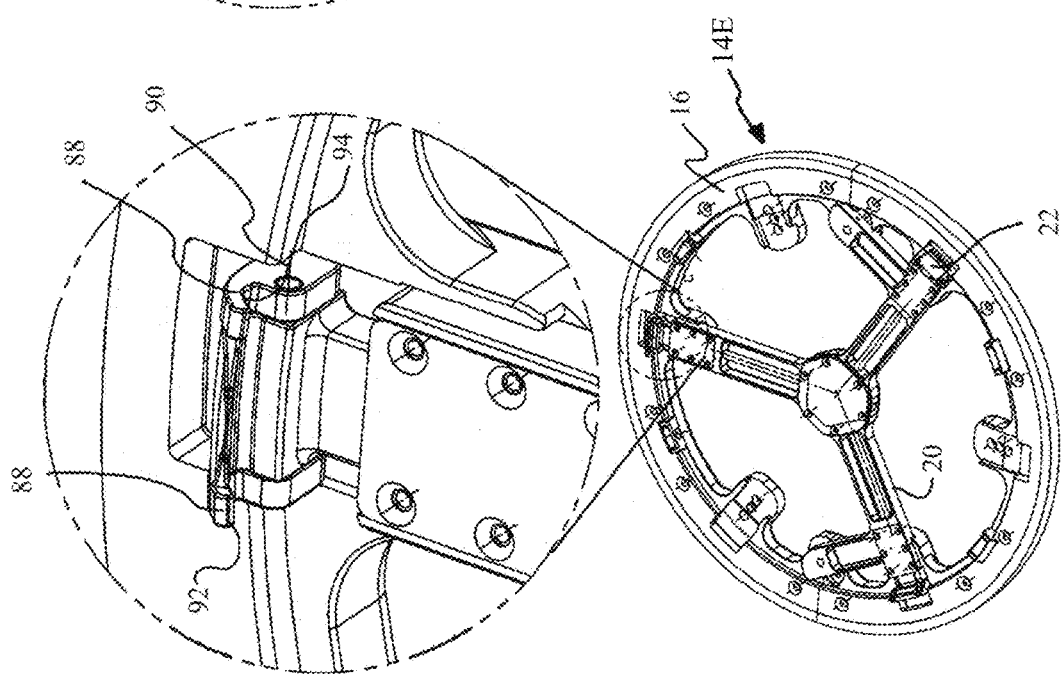
Figure 11D:
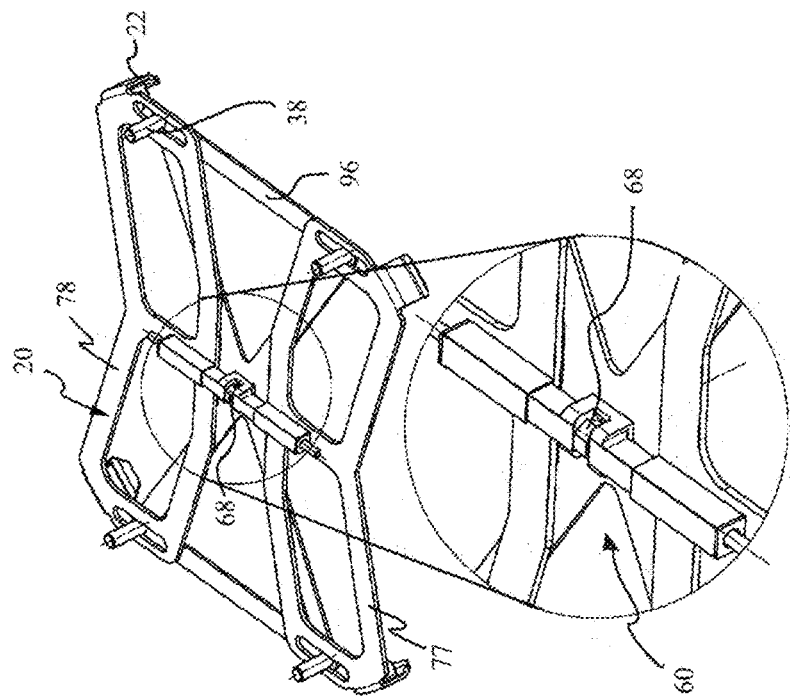
FIG. 11 includes FIGS. 11a)-11d), and shows another embodiment of an attachment according to the invention in various depictions.
Figure 11A:
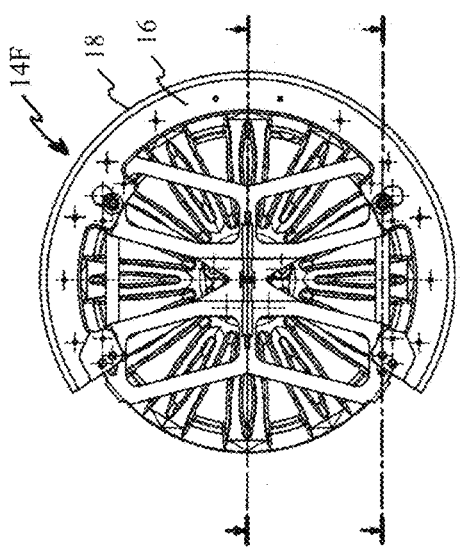
Figure 11B:
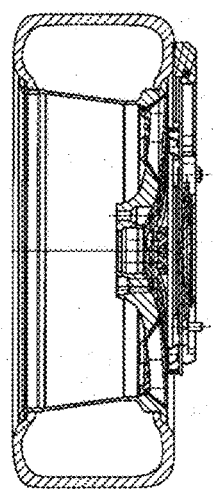
Figure 11C:
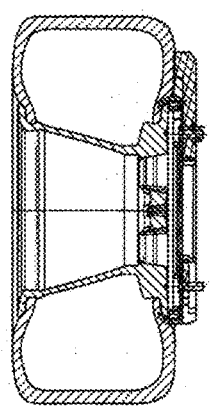
Figure 13A:
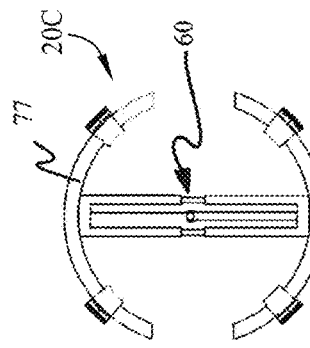
FIG. 13 includes FIGS. 13a)-13b), and shows another embodiment of an attachment according to the invention in various depictions.

FIG. 10 shows another alternative embodiment of an attachment 14E according to the invention. The attachment 14E from FIG. 10 also has clamping devices 22 according to the invention, which each also comprise two securing means 88. The securing means 88 are arranged offset in the circumferential direction U to the rear grip section of the clamping devices 22.

The securing means 88 are each arranged pivotably about a pivot axis 90 on the clamping device 22. It is also conceivable, however, that the securing means 88 can be designed separately from the clamping device 22.

The securing means each comprise a positive-locking section 92, which is designed to be brought into positive rear engagement with the rim flange 10 by pivoting of the securing means. The positive-locking section 92 of the securing means 88 is designed in this case here as a contact section 94, which is designed in turn to contact the rim flange 10 on its side facing the tire, wherein the contact section 94 is shaped corresponding to the contour of the rim flange 10 lying axially inside. In this case a contour of the rim flange of a J rim according to DIN 7817 is assumed here.

The design of the attachment 14E from FIG. 10 otherwise largely corresponds to that of the attachment from FIG. 8.

In FIG. 10b the mounting section is shown in the state mounted on the rim. It is to be seen here how the clamping device 22 engages behind the rim flange 10. In a further step, the individual circumferential segments of the tread section 16 are affixed to the mounting section 20. The fastening device 38 on the clamping devices 22 is used for this.

FIG. 11 shows another embodiment of an attachment 14F according to the invention. Here the attachment is implemented with a mounting section 20, which has two segments 77 and 78 that are movable relative to one another, wherein the attachment additionally comprises a central element 96.

The central element 96 further comprises the tensioning device 60. The tensioning device 60 is designed here such that the tensioning movement of the two segments 77, 78 that are movable relative to one another is identical with regard to the central element 96, but in the reverse direction. It is meant by this that on actuation of the centrally arranged actuating section 68 of the tensioning device 60, the two movable segments 77 and 78 are each moved at the same relative speed to the central element 96.

The mounting section 20 also comprises fastening devices 38, by means of which the individual segments of the tread section 16 are fastened on the mounting section 20. The fastening devices 38 are implemented here as threaded bolts, which are fixedly connected to the central element 96. The clamping devices 22 of the present embodiment are likewise fixedly connected to the mounting section 20, but to the movable segments 77 and 78. Each of the two segments 77, 78 of the mounting section 20 comprises two clamping devices 22. The two clamping devices 22 of each of the movable segments 77, 78 of the mounting section 20 are arranged here spaced at a distance relative to one another, wherein the relative position of the clamping devices 22 remains unchanged during the tensioning movement.

Upon fastening of the tread section 16 via the fastening device 38, the movable segments 77 and 78 are clamped between the central element 96 and the tread section 16.

The attachment 14F from FIG. 11 is shown in further views in FIG. 12.

In FIG. 12c the attachment 14F is depicted in the state fully affixed to the vehicle wheel 1. In the depiction of FIG. 12c, it can be easily recognised that the tread 18 of the attachment 14F is offset radially inwards approximately 15 mm relative to the tread of the tire 3. This is depicted here in this way as the tire 3 in FIG. 12c is completely filled with air. If the tire has a hole, the air escapes and the attachment 14F contacts the road, wherein the tire is kept additionally in shape and furthermore remains active in the rolling movement of the wheel.

The clamping devices 22 of the attachment 14F from FIGS. 11 and 12 also have a contact surface 30. The contact surface 30 in the present case is formed by a simple square profile, which is arranged on the inside of the clamping device 22. In the exemplary embodiment just described, the movable segments 77, 78 of the mounting section 20 are designed as stamped sheet metal parts. The fastening devices 38 are affixed to the central element and the clamping devices 22 are formed by bending round edge sections of the movable segments 77 and 78.

FIGS. 13 to 16 show various possibilities for implementing a mounting section 20A-20D. The embodiment of FIG. 13a has three clamping devices, which are arranged on a mounting section in two segments 77 and 78 movable relative to one another. The two movable segments 77 and 78 are movable towards one another via a tensioning device 60, which is implemented in the form of a bar-shaped section that can be shortened. In FIG. 13b, the mounting section 20A from FIG. 13a is shown with the tread section 16 affixed thereto, which likewise has two segments.

Figure 14A:
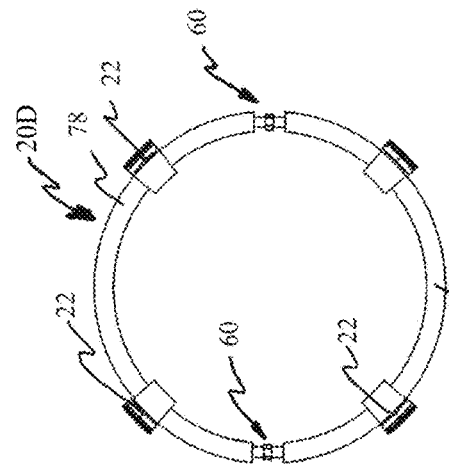
FIG. 14 includes FIGS. 14a)-14b), and shows another embodiment of an attachment according to the invention in various depictions.
Figure 13B:
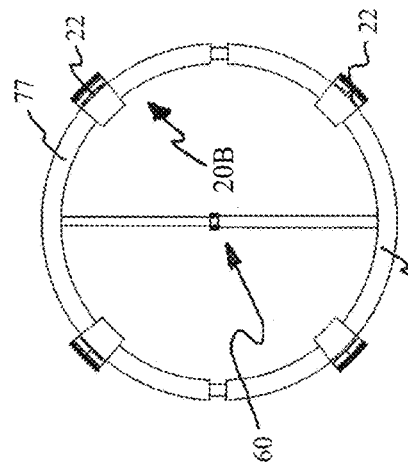
Figure 14B:
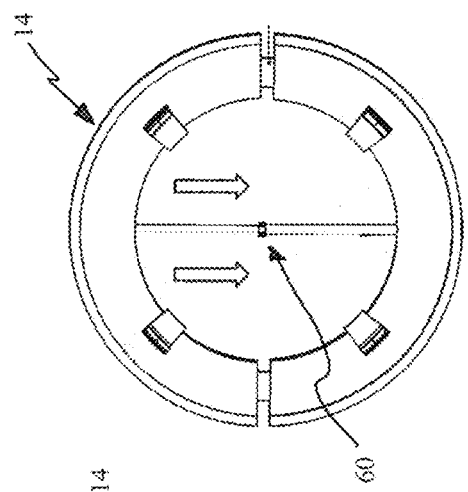

The embodiment of FIG. 14 largely corresponds to that of FIG. 13, wherein two clamping devices 22 are arranged on each of the movable segments 77 and 78 of the mounting section 20B.

Figure 15:
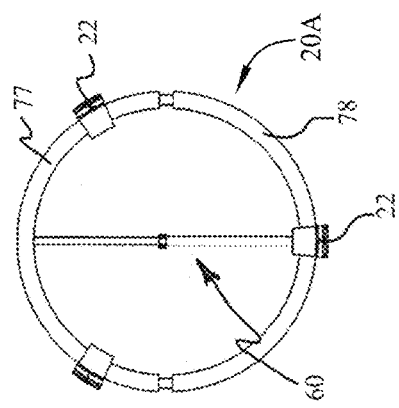
FIG. 15 shows a mounting section of an alternative embodiment of an attachment according to the invention.

The embodiment of FIG. 15 comprises a mounting section 20C that forms a circular ring that is partially closed or not closed.

Figure 16:
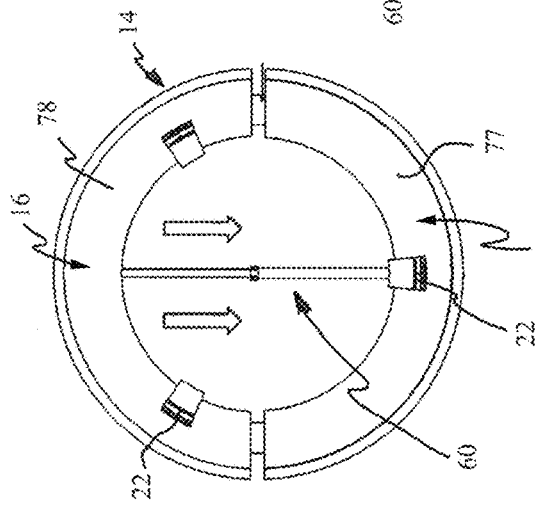
FIG. 16 shows a mounting section of an alternative embodiment of an attachment according to the invention.
Figure 17:
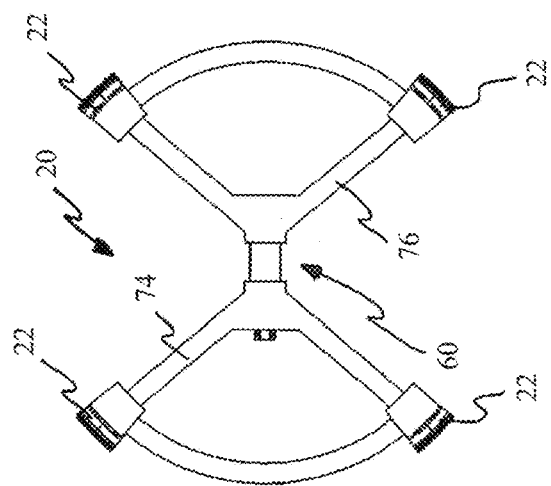
FIG. 17 shows a mounting section of an alternative embodiment of an attachment according to the invention.
Figure 18:
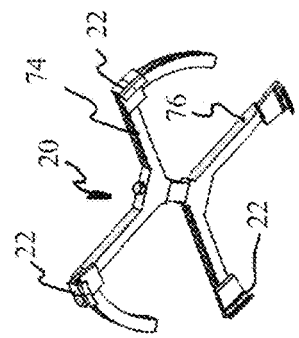
FIG. 18 shows a mounting section of an alternative embodiment of an attachment according to the invention.
Figure 19A:
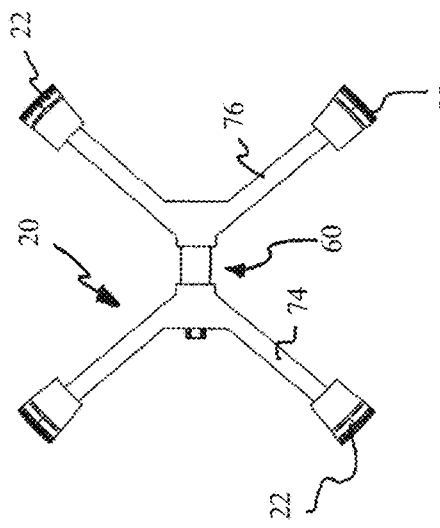
FIG. 19 includes FIGS. 19a)-19b), and shows a mounting section of an alternative embodiment of an attachment according to the invention in various depictions.
Figure 19B:
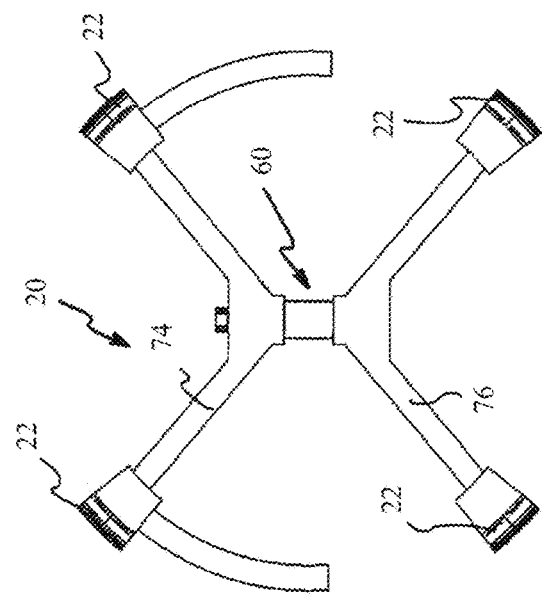

The embodiment of FIG. 16 shows an annular mounting section 20D, the two movable segments 77 and 78 of which are movable towards one another via two tensioning devices 60. The mounting section 20 is also designed such that in the state affixed to the vehicle wheel 1, it is spaced from the region of the bolt pattern of the vehicle wheel 1 in a radial direction R. The tensioning device 60 is virtually in the form of an element extended in the circumferential direction U that corresponds to the mounting section 20D but can also be formed by a wire cable, for example, the radius of which is reducible and which is coupled to the clamping devices 22.

Figure 20B:
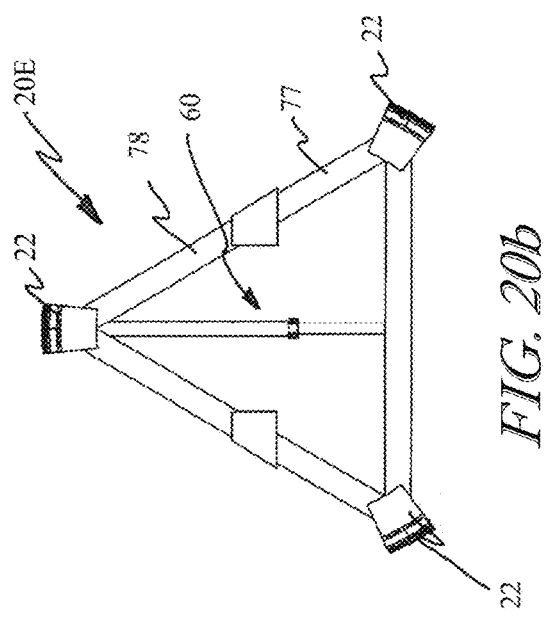
FIG. 20 includes FIGS. 20a)-20b), and shows a mounting section of an alternative embodiment of an attachment according to the invention in various depictions.
Figure 20A:
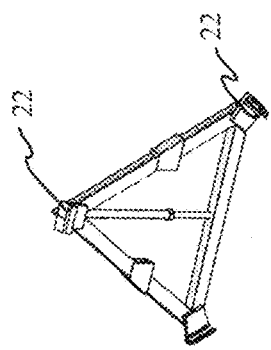

FIG. 20 shows a largely triangular mounting section 20E.

Figure 21B:
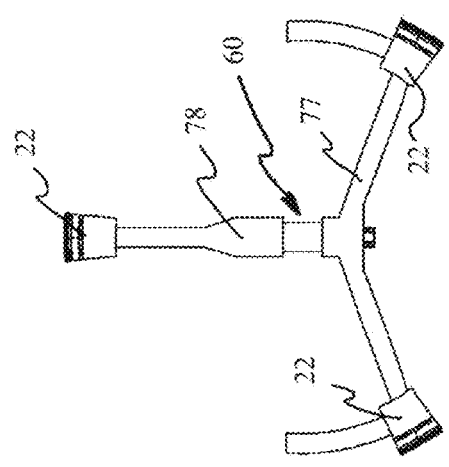
FIG. 21 includes FIGS. 21a)-21b), and shows a mounting section of an alternative embodiment of an attachment according to the invention in various depictions.
Figure 21A:
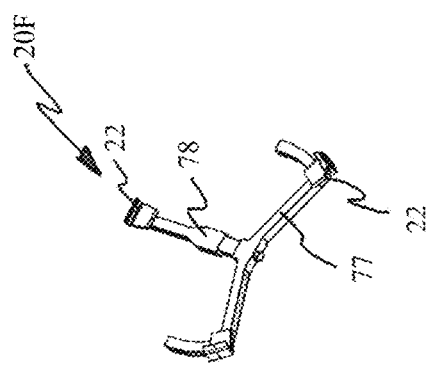
Figure 23D:
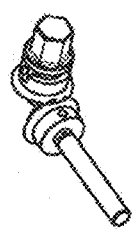
FIG. 23 includes FIGS. 23a)-23d), and shows another embodiment of an attachment according to the invention in various depictions.
Figure 23A:
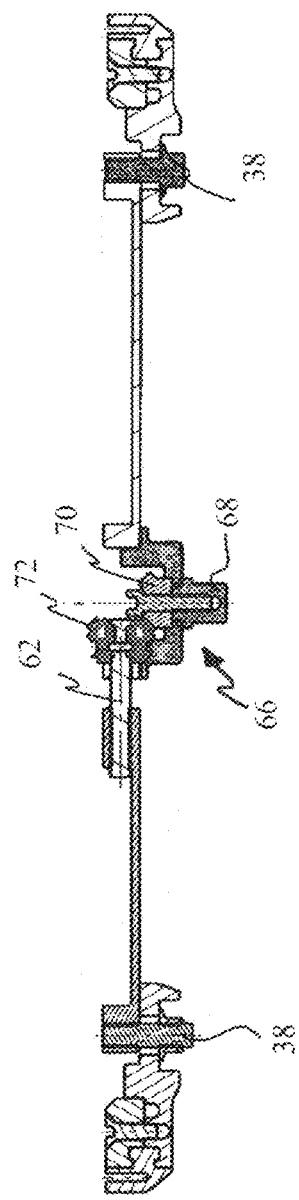
Figure 23C:
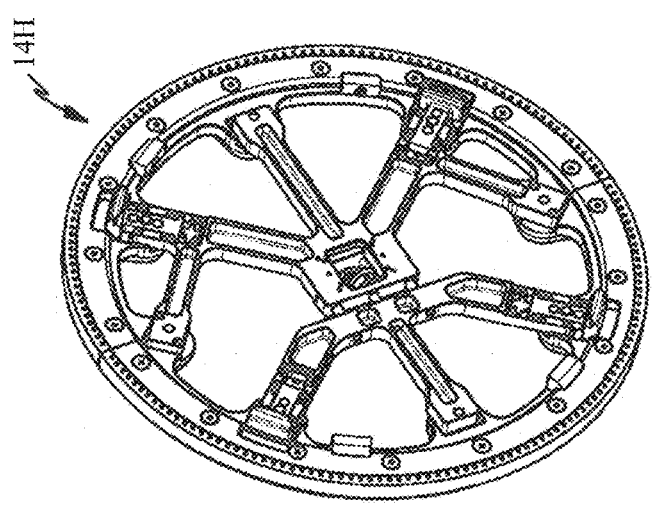
Figure 23B:
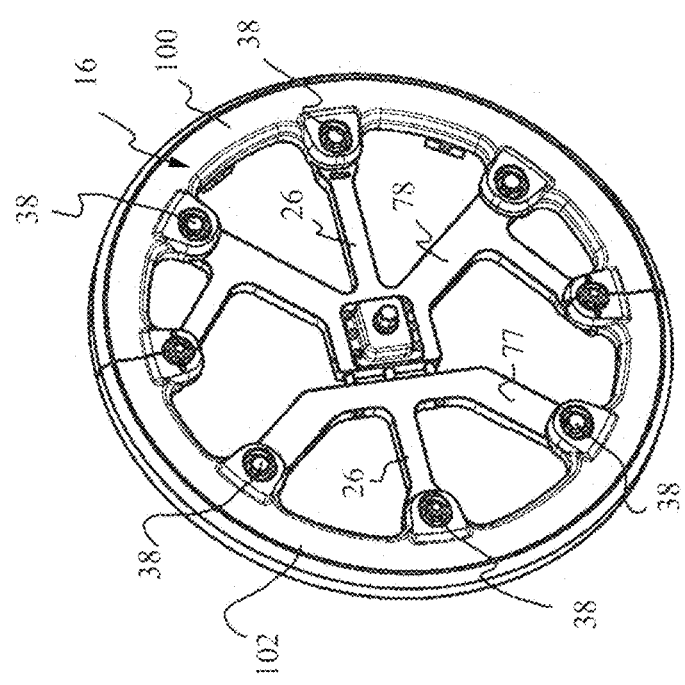
Figure 24E:
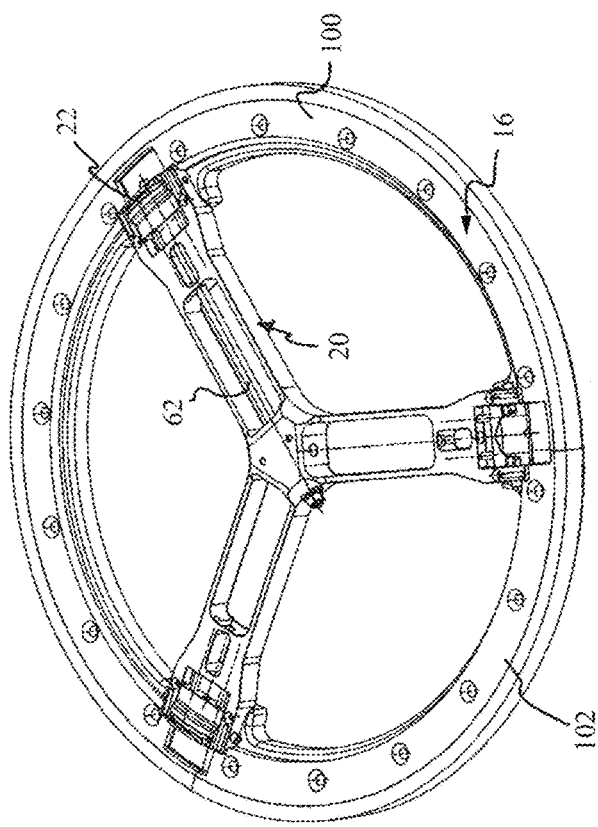
FIG. 24 includes FIGS. 24a)-24f), and shows another embodiment of an attachment according to the invention in various depictions.
Figure 24F:
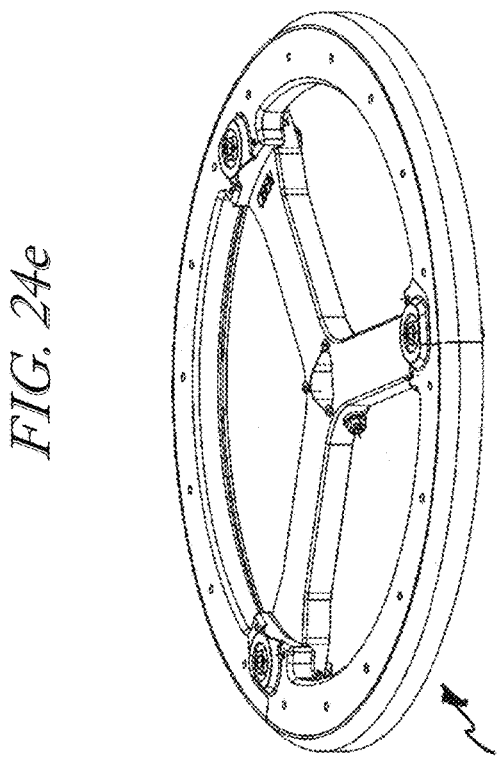
Figure 24C:
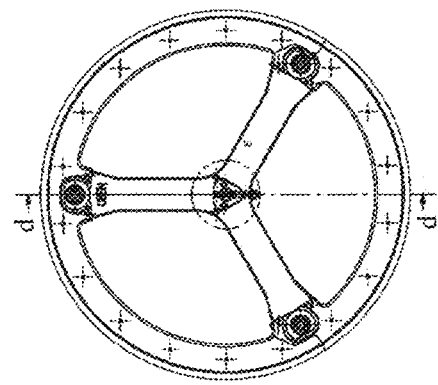
Figure 24D:
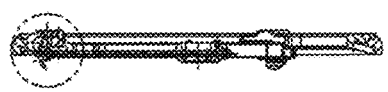
Figure 24A:
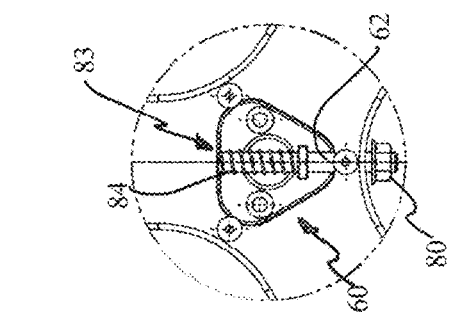
Figure 24B:
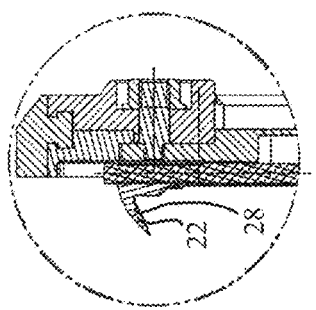
Figure 25E:
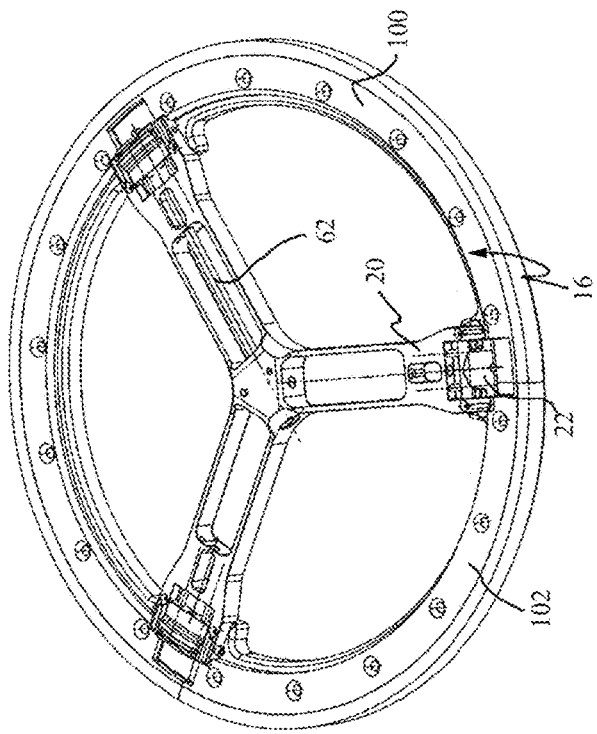
FIG. 25 includes FIGS. 25a)-25f), and shows another embodiment of an attachment according to the invention in various depictions.
Figure 25F:
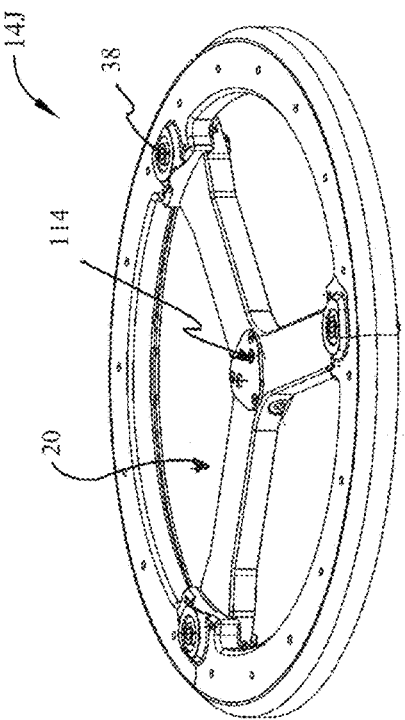
Figure 25C:
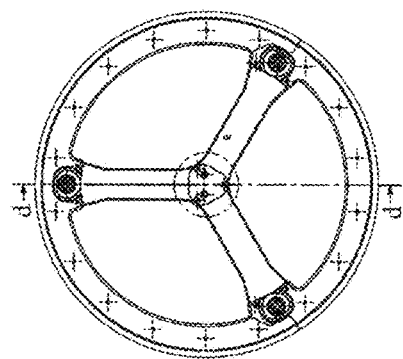
Figure 25D:
Figure 25A:
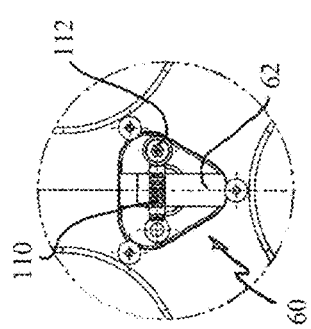
Figure 25B:
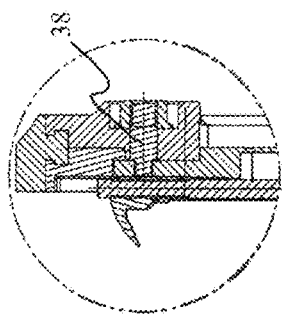
Figure 26C:
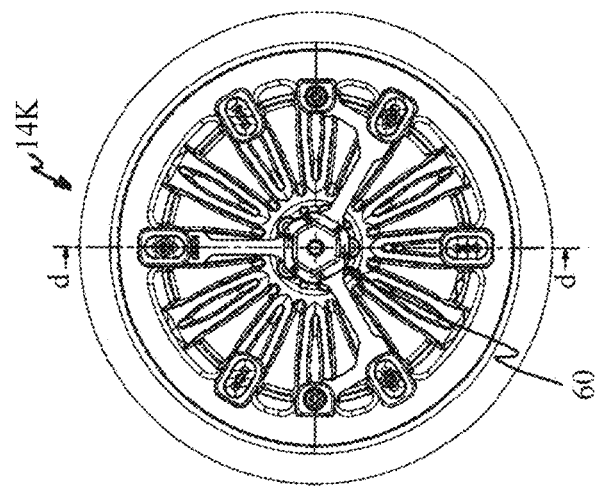
FIG. 26 includes FIGS. 26a)-26f), and shows another embodiment of an attachment according to the invention in various depictions.
Figure 26B:
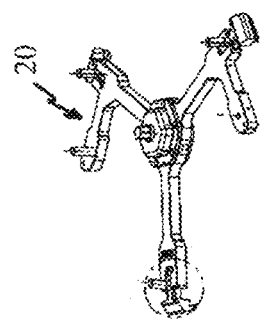
Figure 26A:
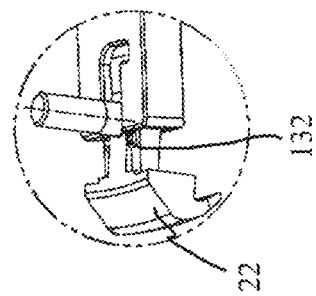
Figures 26D, 26E, 26F:
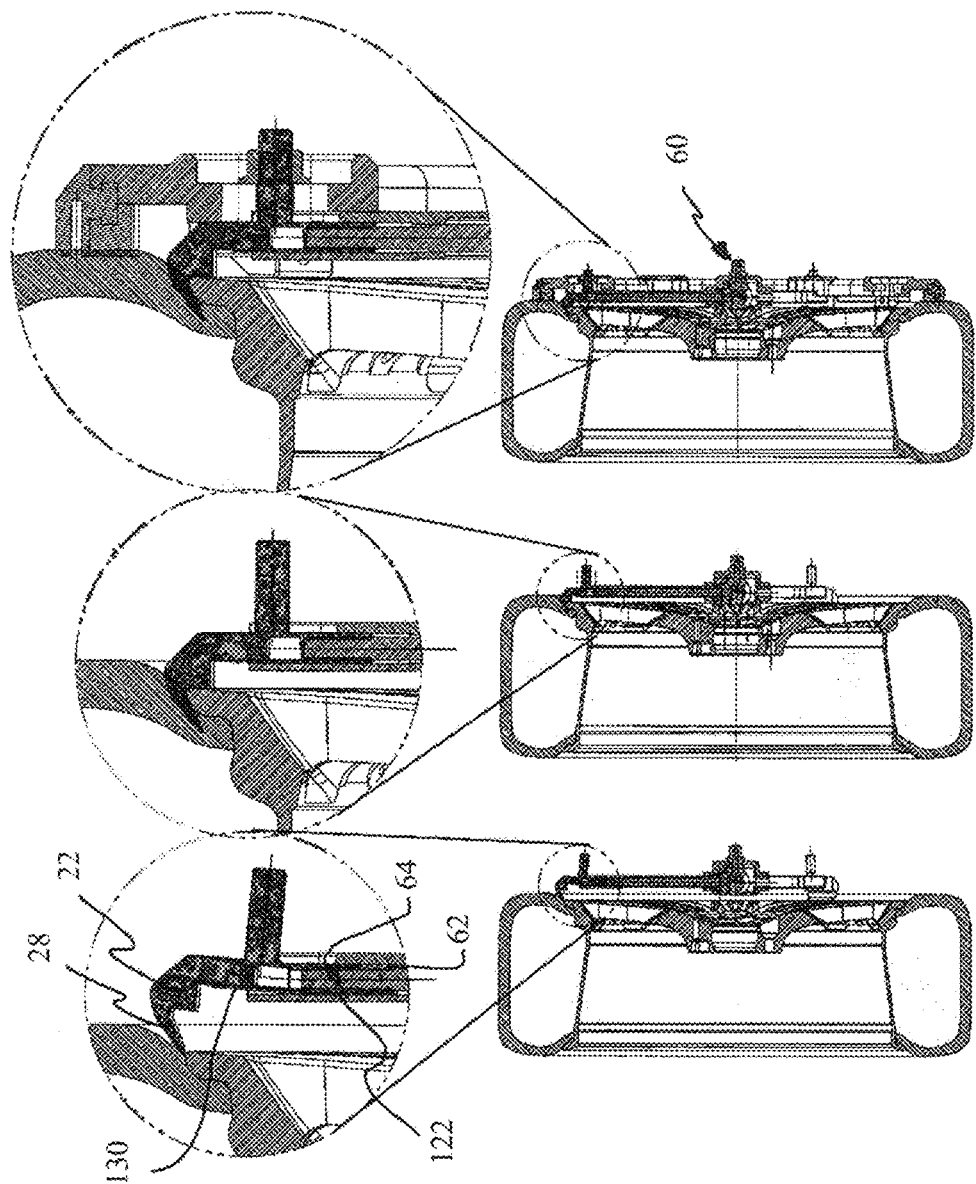
Figure 27G:
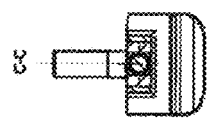
FIG. 27 includes FIGS. 27a)-27h), and shows another clamping device according to the invention.
Figure 27H:
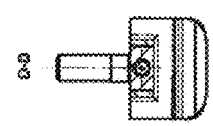
Figure 27F:
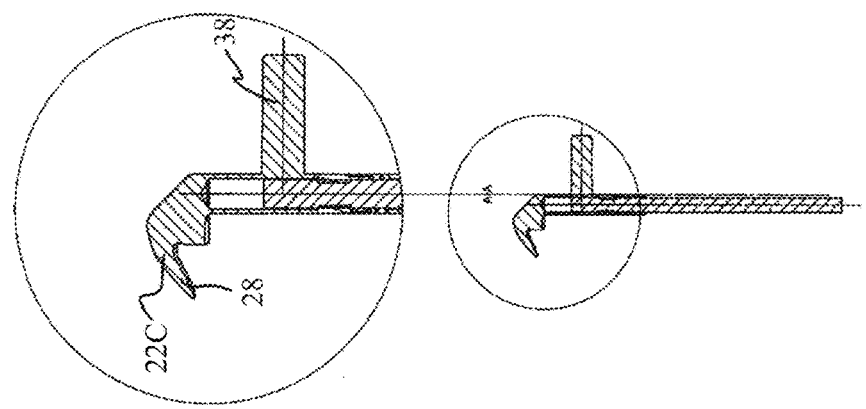
Figure 27D:
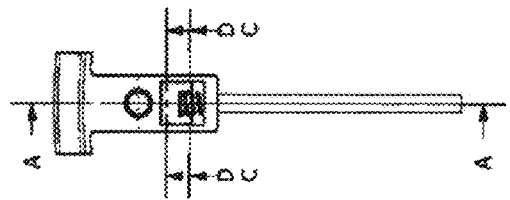
Figure 27E:
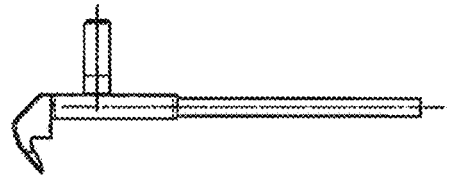
Figure 29B:
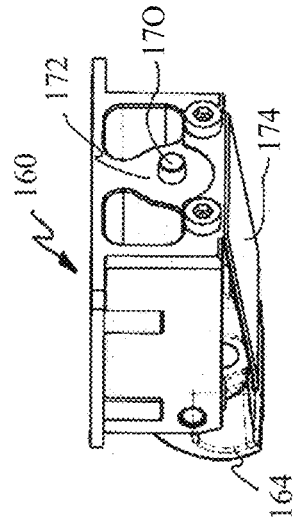
FIG. 29 includes FIGS. 29a)-29d), and shows a securing means.
Figure 29D:
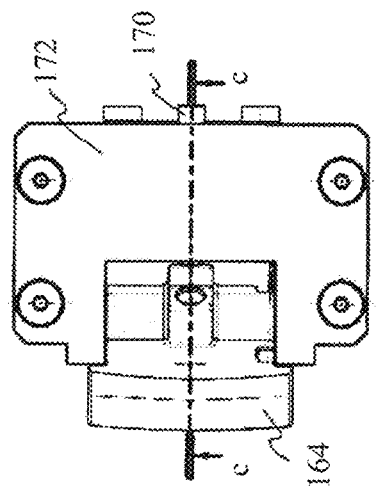
Figure 29A:
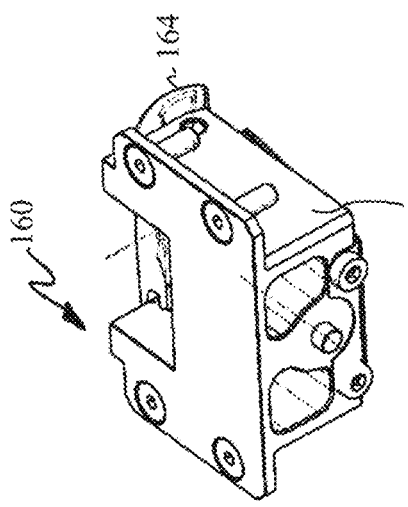
Figure 29C:
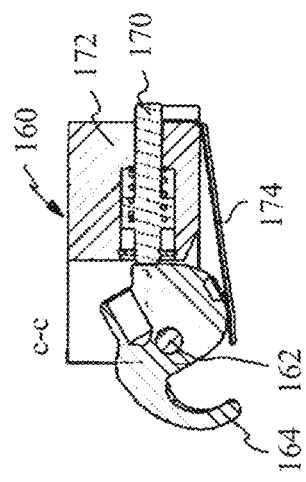

FIG. 21 shows another embodiment according to the invention of a mounting section 20F with a basic cross-like structure.

FIG. 22 shows another attachment according to the invention. The attachment comprises a tread section 16 with a first circumferential segment 100 and a second circumferential segment 102.

The mounting section 20 of the attachment 14G shown in FIG. 22 comprises two segments 77 and 78 that are movable relative to one another, wherein the second movable segment 78 comprises the tensioning device 60.

The tensioning device 60 comprises the transmission 66, which in turn comprises a drive bevel gear 70, which is motion-coupled to an actuating element 68. The drive bevel gear 70 cooperates in turn with the output bevel gear 72 to convert a drive movement of the actuating element 68, which can be exercised via a wrench or an electric drive, for example, into a rotational movement of the coupling means 62.

The rotational movement of the coupling means 62 leads to a thread 74, which is arranged on the coupling means 62 implemented as a threaded rod, being screwed into a mating thread 76, which is arranged on the first movable segment of the mounting section 20. The movable segments 77 and 78 of the mounting section 20 hereby move towards one another or away from one another. Figures g and e each show a section through the tread section and illustrate that this comprises a tread coating 104. The tread coating 104 here has recesses 106, which are introduced from axially inside into the material of the tread coating. The recesses 106 can also be executed as openings, which extend through the entire material of the tread coating 104 or extend from axially outside into the material of the tread coating 104. The tread coating 104 is arranged on a support section 105 of metal, in particular aluminium.

Here the tread coating 104 is clamped between two axial segments 108 and 110 of the tread section that are screwed to one another, wherein the axial segments 108 and 110 of the tread section 16 are screwed to one another here. Each of the circumferential segments 100 and 102 of the tread section 16 is connected to the second movable segment 78 of the mounting section 20 via the fastening devices 38. The first movable segment 77 of the mounting section 20 is only connected to the first circumferential segment 100 of the tread section.

The fastening devices 38 are designed such that the tread section 16 or its circumferential segments 100 and 102 move in axial direction A towards the rim or towards the mounting section 20 fastened on the rim upon fastening.

The attachment 14G shown in FIG. 22 comprises support surfaces 111, which are arranged on support bodies 113, which are affixed in turn to the tread section 16.

When the tread section 16 is affixed in its final position on the vehicle wheel, thus is moved via the fastening devices 38 towards the mounting section 20 or towards the rim 2A, the support surfaces 111 thus lie in one plane with the contact surfaces 30 of the clamping devices 22 and contact the rim flange 10. The tread section 16 receives additional support on the rim flange hereby.

FIG. 23 shows another embodiment of an attachment 14H according to the invention. The embodiment of FIG. 23 resembles that of FIG. 22, wherein the movable segments 77 and 78 of the mounting section 20 have additional arms 26 extending radially outwards, however, which each comprise fastening devices 38 in order to connect the tread section 16 or its circumferential segments 100 and 102 to the movable segments 77 and 78.

FIG. 24 shows an embodiment of an attachment 14I according to the invention in which one of the clamping devices 22 is implemented movably with regard to the mounting section 20. The movement of the clamping device 22 can be tensioned via a coupling means 62 implemented as a threaded rod, via a nut 80 which can be screwed onto the threaded rod.

In the variant of FIG. 24, the tread section 16 has a first circumferential segment 100 and a second circumferential segment 102, wherein the first circumferential segment 100 has a circumferential extension of a little over 240° and the second circumferential segment 102 has a circumferential extension of a little under 120°.

FIG. 25 shows an attachment 143 with an alternative tensioning device 60, which otherwise corresponds to the attachment from FIG. 24. In the embodiment of FIG. 25, the coupling means 62 implemented as a threaded rod, which means bears a toothed wheel 110, can be driven via a worm gear 112, which can be driven in turn via a tool application point 114 from axially outside on the mounting section 20. A tool implemented as an Allen key, for example, can be applied to the tool application point 114 or also an electric drive can be applied, with which the worm gear 112 can be driven.

Another attachment 14K according to the invention is shown in FIG. 26. The attachment 14K from FIG. 26 comprises a mounting section 20, which comprises three clamping devices 22 movable radially inwards via a central tensioning device 60.

The part of the clamping devices 22 bearing the rear grip section is connected respectively via a spring sheet 130 to a coupling section 122 with the coupling device 40, which is designed as a receiving section 64 for the coupling means 62.

The connection between the rear grip section 28 of the clamping devices 22 and the coupling section 122, which comprises the receiving section 64 for the coupling means 62, is designed here to be bendable by the spring sheet 130 in axial direction A or pivotable about the circumferential direction U.

The tensioning movement of the coupling section 122, which movement is directed translationally purely radially inwards, leads, due to a guide device 132 designed here as a ramp-like elevation 132 on the axially external side of the clamping device 22, to a pivot movement of the rear grip section 28 of the clamping device 22 that is directed axially inwards when the coupling section 122 is moved purely translationally radially inwards.

FIG. 27 shows a clamping device 22C that is preloaded radially inwards via a preloading device 133. The preloading device 133 is implemented here in that the coupling means 62 in the form of a threaded rod is connected to a coupling section 122 spring-supported in the clamping device 22C. When the coupling means 62 is screwed into the coupling section 122 or its receiving section 64 and the mating thread 76 arranged in the receiving section 64, first the coupling section 122 is pulled radially inwards and then comes into contact with the part of the clamping device 22C surrounding it, so that the clamping device 22C is also pulled radially inwards. It hereby becomes possible to suspend the clamping device 22C in the rim flange 10, wherein the clamping device 22C engages behind the rim flange 10 due to the spring preloading, although the clamping device 22C has not yet been pulled to a position in which it engages firmly behind the rim flange 10.

FIG. 28 shows a clamping device 22D that has a multipart rear grip section 28. The rear grip section 28 has a main rear grip section 140 and two secondary rear grip sections 142 and 144 arranged laterally thereto. The two lateral secondary rear grip sections 142 and 144 are preloaded radially inwards with regard to the main rear grip section 140 via springs 145. The lateral secondary rear grip sections 142 and 144 hereby grip the rim flange before the main rear grip section 140 is brought into rear engagement with the rim flange via a tensioning device 60 (FIGS. 28c) to e)). Hooking of the clamping device 22D on the rim flange 10 is simplified hereby, as the secondary rear grip sections 142 and 144 grip the rim flange and fix the mounting section 20 on this before the main rear grip section 140 is finally tensioned. The clamping device 22C from FIG. 27 otherwise largely corresponds to the clamping devices 22D as used on the attachment from FIG. 8.

The main rear grip section 140 and the two secondary rear grip sections 142 and 144 arranged laterally to this each form subsections of the multipart rear grip section 28 in FIG. 28 and are movable relative to one another in radial direction R. Here the secondary rear grip sections 142 and 144 each form a first subsection of the rear grip section, which is preloaded with regard to a second subsection of the rear grip section, here the main rear grip section 140, into a position that is in particular offset radially inwards (FIG. 28*c*) and *d*)). The clamping device 22 has a limit stop 150, which is designed so that the first subsections 142, 144 cannot be brought into a position offset radially outwards with regard to the second subsection 140. If the first subsections 142, 144 contact the limit stop 150, then the first subsections 142, 144 are located in a position in which their side facing the rim flange runs flush with that of the second subsection 140 (FIG. 28*e*)).

FIG. 29 shows a securing means 160, which is implemented separately from the clamping devices 22. The securing means 160 is pivotable via the pivot axis 162 such that its positive-locking section 164 with the contact section located thereon can be brought into positive rear engagement with the rim flange 10.

The securing means 160 here comprises a locking mechanism, which comprises a locking means 170, which is preloaded here via a spring and is implemented here as a bolt 170. When the securing means 160 is in the position shown in FIG. 30, it engages behind the rim flange 10 and the spring-preloaded bolt 170 engages in a corresponding receptacle on the securing means 160, so that its positive-locking section 164 is prevented from pivoting out of the position shown in FIG. 30*c*). The securing means 160 as well as the locking mechanism and the spring-preloaded bolt 170 are arranged in a casing 172. A contact element 174 is also arranged on the casing 172. The contact element 174 is coupled to the securing means 160 such that the securing means 160 pivots upon contacting of the contact element 174 from axial direction A out of the position shown in FIG. 29*c*) into the position shown in FIG. 30*c*).

Figure 30B:
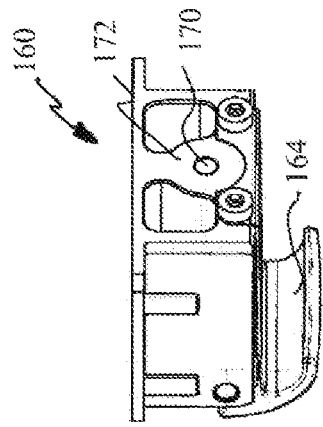
FIG. 30 includes FIGS. 30a)-30d), and shows the securing means from FIG. 29 in a pivoted position.
Figure 30D:
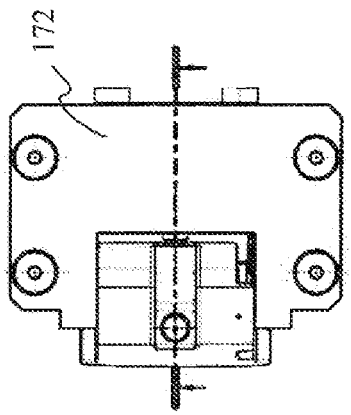
Figure 30A:
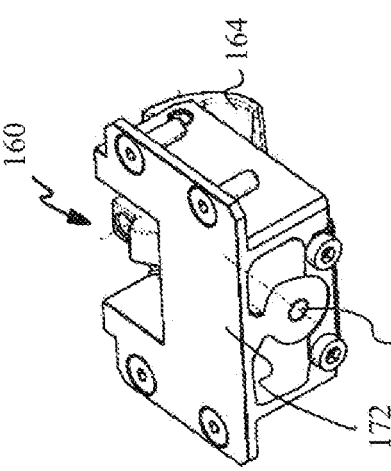
Figure 30C:
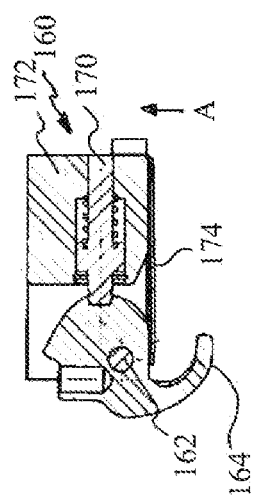

The casing 172 and the locking element 170 implemented as a bolt 170 are designed and arranged relative to one another such that the bolt 170 protrudes by its rear end out of the casing 172 when the securing means 160 is not located in the position shown in FIG. 30*c*). The bolt 170 thus offers an optical indication of whether the securing means 160 and its positive-locking section 164 have engaged behind the rim flange 10.

FIG. 31 illustrates various clamping devices 22E, which each comprise a rear grip section 28 that is designed such that the material of the rear grip sections that lies axially inside (the arrow with the reference character A points axially inwards in FIG. 31) a reference plane 180 lies completely in an imaginary corridor 182.

Here the reference plane 180 lies at a distance 184 of 6 mm in the present example from a contact plane 186. A distance of 4 or 7 mm is also within the meaning of the invention, however. The contact plane 186 corresponds to that plane orthogonal to the axial direction in which the axially outer contact point of the rim flange 10 with the attachment 14 lies when the attachment 14 is fully fastened on the rim flange 10 via the clamping devices 22. The contact plane 186 coincides here with the contact surface 30. The imaginary corridor 182 has a width 188 of 12 mm, in particular of 10 mm, in particular of 9 mm, in particular of 8 mm, in particular of 7 mm, in particular of 6 mm, in particular of 5 mm.

A center line 190 of the imaginary corridor 182 runs at an angle 192 of at least 42°, in particular 45°, in particular 47° (FIG. 31*a*)), in particular 49°, in particular 51°, in particular 53°, in particular 55° and at most in particular 72°, in particular 69°, in particular 67°,(FIG. 31*c*)), in particular 65°, in particular 63°, in particular 61°, in particular 59°, in particular the angle 192 is 57° (FIG. 31*b*)), to the radial direction R.

Here the center line 190 runs radially inwards in a direction directed axially inwards and the angle 192 is measured between the direction of progression of the center line 190 and the direction directed radially inwards (opposite to the arrow with reference character R). The width and the angle of the center line 190 are defined here with reference to a view of a plane running in radial direction R and axial direction A, which corresponds to the image plane from FIG. 31. In particular, this observation plane can lie in the center 198 of the material of the rear grip section 28 in the circumferential direction U. The rear grip section 28 preferably fulfils this condition, however, over its entire circumferential extension 196.

The center line 190 of the imaginary corridor runs in the view of the plane running in a radial and axial direction through the material center point 194 of the rear grip section 28 in its section with the reference plane 180 (FIG. 31*a*) to *c*)). It is also within the meaning of the invention when the center line 190 of the imaginary corridor 182 runs, in the view of the plane running in radial direction R and axial direction A, through the material center point 200 of the rear grip section 28 in its section with a plane 202 that is parallel to the reference plane 180 and in which the axially inner end of the rear grip section 28 lies.

Figures 32A, 32B:
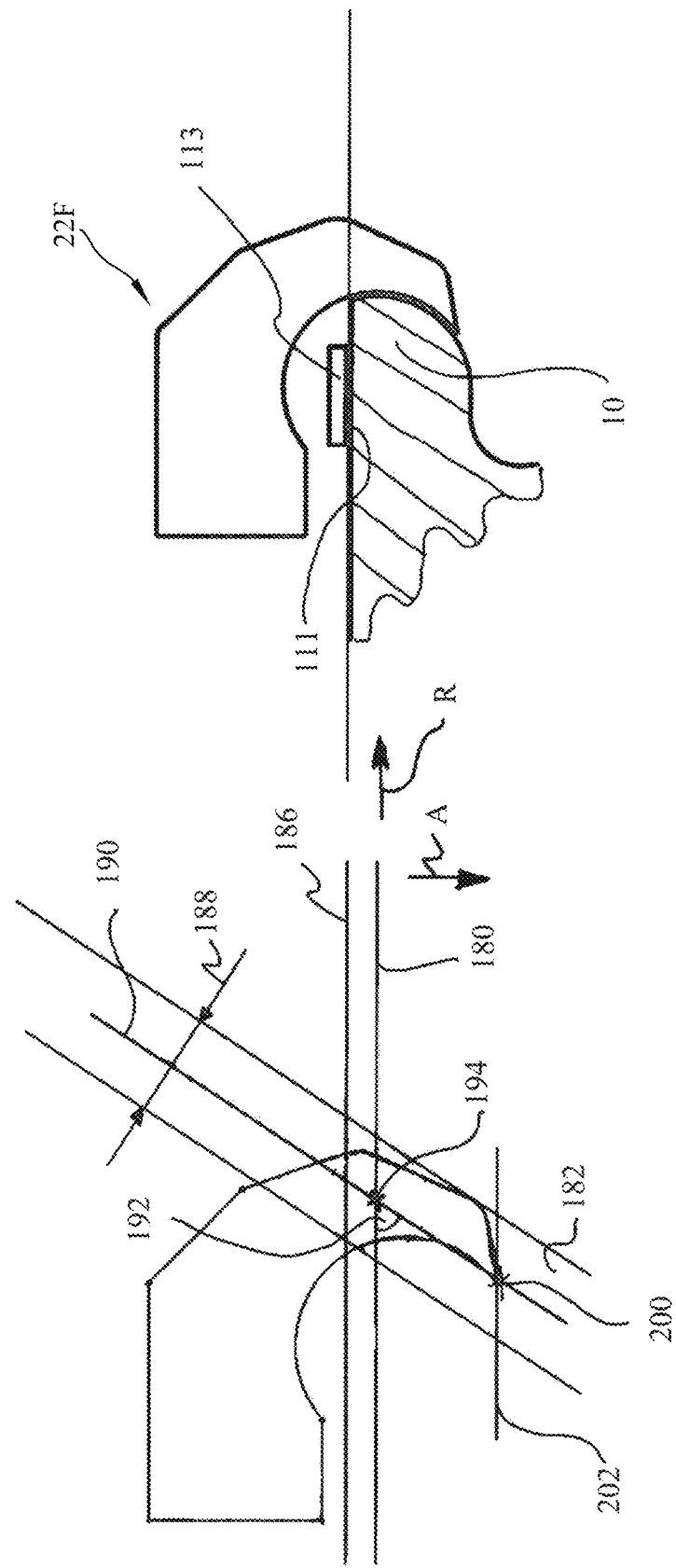
FIG. 32 includes FIGS. 32a)-32b), and shows details of another clamping device according to the invention.

An alternative embodiment of the clamping device 22F is shown in FIG. 32, wherein the rear grip section 28 likewise lies in the imaginary corridor 182. In the embodiment depicted in FIG. 32, the reference plane is spaced at a distance of 4 mm from the contact plane 186. In the case of FIG. 32, the contact plane 186 is formed by the axial position of the support surface 111 arranged on the tread section 16, which surface is arranged offset in circumferential direction U to the clamping device 22F.

In the case of the attachments according to the invention, it can be provided that the tensioning device converts a movement of a traction element 210 directed axially outwards into a movement of the clamping devices 22 directed radially inwards. A mounting section 20G with such a tensioning device 60 is shown in FIGS. 33 and 34.

The tensioning device 60 can be implemented in particular in such a way that it converts an actuating movement BB directed axially outwards into a movement of the coupling sections 122 of the clamping devices 22 directed radially inwards. In particular, the tensioning device 60 can comprise a clamping unit 210, which can be designed as the traction element 210, which can be moved axially outwards via a distance-changing element 220, in particular a threaded rod 220, with regard to a support element 230, wherein the support element 230 can be arranged in the region of the bolt pattern of the wheel disk 2 and can be supported in this region against the wheel disk 2 during the tensioning movement. In particular, the support element 230 has extensions 240 for support on the wheel bolts.

Figure 35C:
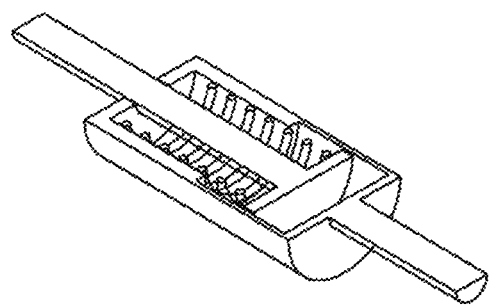
FIG. 35 includes FIGS. 35a)-35c), and shows a preloading mechanism.
Figure 35B:
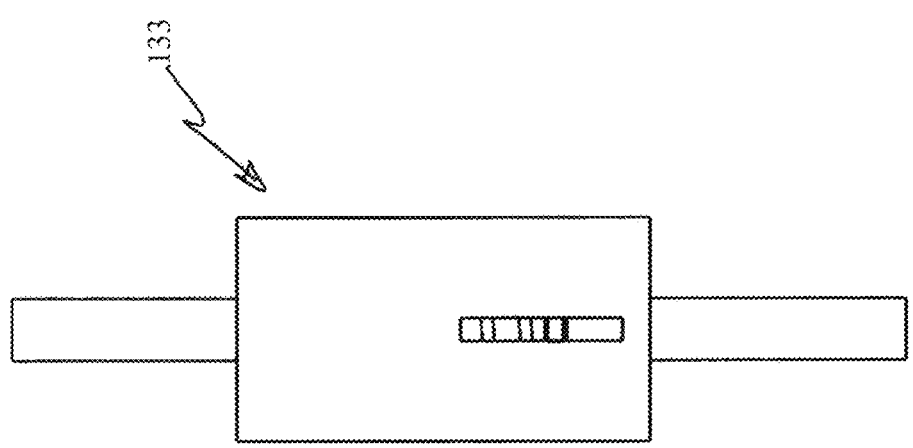
Figure 35A:
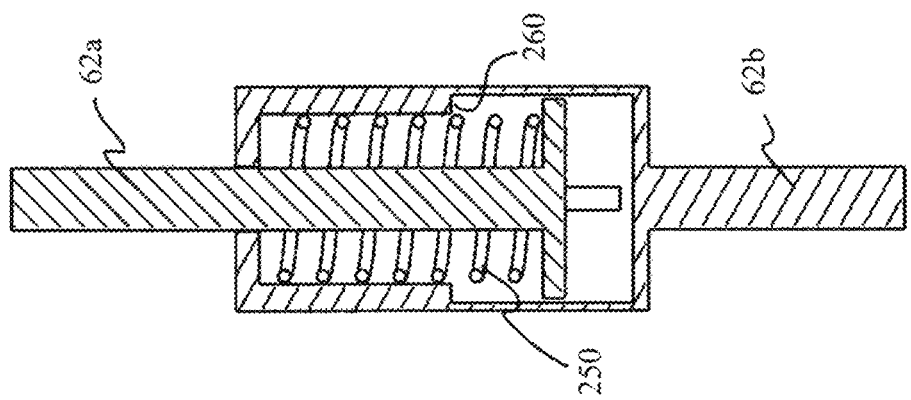

FIG. 35 shows a preloading device 133, which can be integrated into a bar-like coupling means. Two sections of the coupling means 62*a* and 62*b* are tensioned against one another via a spring 250. In the event of tension on the coupling means 62, the two sections of the coupling means 62*a* and 62*b* are first moved away from one another until the section 62*a* abuts on the limit stop 260 and the coupling means 62 as a whole is moved. A preloading device 133 of this kind in particular can also be arranged between coupling section 122 and rear grip section 28 and/or contact surface 30 of the clamping device 22.

Figure 36B:
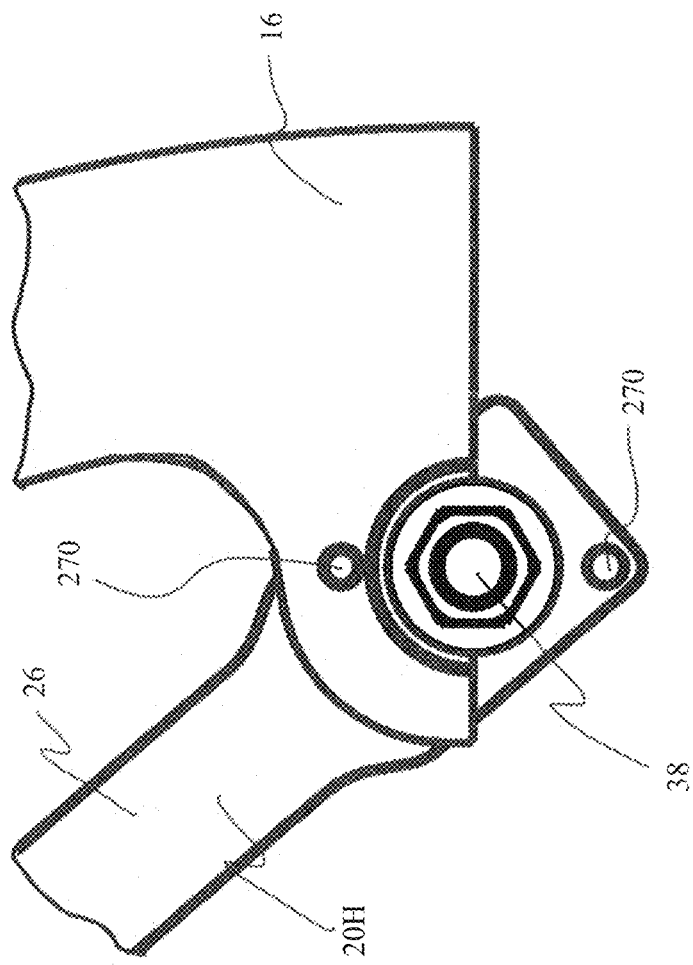
FIG. 36 includes FIGS. 36a)-36b), and shows a detail of a mounting section of an attachment according to the invention.
Figure 36A:
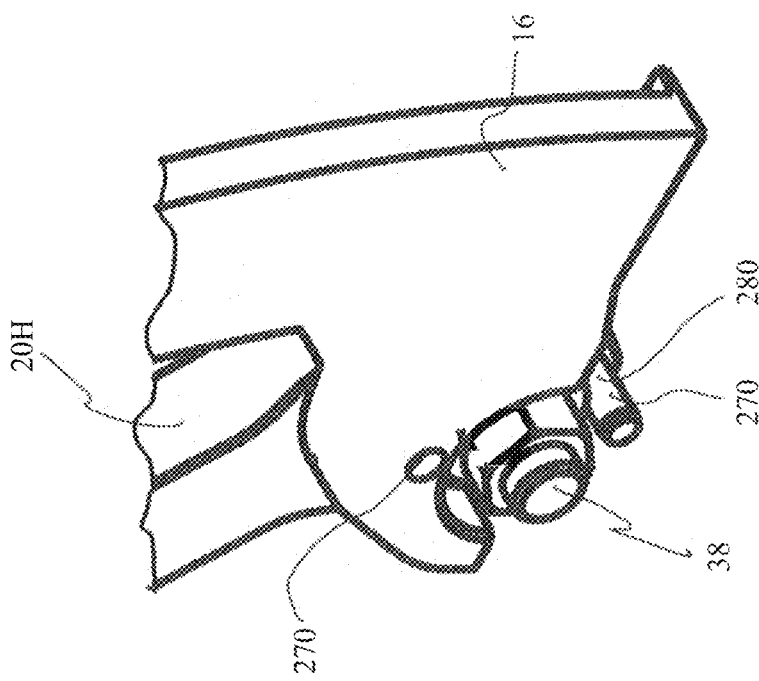

FIG. 36 shows an arm 26 of a mounting section 20H as well as a part of a tread section 16. The mounting section 20H and tread section 16 can have positioning devices 270 coordinated to one another. In particular, the mounting section 20H can comprise at least one, in particular pin-like, guide projection 280 extended in an axial direction A and the tread section 16 can comprise at least one guide opening 290, which is designed complementary to the guide projection 280, so that when the mounting section 20H is already affixed to the vehicle wheel 1, the tread section 16 or a part of the tread section 16 can be placed onto the mounting section 20H such that the guide projection 280 engages in the guide opening 290 and an axial mounting movement of the tread section 16 relative to the mounting section 20H and the vehicle wheel 1 is guided by the engagement of the guide projection 280 in the guide opening 290. It is also conceivable that the guide opening 290 is arranged on the mounting section 20H and the guide projection 280 is arranged on the tread section 16.

Figure 37:
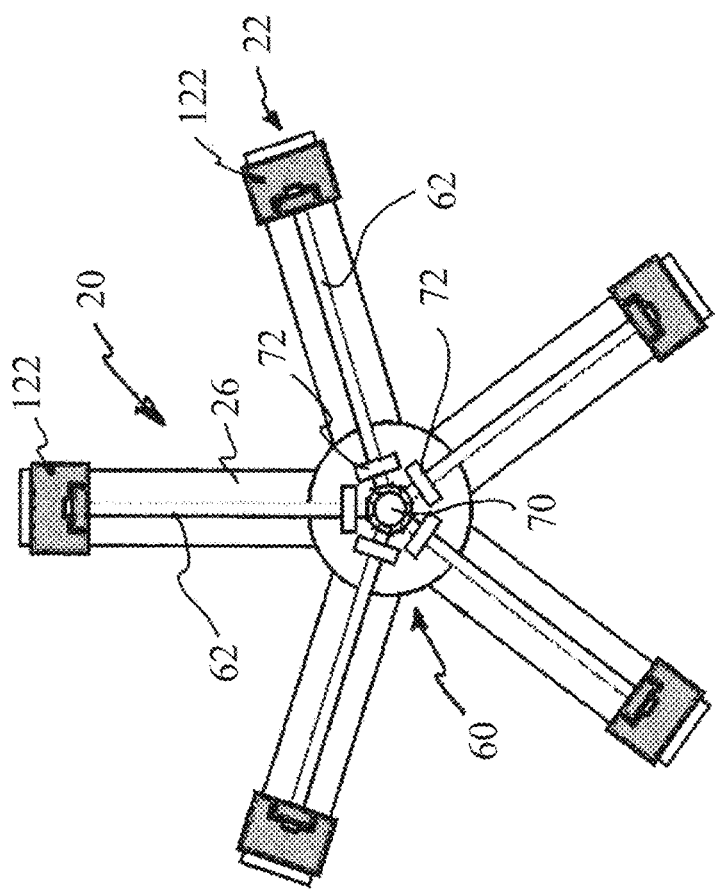
FIG. 37 shows a mounting section of an alternative embodiment of an attachment according to the invention.

In the example of FIG. 37, all five clamping devices 22 are movable via the tensioning device 60, wherein in this embodiment all five clamping devices 22 are connected via a coupling means 62 in each case with an output bevel gear 72 to a central drive bevel gear 70.

Figure 38B:
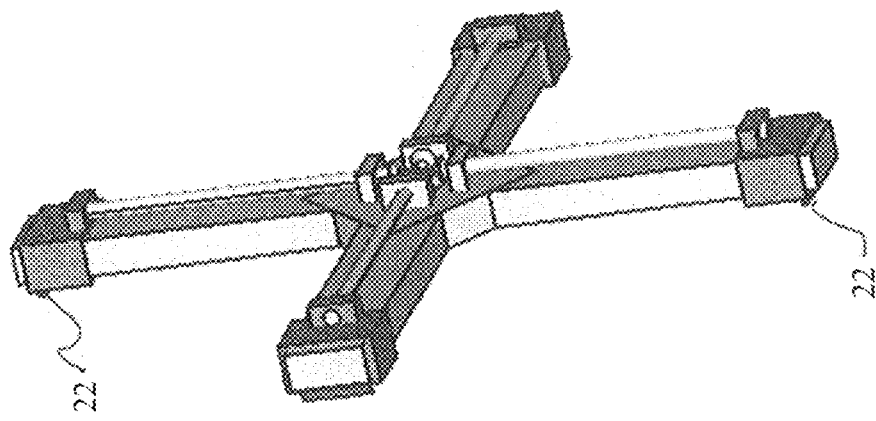
FIG. 38 includes FIGS. 38a)-38b), and shows a mounting section of an alternative embodiment of an attachment according to the invention.
Figure 38A:
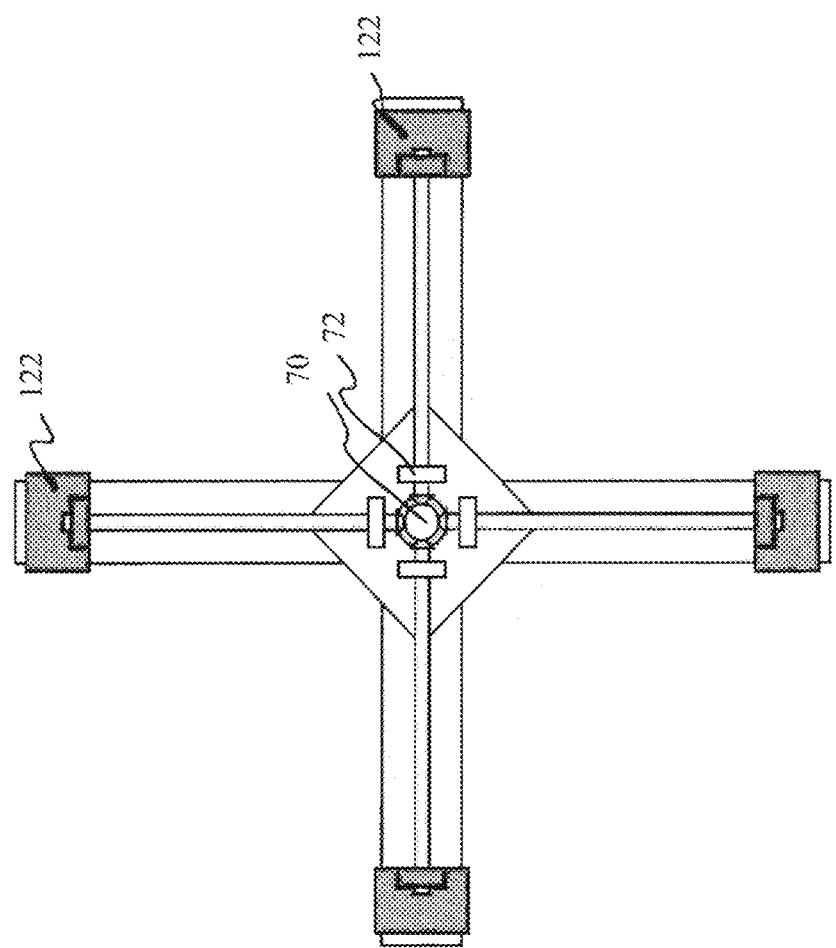

The example of FIG. 38 is implemented correspondingly, but with 4 clamping devices.

Figure 39C:
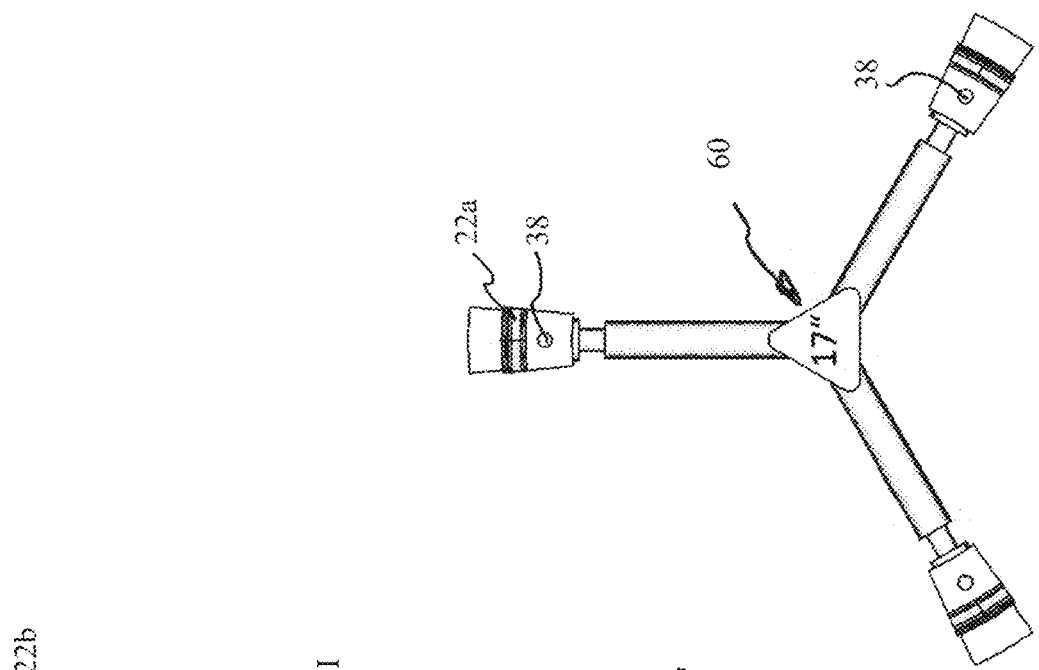
FIG. 39 includes FIGS. 39a)-39c), and shows a mounting section of an alternative embodiment of an attachment according to the invention.
Figure 39B:
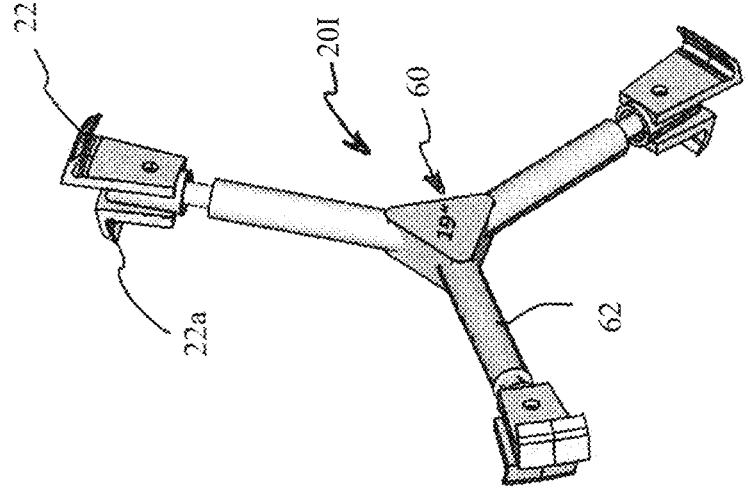
Figure 39A:
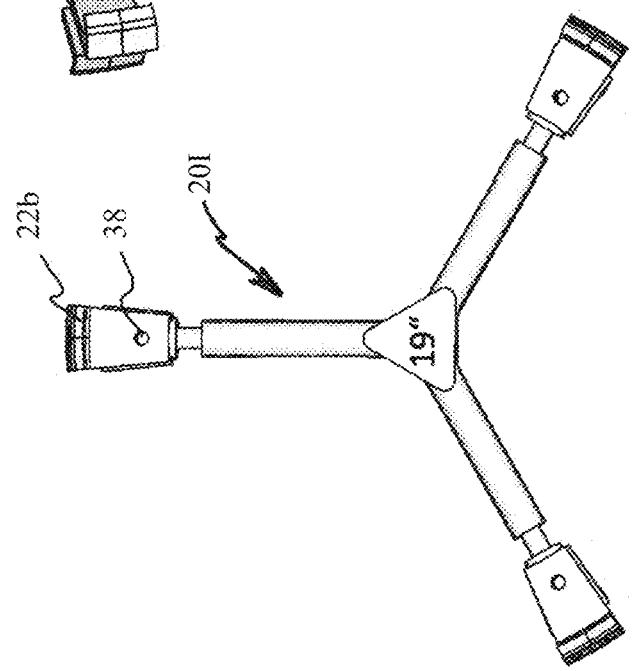

The mounting section 20I from FIG. 39 has clamping devices 22 that are each implemented double-sided, wherein each side is coordinated to another rim diameter, thus one side, for example, can be coordinated to a rim diameter of 17 inches and the other side to a rim diameter of 19 inches. Such double-sided clamping devices 22 can be provided on each of the attachments 14 according to the invention. By simple rotation about 180° the clamping devices 22 can be preset to different rim sizes. They can then be moved via the tensioning device 60 over a minimal distance into the rear engagement.

Figure 40:
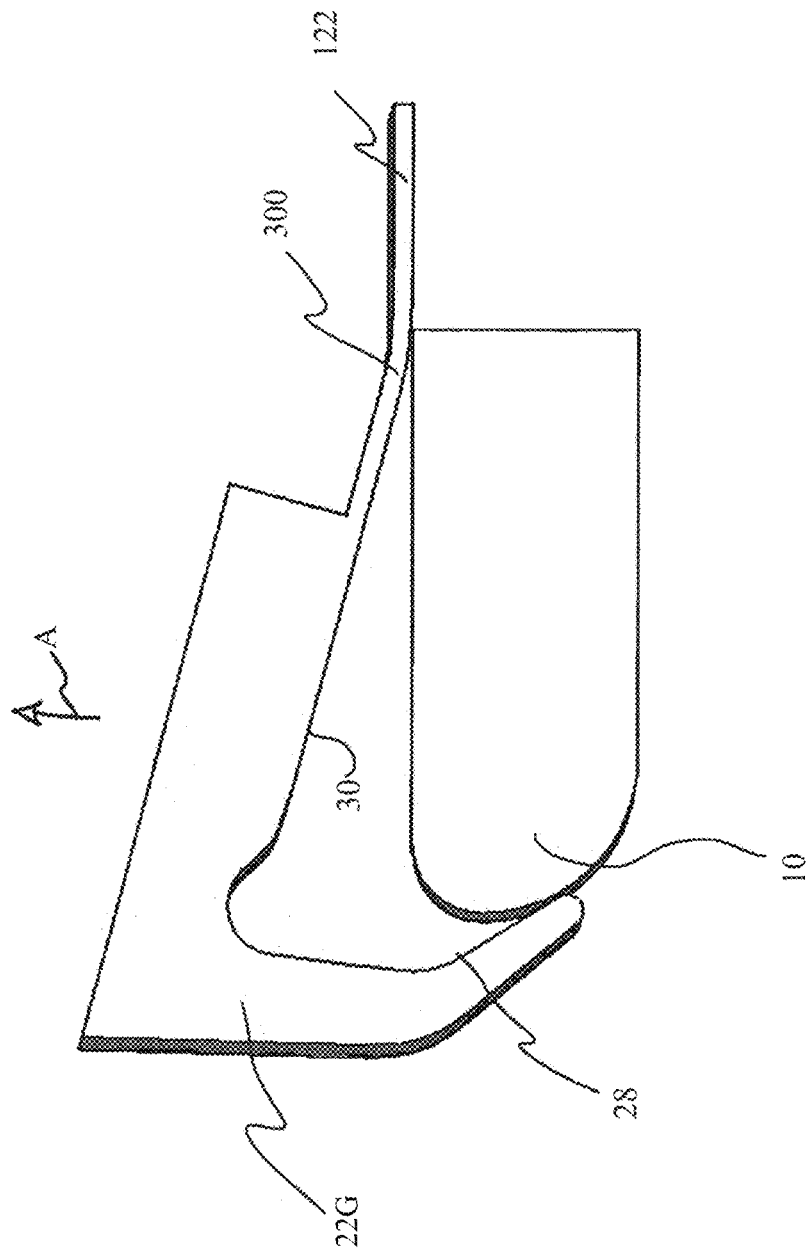
FIG. 40 shows details of another clamping device according to the invention.

FIG. 40 shows a clamping device 22G according to the invention, the coupling section 122 of which is formed by a spring sheet 300. The spring sheet 300 is connected to the contact surface 30 and the rear grip section 28. With regard to the coupling section 122, the rear grip section 28 and the contact surface 30 are pivotable axially outwards relative to the coupling section 122 by the connection by means of the spring sheet 300.

Figure 41B:
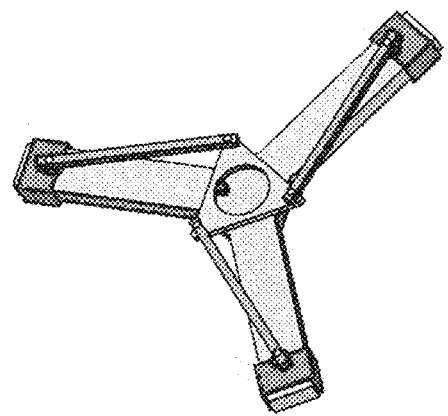
FIG. 41 includes FIGS. 41a)-41b), and shows a mounting section of an alternative embodiment of an attachment according to the invention.
Figure 41A:
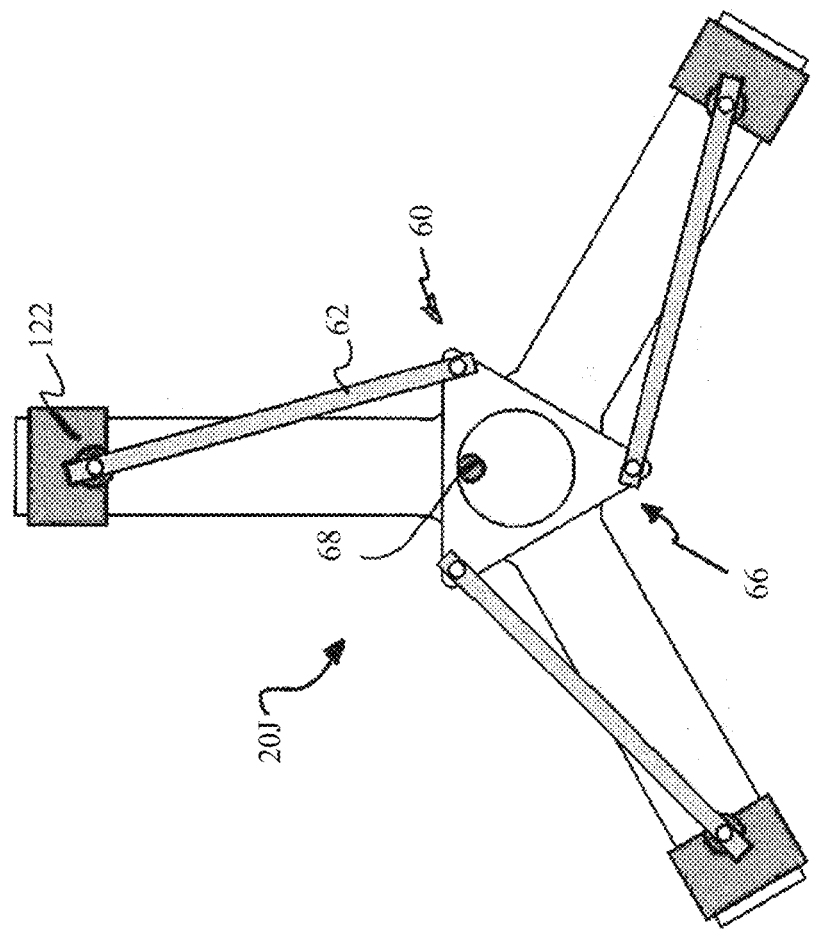

As shown in FIG. 41, the mounting section 20J can have a tensioning device 60 in which the coupling means 62 are pivoted during a rotational movement of the actuating element 68 relative to the coupling section 122, whereby the coupling section 122 is moved radially inwards.

Figure 42B:
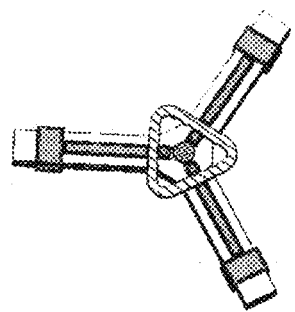
FIG. 42 includes FIGS. 42a)-42b), and shows a mounting section of an alternative embodiment of an attachment according to the invention.
Figure 42A:
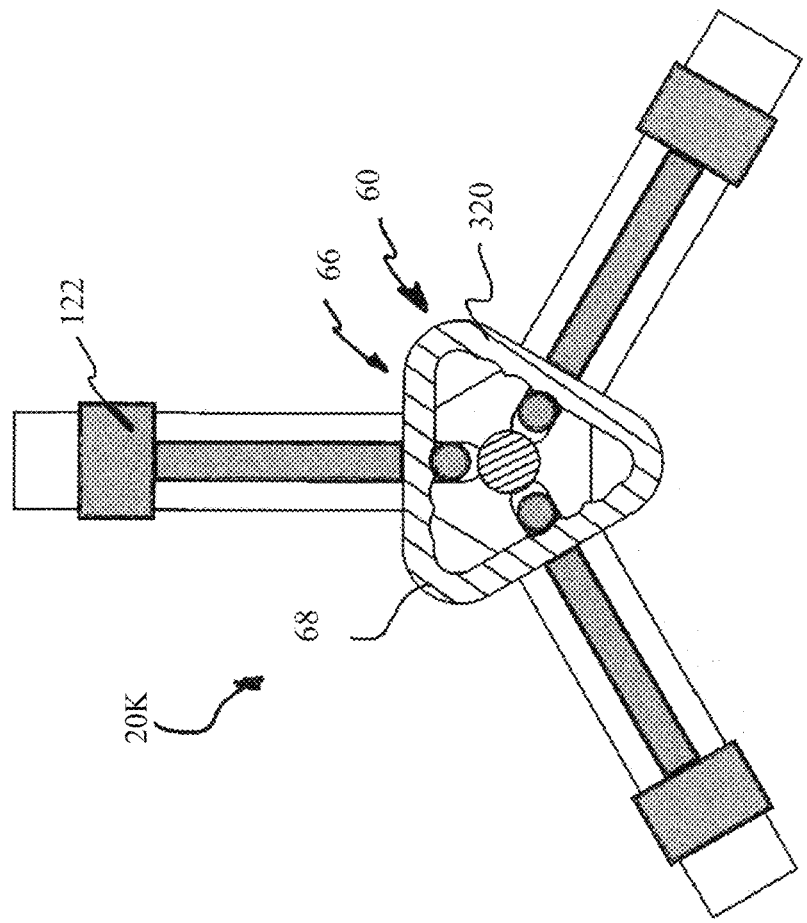
Figure 43B:
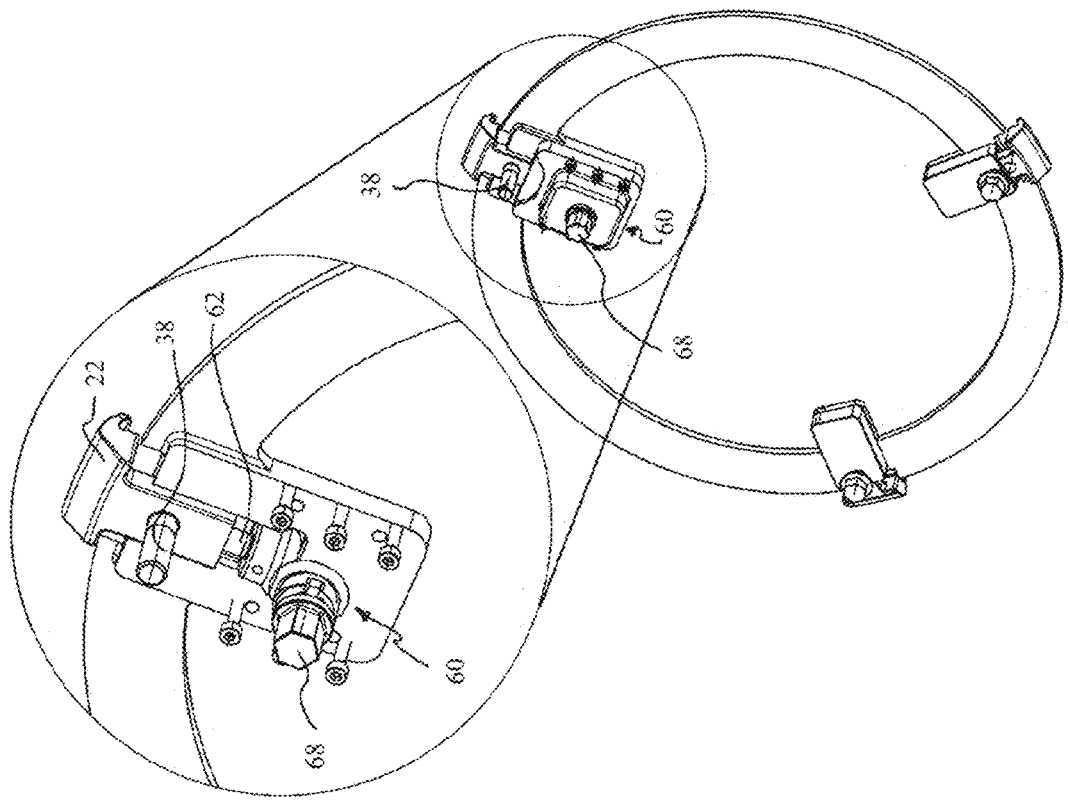
FIG. 43 includes FIGS. 43a)-43e), and shows a mounting section of an alternative embodiment of an attachment according to the invention in various depictions.
Figure 43A:
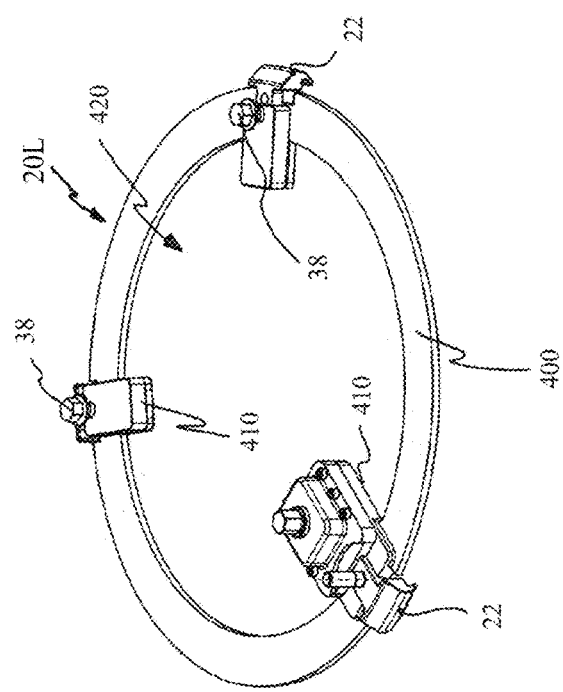
Figure 43E:
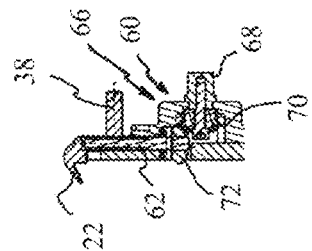
Figure 43D:
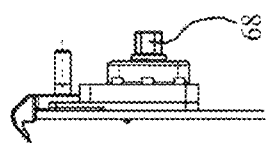
Figure 43C:
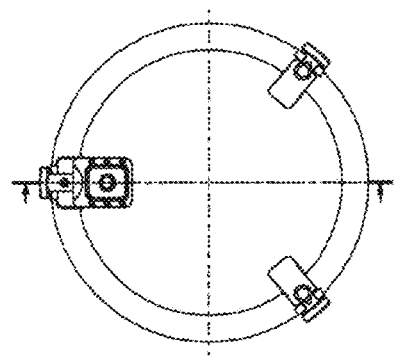
Figure 44B:
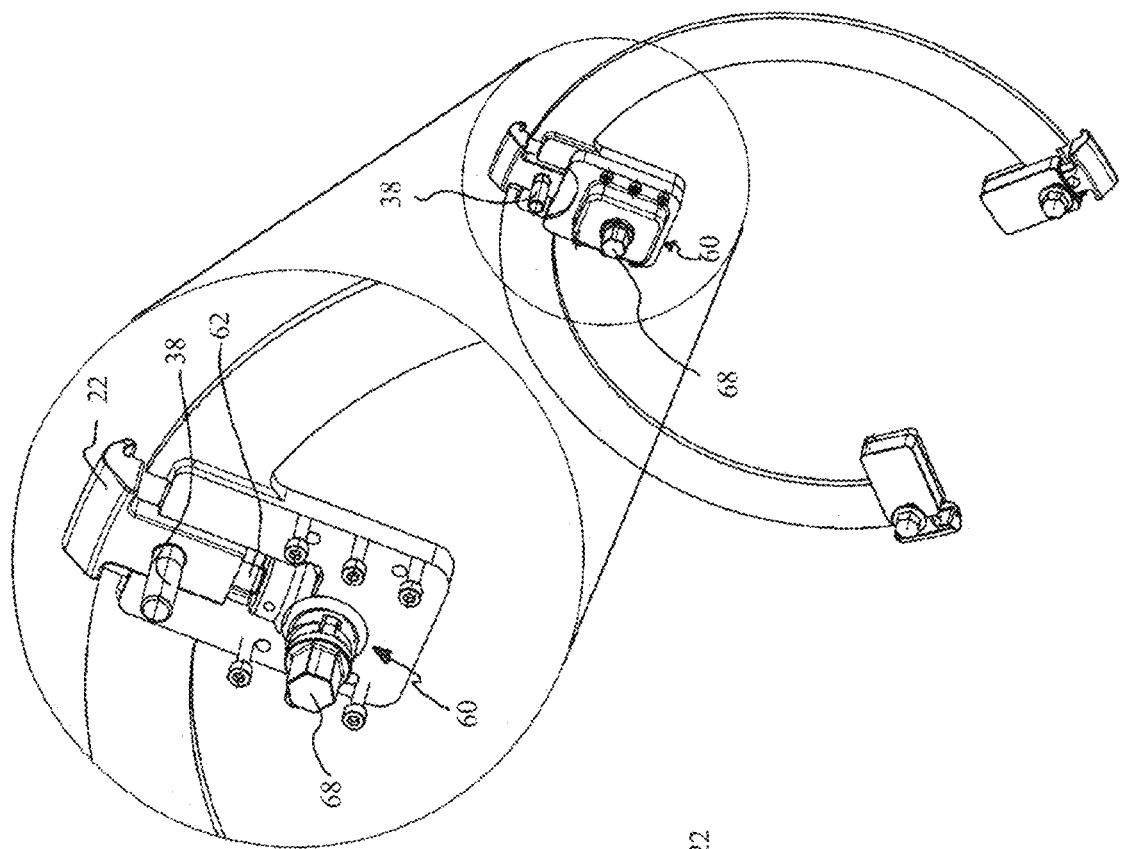
FIG. 44 includes FIGS. 44a)-44e), and shows a mounting section of an alternative embodiment of an attachment according to the invention in various depictions.
Figure 44A:
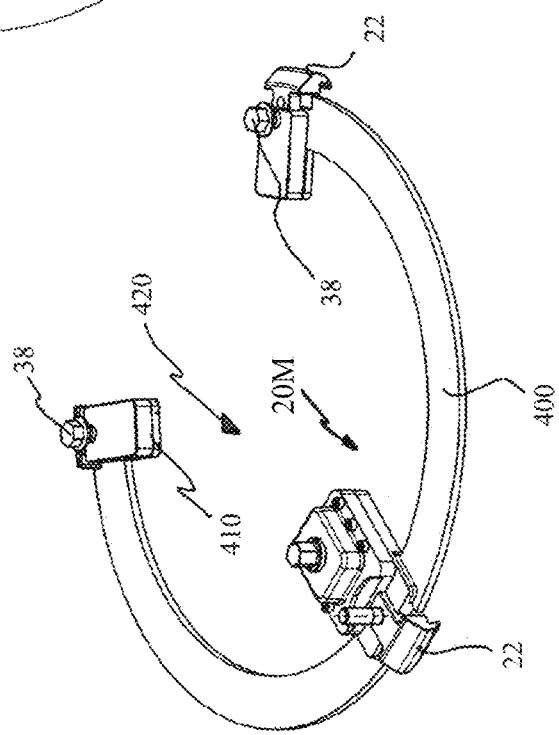
Figure 44C:
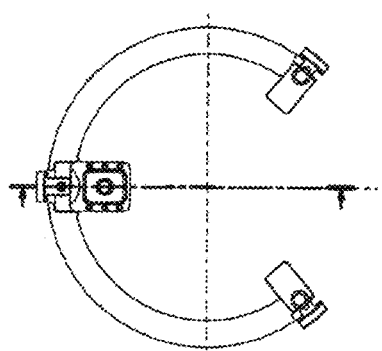
Figure 44D:
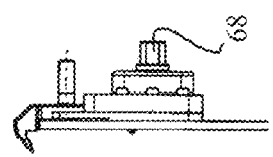
Figure 44E:
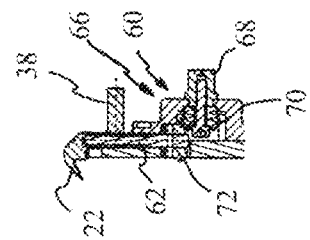

As shown in FIG. 42, the mounting section 20K can have a tensioning device 60 in which the coupling means are coupled to a transmission 66 comprising a curved track 320. The curved track 320 in the present example also forms the actuating element 68 at the same time, wherein upon its rotation about the axial direction, the coupling sections 122 are moved radially inwards.

As shown in FIG. 43, the mounting section 20L can be designed with a tensioning device 60 which is arranged in the region of the clamping device 22. The tensioning device 60 illustrated in FIG. 43 comprises a transmission 66 with a drive bevel gear 70 and an output bevel gear 72, which is coupled to the clamping device 22 via a coupling means 62. Upon actuation of the actuating element 68 or upon rotation of this actuating element 68, the drive bevel gear 70 is set in rotation and engages in the output bevel gear 72, so that this also rotates, whereby the coupling means 62 motion-coupled to the output bevel gear 72 also rotates. The coupling means 62 has a thread, which engages in a corresponding mating thread on the coupling section 122 of the clamping device 22 and can accordingly ensure a translational shift of the clamping device 22. Other types of tensioning devices 66 are likewise conceivable.

The mounting section from FIG. 20 has a basic body 400 here designed in the form of a circular ring. The individual clamping devices 22 are mounted on the basic body 400. In the present example only one of the clamping devices 22 is movable radially inwards for the tensioning device 60.

In the variant in FIG. 43, each of the clamping devices 22 supports a fastening device 38. The clamping devices 22 are received in respective seats 410. The seat 410 of the movable clamping device 22 is designed here such that the latter is displaceable translationally within the seat 410. The use of a tensioning device 60 arranged in the region of the clamping device 22 can be combined with a basic body 400 formed differently, in particular with the other embodiments of the mounting section 20 described in this application.

A basic body 400 of the mounting section 20 that is implemented material-free in the region of the bolt pattern of the vehicle wheel, in particular in combination with a tensioning device 60 which is arranged in the region of the clamping device 22, can be advantageous. Such a mounting section 20 can make it possible, for example, that the attachment 14 can be used in a simple manner for rims 2A that protrude axially outwards in this region. The basic body 400 of the mounting section can, as shown in FIG. 43, be implemented closed in a circumferential direction and circumscribe a central region 420 free of material. Embodiments similar to that depicted in FIG. 44 are also within the meaning of the invention, however. The central material-free region 420 can be only partially enclosed by the basic body 400. The corresponding mounting section 20M can be implemented in a material-saving manner hereby, for example.

Figure 45B:
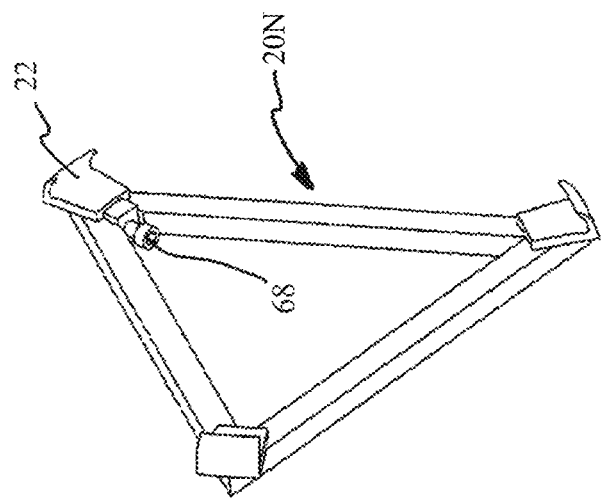
FIG. 45 includes FIGS. 45a)-45b), and shows a mounting section of an alternative embodiment of an attachment according to the invention in various depictions.
Figure 45A:
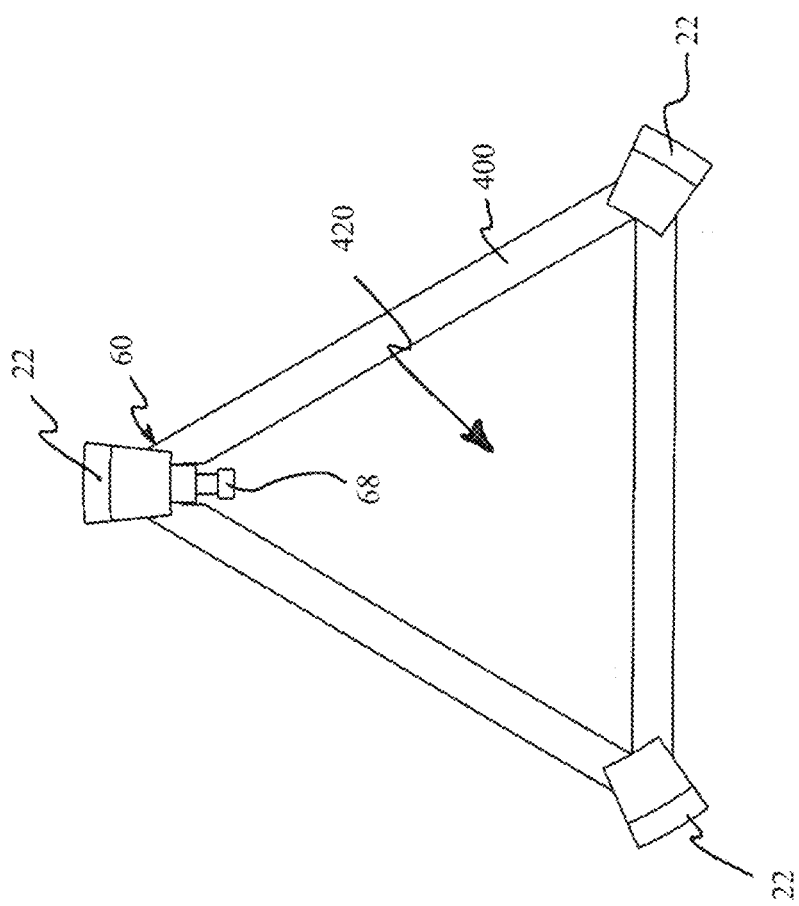

FIG. 45 shows an alternative embodiment of a mounting section 20N, which has a basic body 400 that circumscribes a central material-free region 420 in a closed manner in a circumferential direction U. In the case also of the mounting section 20 as shown in FIG. 45, one of the clamping devices 22 is designed displaceably in a radial direction via a tensioning device 60 arranged in the region of the clamping device 22.

Figure 46B:
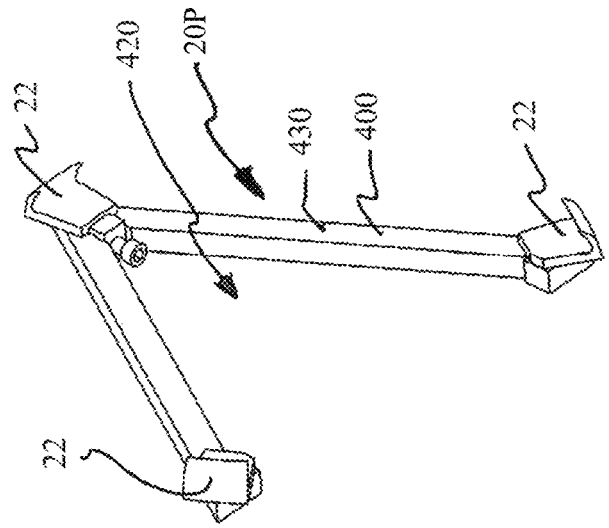
FIG. 46 includes FIGS. 46a)-46b), and shows a mounting section of an alternative embodiment of an attachment according to the invention in various depictions.
Figure 46A:
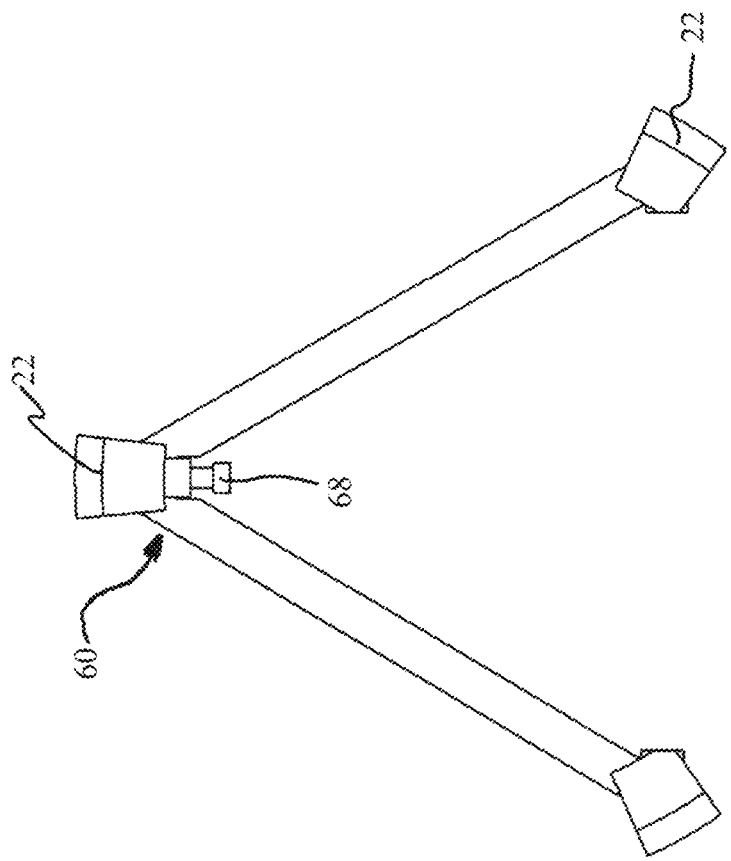

FIG. 46 shows another variant of a mounting section 20P according to the invention, wherein in this variant a central material-free region 420 is circumscribed by two limbs 430 of a basic body 400. The central material-free region 420 is not circumscribed in a closed manner, however.

FIG. 47 shows an attachment 14L according to the invention, which has a tensioning device 60 with an electric drive 440. An electric drive 440 of the tensioning device 60 can be provided in the case of all embodiments of the attachment 14.

The electric drive 440 in the present example is designed to set the coupling means 62 in rotation, which can then interact via a thread for translational displacement of the clamping device 22. An electric drive of this kind for tensioning the clamping devices 22 can be provided in the case of all mounting sections described in this application. The electric drive 440 can be actuated here via two actuating elements 450, wherein these actuating elements 450 can be pressed radially inwards to actuate the electric drive 440 and can be used at the same time as handles for applying the mounting section 20 to the vehicle wheel 1. The direction of rotation of the electric drive 440 can be set here via a selector unit 460 on the attachment 14, so that the electric drive 440 can be used both for tensioning and releasing the attachment 14 or the mounting section 20.

Figures 48A, 48B:
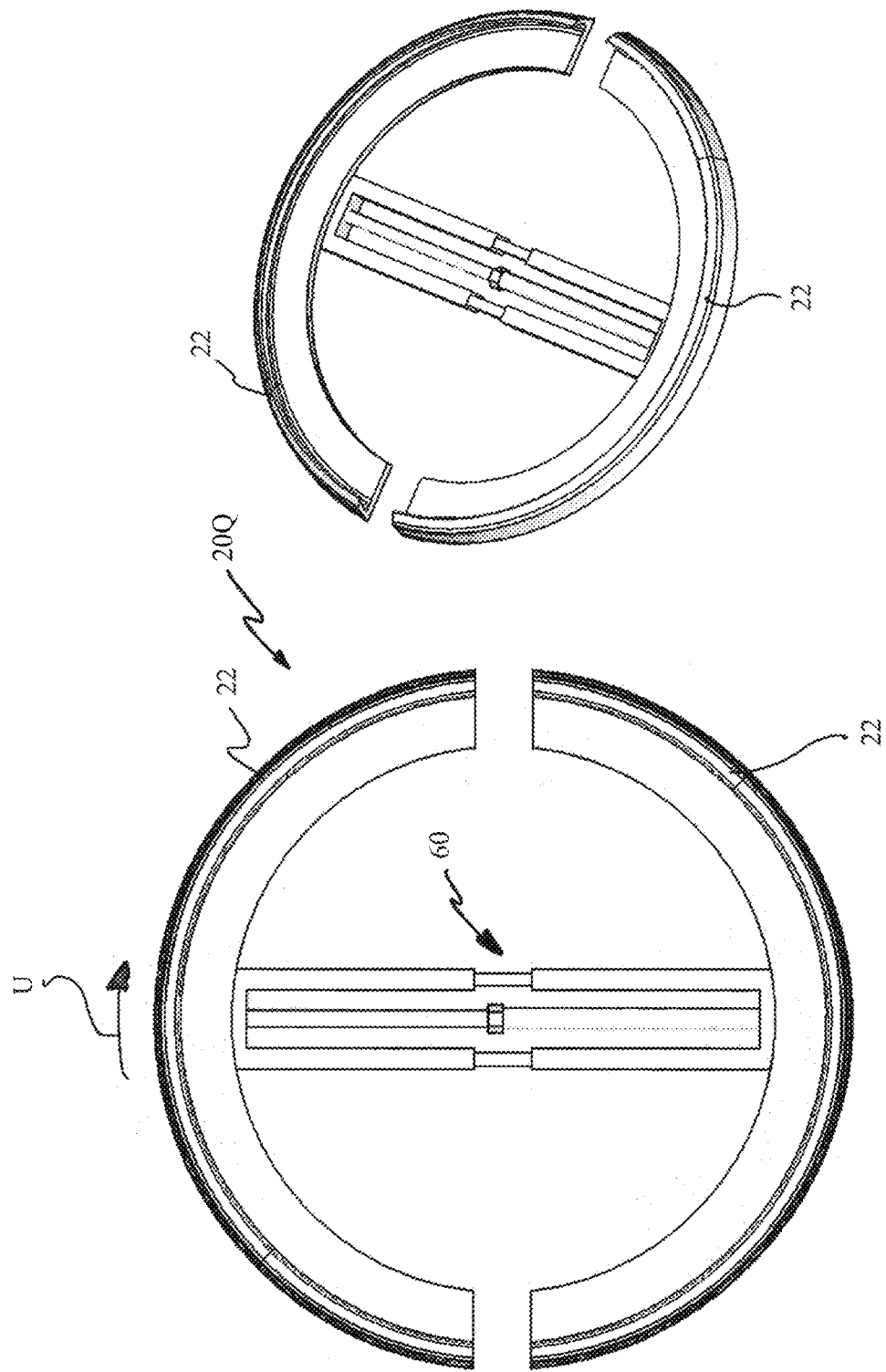
FIG. 48 includes FIGS. 48a)-48b), and shows a mounting section of an alternative embodiment of an attachment according to the invention.

FIG. 48 shows another variant of a mounting section 20Q of an attachment according to the invention. The mounting section 20 from FIG. 48 comprises clamping devices 22, which have an extension in the circumferential direction of approximately 180°. Such clamping devices 22 permit contact over a very large area with the rim flange 10 of the vehicle wheel. The mounting section 20 in the embodiment of FIG. 48 is otherwise designed similar to that of FIG. 15.

FIG. 49 shows a clamping device 22H according to the invention that has fluting 462 on its axially outer side to improve the contact with the tread section 16.

FIG. 50 illustrates that a clamping device according to the invention can have one or more coatings. For example, the clamping devices 221 according to the invention can have a coating 470 in the region of the contact surface 30 that is designed to increase adhesion. In particular, a rubber coating is provided in this region. A likewise adhesion-enhancing coating 480 can be provided in the region of the rear grip section 28, in particular in the region of the retaining section 42, which coating can likewise be designed in particular as a rubber coating. In the region of the insertion section 44, a friction-reducing coating 490 in particular can be provided, which can be implemented in particular as a Teflon coating, for example. The coating in the region of the insertion section 44 can be arranged on the radially inner and/or the radially outer side of the insertion section 44. The coating of the insertion section 44 can in particular cover the complete radially outer upper side of the rear grip section 28.

Figure 51E:
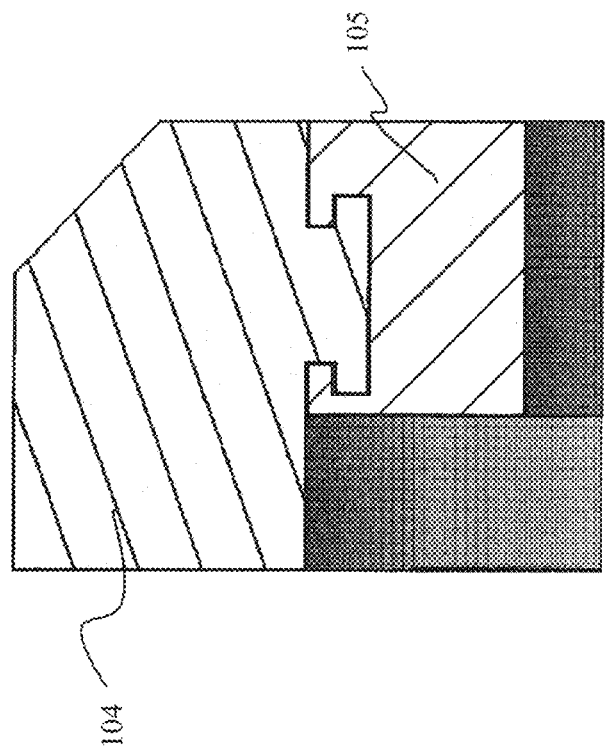
FIG. 51 includes FIGS. 51a)-51e), and shows a tread section of an alternative embodiment of an attachment according to the invention.
Figure 51D:
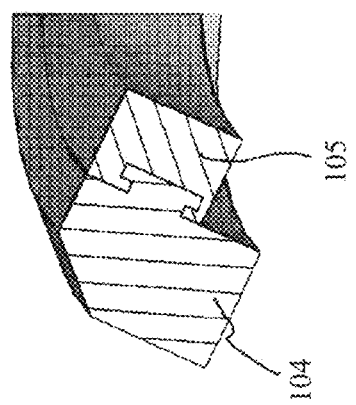

FIG. 51 illustrates that on the attachments 14 according to the invention, the support section 105 can be implemented protruding axially inwards. It is also conceivable, as shown in the two illustrations in FIG. 51, that the support section 105 is designed without a protruding section 480, but that the tread coating 104 protrudes axially inwards instead. Particularly high stability can result, however, due to the use of a support section 105 with a section 480 protruding axially inwards.

Figure 52B:
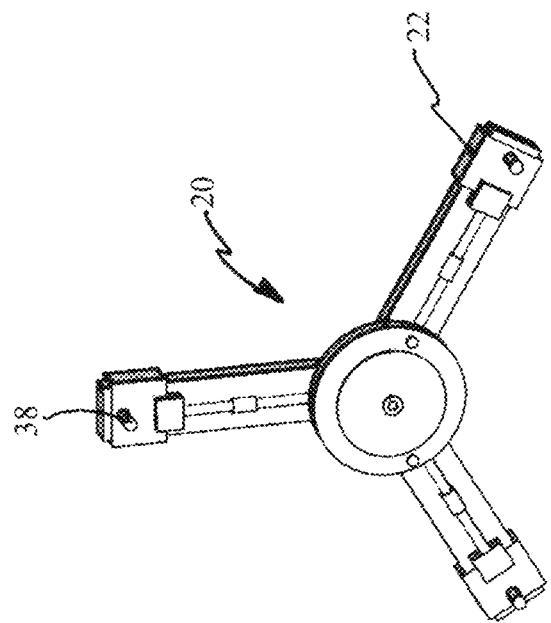
FIG. 52 includes FIGS. 52a)-52b), and shows a mounting section of an alternative embodiment of an attachment according to the invention.
Figure 52A:
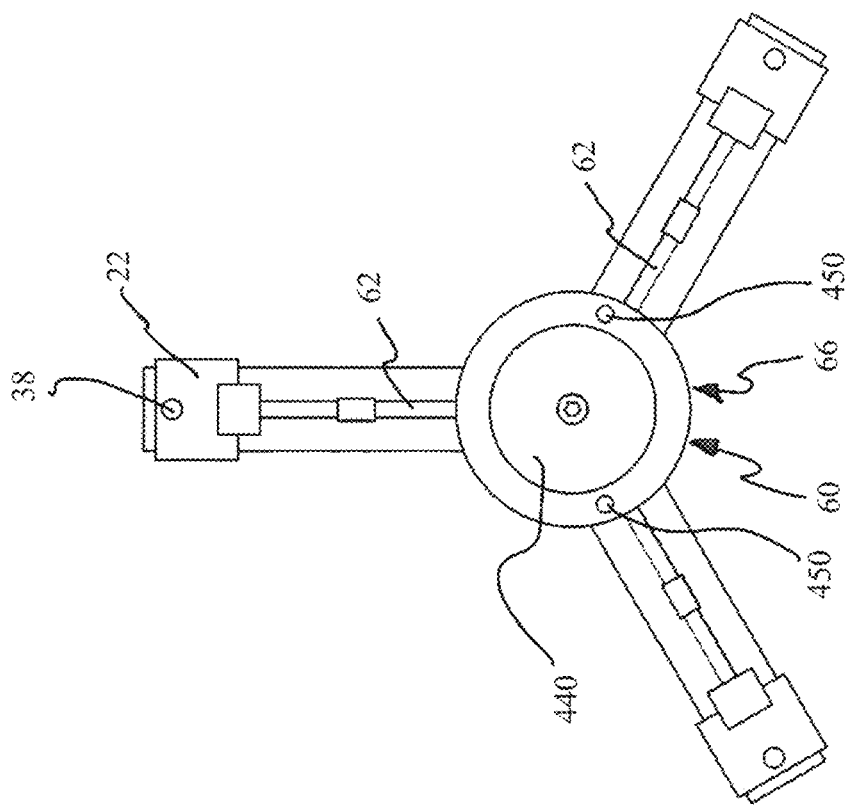

FIG. 52 illustrates that an electric drive can also be arranged centrally and can move several clamping devices 22 in a motion-coupled manner radially inwards or outwards. The electric drive 440 from FIG. 52 comprises actuating elements 450 that are designed as operating knobs 450 with which the clamping devices 22 can be moved via the electric drive 440 respectively radially inwards or radially outwards.

In the depiction of FIG. 52, the electric drive 440 conceals the transmission 60, which can be designed similar to the transmission 66 from FIG. 8. The transmission 66 can be designed to convert a rotational movement introduced by the electric drive 440 into the transmission, for example via the actuating element 68, similarly as in FIG. 8, into the corresponding rotational movement of the coupling elements 62.

To supply power to the electric drive 440 of an attachment 14 according to the invention, both the onboard voltage network of the vehicle can be used, for example via a 12V plug socket in the boot, or the cigarette lighter, or an outside power supply, for example an electric energy store, an accumulator or also a battery can be used.

Figure 53B:
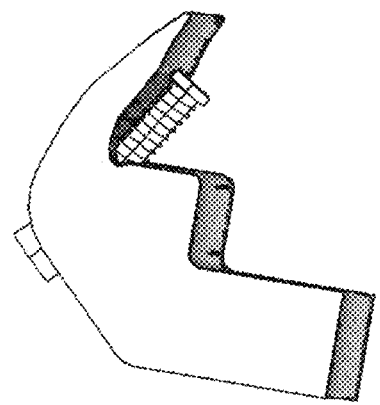
FIG. 53 includes FIGS. 53a)-53b), and shows details of another clamping device according to the invention.
Figure 53A:
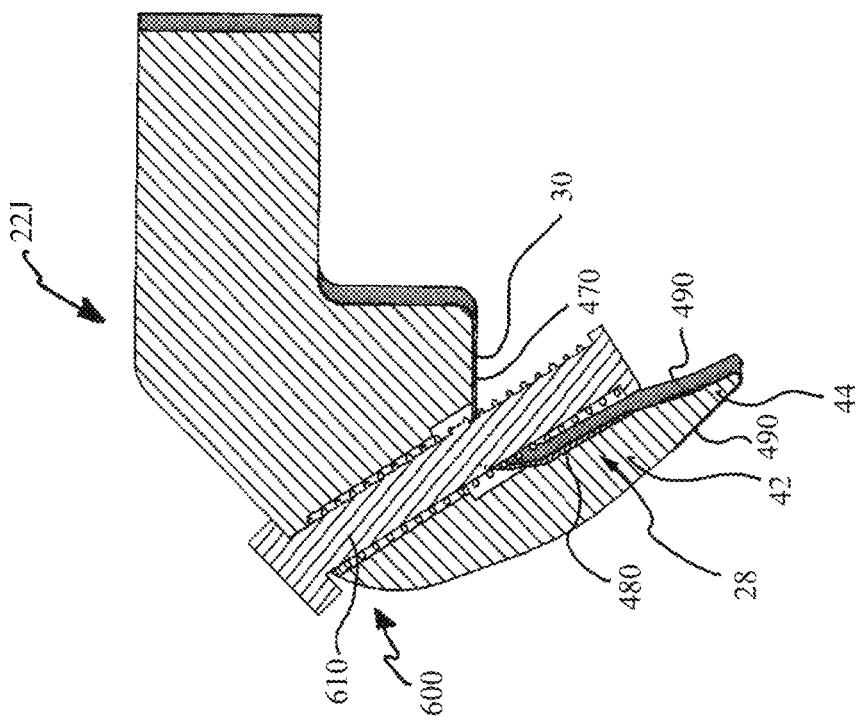
Figure 54B:
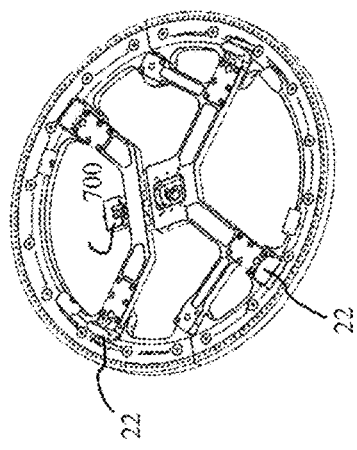
FIG. 54 includes FIGS. 54a)-54g), and shows an attachment of an alternative embodiment in various depictions.
Figure 54C:
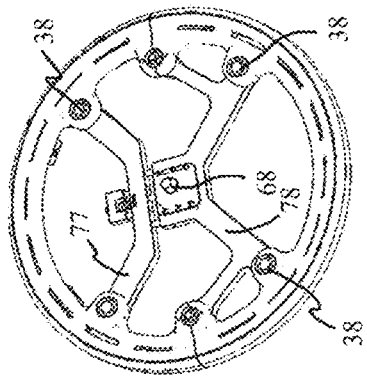
Figure 54G:
Figure 54A:
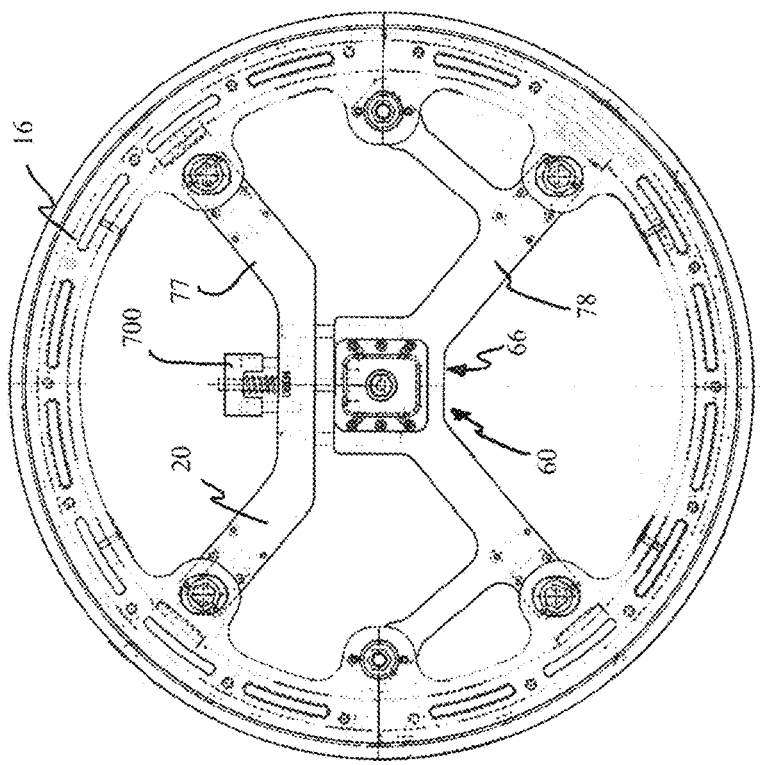
Figure 54F:
Figure 54E:
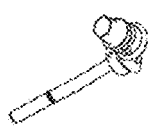
Figure 54D:
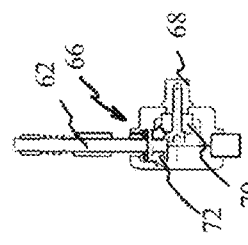

With regard to the attachments 14 according to the invention and the clamping devices 22 according to the invention, it can be provided, as illustrated in FIG. 53, that an in particular mechanical indication device 600 is provided, which is associated with a clamping device 223 and via which it is recognisable whether the clamping device 223 is in rear engagement, preferably whether the clamping device 223 is in rear engagement with the rim flange 10 in the envisaged position, in particular wherein the indication device 600 comprises a spring-loaded element 610, which is clamped in the region of the rear grip section 28 in the envisaged position of the rim flange 10 in such a way that on engaging behind the rim flange 10 it is pushed by the contact with the rim flange 10 out of this position and preferably projects beyond this on the axially and/or radially outer side of the clamping device 223, so that it is recognisable from this direction whether the rim flange 10 is engaged behind as provided. The indication device 600 or its spring-loaded element 610 can also be arranged offset to the clamping device 223 in a circumferential direction U. The indication device 600 or its spring-loaded element 610 can also be integrated into the clamping device 223, however, as illustrated in FIG. 53.

The spring-loaded element 610 of the indication device 600 can extend in particular through the material of the clamping device 223. In particular, the tensioning direction of the spring-loaded element 610 can be parallel to the course of the retaining section 42 of the clamping device 223.

FIG. 54 shows an embodiment of the attachment according to the invention that is designed similar to that shown in FIG. 22. In the embodiment shown in FIG. 54, it is clearly illustrated that the two segments 77, 78 of the mounting section 20 that are movable relative to one another can be tensioned towards one another. As illustrated in FIG. 54, the coupling means 62 can be rotatable, for example, via the transmission 66, which is constructed similarly to that shown in FIG. 22, so that a traction element 700 can be moved via the coupling means 62 in a radial direction R. To this end the coupling means 62 here has an external thread and the traction element 700 an internal thread. The first movable segment 77 is tensioned via a spring 710 away from the traction element 700 in the direction of the second movable segment 78.

The invention claimed is:

1. A The clamping device for tensioning an attachment on a rim of a vehicle wheel, wherein the attachment is configured to enable a driving operation with a restricted tire function in an operating state in which the attachment is fastened on the vehicle wheel, the clamping device comprising:
    a rear grip section, configured as a hook, which protrudes in an axial direction and runs radially inwards in a section through a section plane running in a radial and axial direction for positive engagement behind a rim flange of the rim of the vehicle wheel,
    the rear grip section transitions into a contact surface configured to contact the rim flange from axially outside,
    the rear grip section has a retaining section configured to take up clamping forces, and an insertion section configured to enable insertion of the rear grip section between the rim flange and a tire side wall adjacent to the rim flange, wherein the insertion section is arranged axially inside relative to the retaining section, and
    the insertion section has a surface facing the rim flange that runs, viewed in the section plane running in a radial and axial direction, at a flatter angle relative to the axial direction than a surface of the retaining section facing the rim flange.

2. A clamping device for tensioning an attachment on a rim of a vehicle wheel, wherein the attachment is configured to enable a driving operation with a restricted tire function in an operating state in which the attachment is fastened on the vehicle wheel, the clamping device comprising:

a rear grip section configured for positive engagement behind a rim flange of the rim of the vehicle wheel, the rear grip section is pivotable about an axis, which runs tangentially to the circumferential direction, relative to at least a part of a remainder of the clamping device and is positionable in at least a first position and a second position pivoted about the axis to the first position, the rear grip section is configured as a hook protruding in an axial direction and running radially inwards in a section through a section plane running in a radial and axial direction in the first position, the rear grip section has a retaining section configured to take up clamping forces, and an insertion section configured to enable insertion of the rear grip section between the rim flange and a tire side wall adjacent to the rim flange, wherein the insertion section is arranged axially inside relative to the retaining section, and the insertion section has a surface facing the rim flange that runs, viewed in the section plane running in a radial and axial direction, at a flatter angle relative to the axial direction than a surface of the retaining section facing the rim flange.

3. The clamping device according to claim 2, further comprising a contact surface configured and arranged to contact the rim flange from axially outside, wherein the rear grip section is pivotable relative to the contact surface.

4. The clamping device according to claim 1, wherein the rear grip section transitions into the contact surface in a transition region, wherein a surface of the transition region between the rear grip section and the contact surface has a recessed section arranged offset axially outwards in an axial direction relative to the contact surface.

5. The clamping device according to claim 1, further comprising a fastening section to connect the clamping device to the attachment.

6. The clamping device according to claim 1, wherein at least one of the retaining section has an adhesion-enhancing coating and the insertion section has an adhesion-reducing coating.

7. The clamping device according to claim 6, wherein at least one of the insertion section has a smaller material thickness than the retaining section and the insertion section has a material thickness that decreases axially inwards.

8. The clamping device according to claim 6, wherein the retaining section extends further in a circumferential direction than the insertion section.

9. The clamping device according to claim 6, wherein at least one of the retaining section has a section tapering axially inwards in a circumferential extension of the retaining section and the insertion section has a section tapering axially inwards in a circumferential extension of the insertion section or tapers axially inwards in the circumferential extension of the insertion section over an entire extension of the insertion section.

10. The clamping device according to claim 1, wherein the contact surface lies in a plane running in a radial or circumferential direction.

11. The clamping device according to claim 1, wherein at least one of the surface of the insertion section facing the rim flange side, viewed in the section plane running in a radial and axial direction, runs relative to the axial direction at an angle of at least 10°, and the surface of the retaining section facing the rim flange side, viewed in the section plane running in a radial and axial direction, runs relative to the axial direction at an angle of at least 16°.

12. The clamping device according to claim 1, wherein at least one of the surface of the insertion section facing the rim flange side, viewed in the section plane running in a radial and axial direction, runs relative to the axial direction at an angle of at most 40°, and the surface of the retaining section facing the rim flange side, viewed in the section plane running in a radial and axial direction, runs relative to the axial direction at an angle of at most 50°.

13. The clamping device according to claim 1, further comprising a securing means, which is arranged on the clamping device offset in a circumferential direction to the rear grip section and pivotably about a pivot axis, which runs tangentially to the circumferential direction, wherein the securing means comprises a positive-locking section configured to be brought into a positive rear engagement with the rim flange by pivoting the securing means.

14. The clamping device according to claim 13, wherein the positive-locking section of the securing means comprises a contact section configured to contact the rim flange on a side of the contact section facing the tire, wherein the contact section is shaped corresponding to the contour of the rim flange.

15. The clamping device according to claim 1, further comprising a multipart rear grip section with subsections that are movable relative to one another in a radial direction.

16. The clamping device according to claim 1, wherein the rear grip section is configured such that the material of the rear grip section lying axially inside a reference plane lies completely in an imaginary corridor, wherein the reference plane is arranged at a distance of 4, 6 or 7 mm from a contact plane that coincides with the contact surface, wherein the contact plane is a plane running in a radial direction and circumferential direction in which the axially outer contact point of the rim flange with the clamping device lies, wherein the imaginary corridor has a width of 12 mm or 10 mm or 9 mm or 8 mm or 7 mm or 6 mm or 5 mm or 4 mm and has a center line that runs at an angle of at least 42° to the radial direction, wherein the width and the angle of the center line are defined with reference to a view of a plane running in a radial and axial direction.

17. The clamping device according to claim 16, wherein at least one of the center line of the imaginary corridor runs, in a view of the plane running in a radial and axial direction, through a material center point of the rear grip section in a section of the rear grip section with the reference plane and the center line of the imaginary corridor runs, in a view of the plane running in a radial direction and axial direction, through the material center point of the rear grip section in a section of the rear grip section with a plane parallel to the reference plane in which an axially inner end of the rear grip section lies.

18. The clamping device according to claim 3, wherein the rear grip section transitions into the contact surface in a transition region, wherein a surface of the transition region between the rear grip section and the contact surface has a recessed section arranged offset axially outwards in an axial direction relative to the contact surface.

19. The clamping device according to claim 3, further comprising a fastening section to connect the clamping device to the attachment.

20. The clamping device according to claim 2, wherein at least one of the retaining section has an adhesion-enhancing coating and the insertion section has an adhesion-reducing coating.

21. The clamping device according to claim 20, wherein at least one of the insertion section has a smaller material thickness than the retaining section and the insertion section has a material thickness that decreases axially inwards.

22. The clamping device according to claim 20, wherein the retaining section extends further in a circumferential direction than the insertion section.

23. The clamping device according to claim 20, wherein at least one of the retaining section has a section tapering axially inwards in a circumferential extension of the retaining section and the insertion section has a section tapering axially inwards in a circumferential extension of the insertion section or tapers axially inwards in the circumferential extension of the insertion section over an entire extension of the insertion section.

24. The clamping device according to claim 2, wherein the contact surface lies in a plane running in a radial or circumferential direction.

25. The clamping device according to claim 2, wherein at least one of the surface of the insertion section facing the rim flange side, viewed in the section plane running in a radial and axial direction, runs relative to the axial direction at an angle of at least 10°, and the surface of the retaining section facing the rim flange side, viewed in the section plane running in a radial and axial direction, runs relative to the axial direction at an angle of at least 16°.

26. The clamping device according to claim 2, wherein at least one of the surface of the insertion section facing the rim flange side, viewed in the section plane running in a radial and axial direction, runs relative to the axial direction at an angle of at most 40°, and the surface of the retaining section facing the rim flange side, viewed in the section plane running in a radial and axial direction, runs relative to the axial direction at an angle of at most 50°.

27. The clamping device according to claim 2, further comprising a securing means, which is arranged on the clamping device offset in a circumferential direction to the rear grip section and pivotably about a pivot axis, which runs-tangentially to the circumferential direction, wherein the securing means comprises a positive-locking section configured to be brought into a positive rear engagement with the rim flange by pivoting the securing means.

28. The clamping device according to claim 27, wherein the positive-locking section of the securing means comprises a contact section configured to contact the rim flange on a side of the contact section facing the tire, wherein the contact section is shaped corresponding to the contour of the rim flange.

29. The clamping device according to claim 2, further comprising a multipart rear grip section with subsections that are movable relative to one another in a radial direction.

30. The clamping device according to claim 2, wherein the rear grip section is configured such that the material of the rear grip section lying axially inside a reference plane lies completely in an imaginary corridor, wherein the reference plane is arranged at a distance of 4, 6 or 7 mm from a contact plane that coincides with the contact surface, wherein the contact plane is a plane running in a radial direction and circumferential direction in which an axially outer contact point of the rim flange with the clamping device lies, wherein the imaginary corridor has a width of 12 mm or 10 mm or 9 mm or 8 mm or 7 mm or 6 mm or 5 mm or 4 mm and has a center line that runs at an angle of at least 42° to the radial direction, wherein the width and the angle of the center line are defined with reference to a view of a plane running in a radial and axial direction.

31. The clamping device according to claim 30, wherein at least one of the center line of the imaginary corridor runs, in a view of the plane running in a radial and axial direction, through a material center point of the rear grip section in a section of the rear grip section with the reference plane and the center line of the imaginary corridor runs, in a view of the plane running in a radial direction and axial direction, through the material center point of the rear grip section in a section of the rear grip section with a plane parallel to the reference plane in which an axially inner end of the rear grip section lies.

* * * * *